(12) United States Patent
Oikawa et al.

(10) Patent No.: US 11,757,083 B2
(45) Date of Patent: Sep. 12, 2023

(54) LAMINATE STRUCTURE, PRODUCTION METHOD THEREOF, AND ROLL PRESS DEVICE

(71) Applicant: MURATA MANUFACTURING CO., LTD., Kyoto (JP)

(72) Inventors: Makiko Oikawa, Kyoto (JP); Kazuhiko Morizawa, Kyoto (JP); Hiroshi Kubota, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 521 days.

(21) Appl. No.: 16/795,067

(22) Filed: Feb. 19, 2020

(65) Prior Publication Data

US 2020/0243835 A1 Jul. 30, 2020

Related U.S. Application Data

(63) Continuation of application No. PCT/JP2018/030569, filed on Aug. 17, 2018.

(30) Foreign Application Priority Data

Aug. 23, 2017 (JP) ................................ 2017-160198

(51) Int. Cl.
| | |
|---|---|
| H01M 4/00 | (2006.01) |
| H01M 10/00 | (2006.01) |
| B29C 43/00 | (2006.01) |
| B30B 3/00 | (2006.01) |
| B32B 15/00 | (2006.01) |
| H01M 4/04 | (2006.01) |
| B30B 3/04 | (2006.01) |

(Continued)

(52) U.S. Cl.
CPC .......... *H01M 4/0435* (2013.01); *B29C 43/00* (2013.01); *B30B 3/04* (2013.01); *B32B 15/00* (2013.01);
(Continued)

(58) Field of Classification Search
CPC .......... H01M 4/00; H01M 4/04; H01M 4/043; H01M 4/0435; H01M 4/10; H01M 4/13;
(Continued)

(56) References Cited

U.S. PATENT DOCUMENTS 6,146,694 A * 11/2000 Reimers .................. H01M 4/04
427/178
2016/0181650 A1* 6/2016 Ide ..................... H01M 10/0525
429/211

FOREIGN PATENT DOCUMENTS

| JP | S5897268 A | 6/1983 |
|---|---|---|
| JP | H06203830 A | 7/1994 |

(Continued)

OTHER PUBLICATIONS

Chinese Office action dated Sep. 29, 2022 in corresponding Chinese Application No. 201880054700.5.
(Continued)

*Primary Examiner* — Jacob T Minskey
*Assistant Examiner* — Matthew Hoover
(74) *Attorney, Agent, or Firm* — K&L Gates LLP

(57) ABSTRACT

A laminate structure includes a substrate; a first layer provided on a first surface of the substrate; and a second layer provided on a second surface of the substrate. The first layer includes a first end portion and a second end portion along a width direction of the substrate, the second layer includes a third end portion and a fourth end portion along the width direction of the substrate, the first end portion is opposite to the third end portion, the second end portion is opposite to the fourth end portion. An end surface of the third end portion includes an inclined surface or a stair shape or a combined shape of the inclined surface and the stair shape.

8 Claims, 33 Drawing Sheets

(51) Int. Cl.
*H01M 4/139* (2010.01)
*H01M 10/0525* (2010.01)

(52) U.S. Cl.
CPC ....... *H01M 4/139* (2013.01); *H01M 10/0525* (2013.01)

(58) Field of Classification Search
CPC ...... H01M 4/139; H01M 10/00; H01M 10/05; H01M 10/052; H01M 10/0525; B29C 43/00; B30B 3/00; B30B 3/04; B32B 15/00
See application file for complete search history.

(56) References Cited

FOREIGN PATENT DOCUMENTS

| JP | H11185737 | A | * | 7/1999 |
|----|-----------|---|---|--------|
| JP | 2004303622 |  | * | 10/2004 |
| JP | 2004303622 | A |   | 10/2004 |
| JP | 2015089556 | A |   | 5/2015 |
| KR | 1020130120745 | A |   | 11/2013 |
| KR | 1020140029808 | A |   | 3/2014 |
| WO | 2015015663 | A1 |   | 2/2015 |

OTHER PUBLICATIONS

Japanese Office action dated Mar. 2, 2021 in corresponding Japanese Application No. 2019-537605.
Chinese Office action dated Sep. 29, 2022 in corresponding Chinese Application No. 2019-537605.
International Search Report for Application No. PCT/JP2018/030569, dated Oct. 30, 2018.
Chinese Office Action dated May 18, 2023 in corresponding Chinese Application No. 201880054700.5.

* cited by examiner

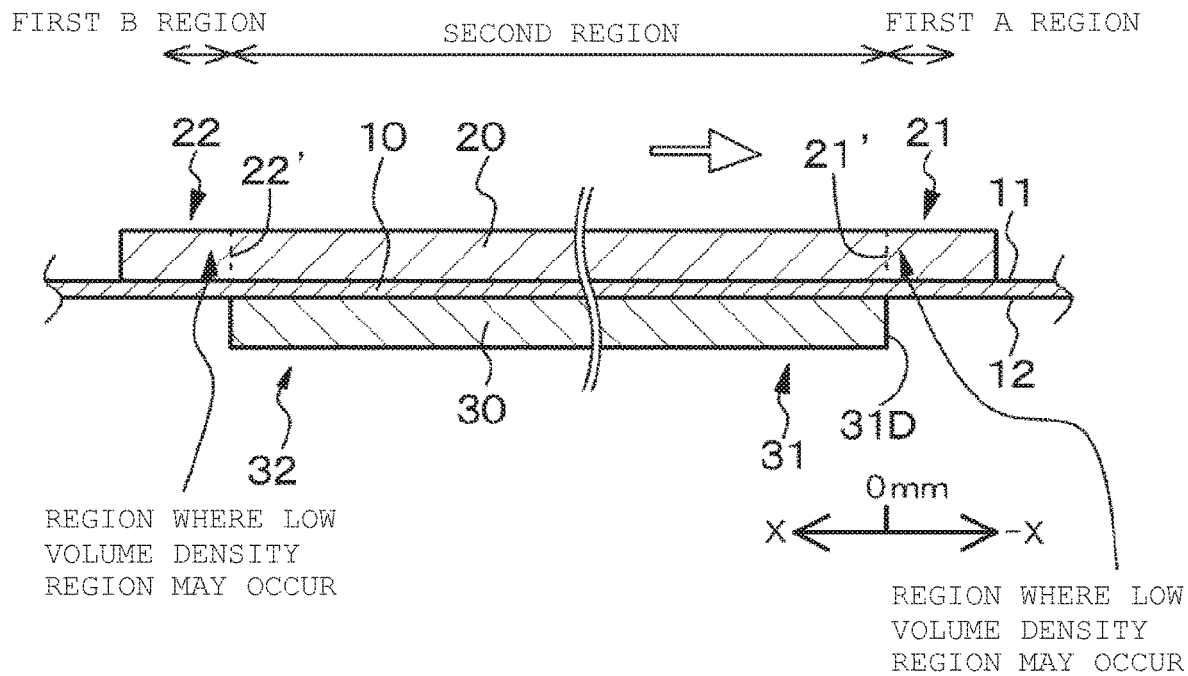
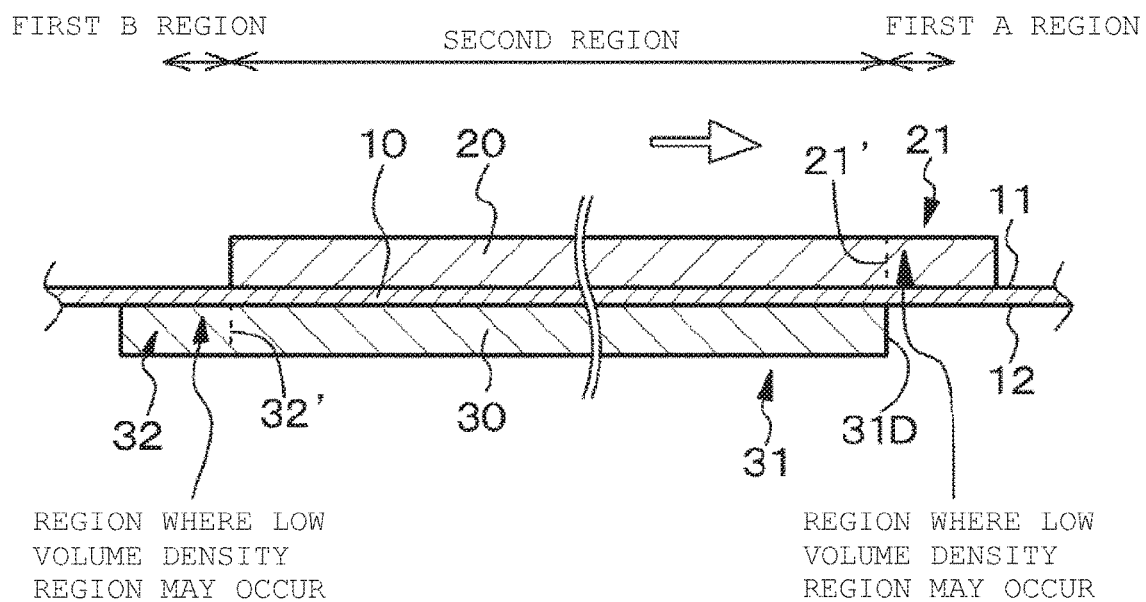

FIG. 22
INCLINE ANGLE 5°
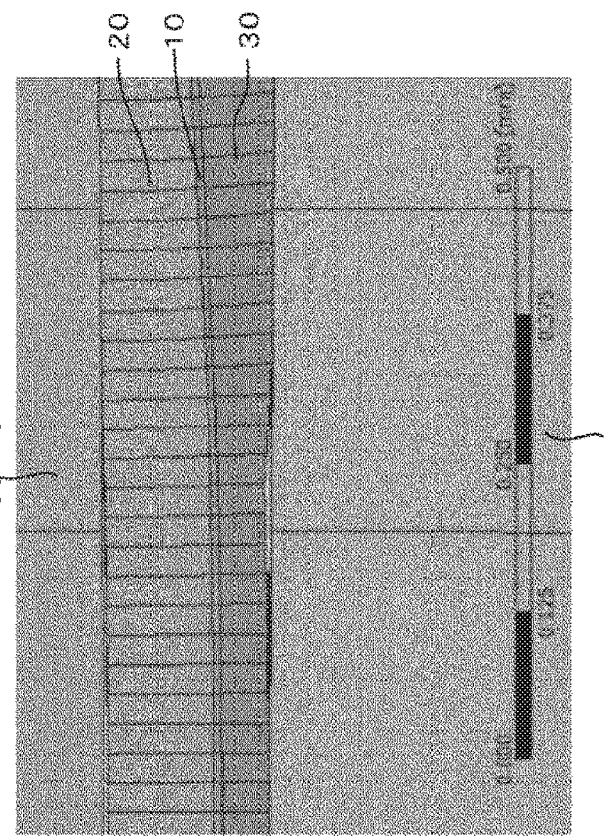
COMBINATION OF STAIR SHAPE AND INCLINED SURFACE
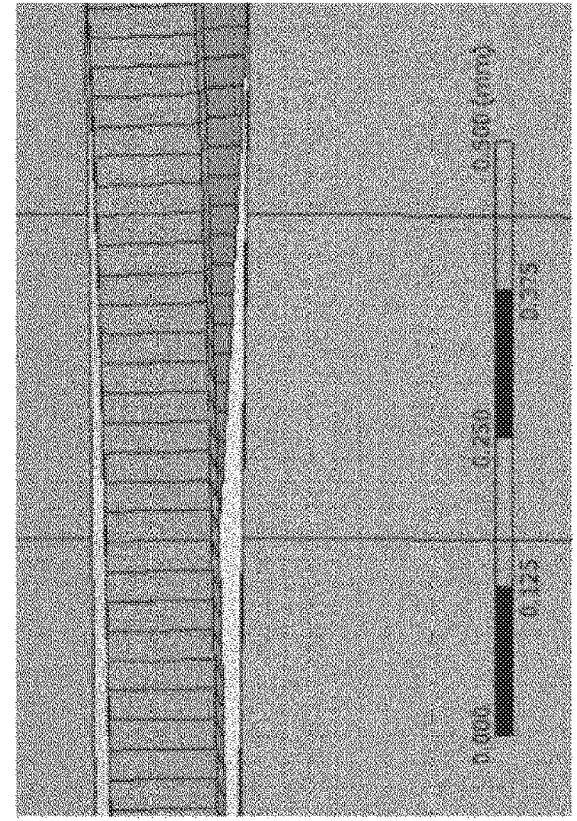

LAMINATE STRUCTURE, PRODUCTION METHOD THEREOF, AND ROLL PRESS DEVICE

CROSS REFERENCE TO RELATED APPLICATIONS

The present application is a continuation of PCT patent application no. PCT/JP2018/030569, filed on Aug. 17, 2018, which claims priority to Japanese patent application no. JP2017-160198 filed on Aug. 23, 2017, the entire contents of which are being incorporated herein by reference.

BACKGROUND

The present disclosure generally relates to a laminate structure, a production method thereof, and a roll press device.

In a laminate structure that includes a substrate including a first surface and a second surface opposite to the first surface, a first layer formed on the first surface of the substrate, and a second layer formed on the second surface of the substrate, a roll press device is often used to press (pressurize and compress) the first layer and the second layer.

In a conventional technology, a laminate structure passes through the roll press device, as illustrated in FIG. 24A which is a schematic partial cross-sectional view taken along a length direction, there is often present a region (for the sake of convenience, referred to as a "first region") where a first layer 20 is formed on a first surface 11 of a substrate 10, and a region (for the sake of convenience, referred to as a "second region") where the first layer 20 and a second layer 30 are formed on the first surface 11 and a second surface 12 of the substrate 10. Then, when press is continually performed from the first region to the second region by a pair of press rolls 40 (refer to FIGS. 24B, 25A, and 25B), in a region of transition from the first region to the second region, the press state of a region 23 of the first layer 20 in the first region which is adjacent to the second region often differs from the press state of the other region in the first layer 20. As a result, there occurs a problem that the volume density of the region 23 of the first layer in the first region is lower than the volume density of the other region (refer to FIGS. 25A and 25B). Incidentally, for the sake of convenience, the region 23 of the first layer 20 in the first region may be referred to as a "low volume density region 23". In addition, a traveling direction of the laminate structure is indicated by a white arrow.

FIG. 26 shows a simulation result of a relationship between the volume density of the first layer 20 and a distance X (refer to FIG. 24B) from a portion of the first layer which is opposite to an end portion of the second layer, when press is continually performed from the first region to the second region by the pair of press rolls 40, and it can be found out that the volume density of the first layer 20 is significantly reduced when the value of X is within a range of −3 mm to 0 mm.

For example, on the assumption of a lithium ion secondary battery, the precipitation state of lithium in the low volume density region 23 differs from the precipitation state of lithium in the other region. In addition, the presence of the low volume density region 23 causes degradation in capacitance or degradation in cycling characteristics. Furthermore, when a positive electrode member is formed from one laminate structure, a negative electrode member is formed from another laminate structure, and an electrode structure is obtained by stacking the positive electrode member and the negative electrode member with a separator interposed therebetween, the presence of the low volume density region 23 causes the occurrence of variations in the characteristics of the electrode structure, which is a concern.

SUMMARY

The present disclosure generally relates to a laminate structure, a production method thereof, and a roll press device.

The conventional technology does not disclose the phenomenon such as an occurrence of the low volume density region in the region of transition from the first region to the second region.

Therefore, an object of the present disclosure is to provide a laminate structure having a configuration and a structure capable of reducing a change in the press state of a first layer in a region where the first layer is formed on a first surface of a substrate and in a region where the first layer and a second layer are formed on the first surface and a second surface of the substrate, a production method thereof, a roll press device suitable for producing such a laminate structure, and a method for producing a laminate structure using the roll press device.

According to an embodiment of the present disclosure, a laminate structure is provided. The laminate structure includes:

a substrate including a first surface and a second surface opposite to the first surface;

a first layer provided on the first surface of the substrate; and a second layer provided on the second surface of the substrate, in which the first layer includes a first end portion and a second end portion along a width direction of the substrate, the second layer includes a third end portion and a fourth end portion along the width direction of the substrate, the first end portion is opposite to the third end portion, the second end portion is opposite to the fourth end portion, the third end portion is positioned closer to a central portion side of the substrate than the first end portion, and an end surface of the third end portion includes an inclined surface or a stair shape or a combined shape of the inclined surface and the stair shape.

According to an embodiment of the present disclosure, a roll press device is provided. The roll press device including:

a pair of press rolls; and an auxiliary roll that is disposed on at least one of upstream and downstream of the pair of press rolls, the roll press device is configured to press a laminate structure by allowing the laminate structure to pass between the pair of press rolls, in which a laminate structure contact surface of the auxiliary roll is positioned above or below a virtual plane that the laminate structure includes when the laminate structure passes between the pair of press rolls.

According to an embodiment of the present disclosure, a method for producing a laminate structure is provided. The laminate structure has a configuration according to an embodiment as described herein. the laminate structure is pressed while passing between a pair of press rolls.

According to an embodiment of the present disclosure, a method for producing a laminate structure using a roll press device is provided. The roll press device includes:

a pair of press rolls, and an auxiliary roll that is disposed on at least one of the pair of press rolls, in which a laminate structure contact surface of the auxiliary roll is positioned above or below a virtual plane that the laminate structure includes when the laminate structure passes between the pair of press rolls, and the laminate structure is pressed while passing between the pair of press rolls.

In the method for producing a laminate structure according to an embodiment of the present disclosure, the roll press device of the present disclosure can be used.

In the laminate structure of the present disclosure or in the method for producing a laminate structure according to the first embodiment of the present disclosure, the end surface of the 2A end portion is an inclined surface or has a stair shape or a combined shape of the inclined surface and the stair shape; and thereby, it is possible to effectively prevent an occurrence of a low volume density region. In addition, in the roll press device of the present disclosure or in the method for producing a laminate structure according to the second embodiment of the present disclosure, the laminate structure contact surface of the auxiliary roll is positioned above or below the virtual plane which the laminate structure includes when the laminate structure passes between the pair of press rolls, and the laminate structure passes between the pair of press rolls, so that the laminate structure is pressed; and thereby, it is possible to effectively prevent an occurrence of a low volume density region. Incidentally, the effects described in this specification are presented merely as an example and are not limited, and there may be provided additional effects.

BRIEF DESCRIPTION OF FIGURES

FIGS. 4A and 4B are schematic cross-sectional views of a laminate structure which is used in Example 3 and taken along a length direction thereof according to an embodiment of the present disclosure.

FIG. 22 is a graph showing a result of a simulation performed to figure out the size of a gap occurring between the surface of the press roll and the surface of the second layer in the region of transition from the first region to the second region in a case where an end surface of the 2A end portion has a combined shape of a stair shape with three steps and an inclined surface with an incline angle of 5 degrees and in a case where the end surface is an inclined surface with an incline angle of 5 degrees in the modification example of Example 2 according to an embodiment of the present disclosure.

DETAILED DESCRIPTION

Figure 1A:
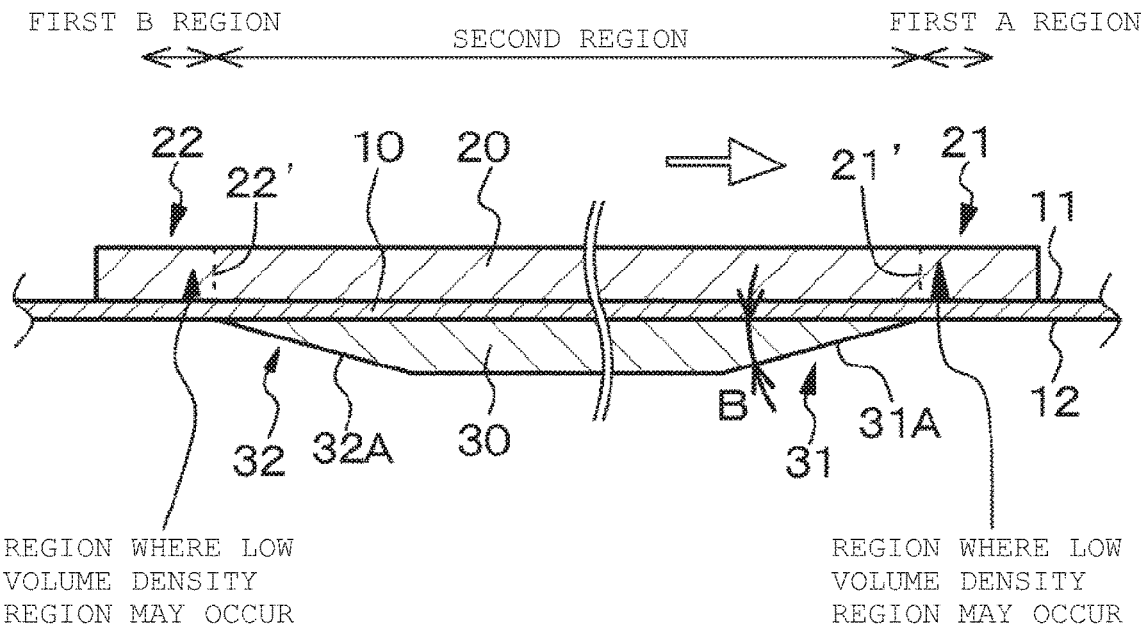
FIGS. 1A and 1B are schematic cross-sectional views of a laminate structure of Example 1 as taken along a length direction thereof according to an embodiment of the present disclosure.

As described herein, the present disclosure will be described based on examples with reference to the drawings, but the present disclosure is not to be considered limited to the examples, and various numerical values and materials in the examples are considered by way of example.

In a laminate structure of the present disclosure and a laminate structure produced by a method for producing a laminate structure according to a first embodiment of the present disclosure (hereinafter, may be collectively referred to as "a laminate structure and the like of the present disclosure"), a first layer includes a 1A end portion and a 1B end portion along a width direction of a substrate, and the 1A end portion may be parallel to the width direction of the substrate or may not be parallel thereto in some cases. Similarly, the 1B end portion may be parallel to the width direction of the substrate or may not be parallel thereto in some cases. In addition, a second layer includes a 2A end portion and a 2B end portion along the width direction of the substrate, and the 2A end portion may be parallel to the width direction of the substrate or may not be parallel thereto in some cases. Similarly, the 2B end portion may be parallel to the width direction of the substrate or may not be parallel thereto in some cases. The 1A end portion is opposite to the 2A end portion; however, an orthographic image of the 1A end portion on the substrate and an orthogonal image of the 2A end portion on the substrate do not coincide with each other as a whole. Similarly, the 1B end portion is opposite to the end portion; however, an orthographic image of the 1B end portion on the substrate and an orthogonal image of the 2B end portion on the substrate do not coincide with each other as a whole.

In the laminate structure and the like of the present disclosure, it is preferable that an incline angle of an end surface of the 2A end portion is 5 degrees or less. Here, in a case where the end surface of the end portion is an inclined surface, an angle which is formed between a straight line connecting the lowermost end and the uppermost end of the inclined surface and a surface of the substrate is equivalent to the incline angle. In addition, in a case where the end surface of the end portion has a stair shape, it is assumed that a straight line connects a point where a curved line (straight line in some cases) which smoothly connects portions equivalent to stair noses intersects the surface of the substrate and the portions equivalent to the stair noses, and an angle which is formed between this straight line and the surface of the substrate is equivalent to the incline angle. In a case where the end surface of the end portion has a combined shape of an inclined surface and a stair shape, a combination of the above descriptions may be applied.

In the laminate structure and the like of the present disclosure including the foregoing preferred embodiment, when $V_{10}$ is an average volume density value of a region with a length of 1 mm in the first layer from one portion which is 2 mm apart outward from a portion of the first layer which is opposite to the 2A end portion to another portion which is 3 mm apart from the portion, and $V_{11}$ is an average volume density value of a region in the first layer which is sufficiently apart inward from the portion of the first layer which is opposite to the 2A end portion, $V_{10}/V_{11} \geq 0.94$ is preferably satisfied. Here, specifically, the region in the first layer which is sufficiently apart inward from the portion of the first layer which is opposite to the 2A end portion indicates a region with a length of 1 mm in the first layer from one portion which is 3 mm apart inward from the portion of the first layer which is opposite to the 2A end portion to another portion which is 4 mm apart from the portion.

In the laminate structure and the like of the present disclosure including the foregoing various preferred embodiment, when the end surface of the 2A end portion has the stair shape, the 2A end portion has a structure where N layers (where $N \geq 2$) of second layer segments are stacked, a thickness of each of the second layer segments which are equivalent to risers is $d_n$ (where n=1, 2, ..., N), a thickness of the first layer is c, a thickness of the substrate is e, and a sum of thicknesses from a first layer of second layer segment to an $n^{th}$ layer of second layer segment is $\Sigma d_n$, and when an optimal incline angle of the end surface of the 2A end portion is $B_{opt}$ (degrees), a step rate $g_n$ obtained by $g_n = d_n/(\Sigma d_n + c + e)$ satisfies $0.022 B_{opt} + 0.022 \leq g_n \leq 0.045 B_{opt} + 0.063$. Then, in this case, it is preferable that the step rate of any one of the second layer segments is 0.15 or less; however, the step rate is not limited thereto.

In the laminate structure and the like of the present disclosure including the foregoing various preferred embodiment, when either one of the 1B end portion and the 2B end portion is positioned closer to the central portion side of the substrate than the other, and either one of the 1B end portion and the 2B end portion is referred to as an inner end portion, an end surface of the inner end portion is an inclined surface or has a stair shape or a combined shape of the inclined surface and the stair shape. Then, in this case, it is preferable that an incline angle of the end surface of the inner end portion is 5 degrees or less. Furthermore, in this case, when either the other one of the 1B end portion and the 2B end portion is referred to as an outer end portion, and when $V_{20}$ is an average volume density value of a region with a length of 1 mm in a layer from one portion which is 2 mm apart outward from a portion of the layer including the outer end portion which is opposite to the inner end portion to another portion which is 3 mm apart from the portion and $V_{21}$ is an average volume density value of a region in the layer which is sufficiently apart inward from the portion of the layer including the outer end portion which is opposite to the inner end portion, $V_{20}/V_{21} \geq 0.94$ is satisfied. Here, specifically, the region in the layer which is sufficiently apart inward from the portion of the layer which is opposite to the inner end portion indicates a region with a length of 1 mm in the layer from one portion which is 3 mm apart inward from the portion of the layer is opposite to the inner end portion to another portion which is 4 mm apart from the portion. Furthermore, when the end surface of the inner end portion has a stair shape, the inner end portion has a structure where M layers (where $M \geq 2$) of segment layers are stacked, a thickness of each of the segment layers which are equivalent to risers is $d_m$ (where m=1, 2, ..., N), a thickness of a layer which is not the layer is c', a thickness of the substrate is e, and a sum of thicknesses from a first layer of segment layer to an $m^{th}$ layer of segment layer is $\Sigma d_m$, and when an optimal incline angle of the end surface of the inner end portion is $B_{opt}'$ (degrees), a step rate $g_m$ obtained by $g_m = d_m/(\Sigma d_m + c' + e)$ satisfies $0.022 B_{opt}' + 0.022 \leq g_n \leq 0.045 B_{opt}' + 0.063$.

In the laminate structure and the like of the present disclosure including the foregoing various preferred embodiment, the laminate structure forms an electrode member of a battery, the substrate forms a current collector of the electrode member, and the first layer and the second layer form a mixture layer of the electrode member. Incidentally, various primary batteries and various secondary batteries can be presented as examples of the battery. A lithium secondary battery can be presented as an example of the secondary battery; however, the secondary battery is not limited thereto. A coin type, a button type, a plate type, a square type, a cylinder type, and a laminate type (laminate film type) can be presented as examples of the shape and the form of the battery. The current collector or the mixture layer of the electrode member will be described in detail later.

In a roll press device of the present disclosure, it is preferable that an angle θ of a laminate structure contact surface of an auxiliary roll with respect to a virtual plane exceeds zero degrees and is 10 degrees or less.

Incidentally, the virtual plane is a plane orthogonal to a straight line that connects the centers of rotary shafts of a pair of press rolls of the roll press device, and is a virtual plane that is in contact with the surfaces of the pair of press rolls.

Furthermore, the roll press device of the present disclosure including the foregoing preferred embodiment, the laminate structure includes a substrate including a first surface and a second surface opposite to the first surface, a first layer formed on the first surface of the substrate, and a second layer formed on the second surface of the substrate, in which the first layer includes a 1A end portion and a 1B end portion along a width direction of the substrate, the second layer includes a 2A end portion and a 2B end portion along the width direction of the substrate, the 1A end portion is opposite to the 2A end portion, the 1B end portion is opposite to the 2B end portion, the 2A end portion is positioned closer to a central portion side of the substrate than the 1A end portion, and an end surface of the 2A end portion is an inclined surface or has a stair shape or a combined shape of the inclined surface and the stair shape, the laminate structure penetrates between the pair of press rolls, and in a case where the second layer is positioned below the first layer, the laminate structure contact surface of the auxiliary roll is positioned below the virtual plane, and in a case where the second layer is positioned above the first layer, the laminate structure contact surface of the auxiliary roll is positioned above the virtual plane. Alternatively, the laminate structure is the laminate structure of the present disclosure including the foregoing various preferred embodiment, the laminate structure penetrates between the pair of press rolls, and in a case where the second layer is positioned below the first layer, the laminate structure contact surface of the auxiliary roll is positioned below the virtual plane, and in a case where the second layer is positioned above the first layer, the laminate structure contact surface of the auxiliary roll is positioned above the virtual plane.

In the method for producing a laminate structure according to the first embodiment of the present disclosure, when a radius of the pair of press rolls is r (m) and the optimal incline angle of the end surface of the 2A end portion is $B_{opt}$ (degrees), it is preferable that $B_{opt} = p \times r + q$ is satisfied where $-9 \leq p \leq -5$ and $6 \leq q \leq 10$.

In a case where the battery is a lithium ion secondary battery where the capacitance of a negative electrode member is obtained by storing and releasing lithium which is an electrode reactant, a part of components of the lithium ion secondary battery will be simply described hereinafter, and the lithium ion secondary battery will be described in detail later.

In the lithium ion secondary battery, during charge, for example, lithium ions are released from a positive electrode material (positive electrode active material), and stored in a negative electrode active material through a non-aqueous electrolytic solution. In addition, during discharge, for example, the lithium ions are released from the negative electrode active material, and stored in the positive electrode material (positive electrode active material) through the non-aqueous electrolytic solution.

The members forming the lithium ion secondary battery are accommodated in an electrode structure accommodation member (battery can). A positive electrode member, the negative electrode member, an electrolyte, and a separator can be presented as examples of the members forming the lithium ion secondary battery. The positive electrode member includes, for example, a positive electrode current collector and a positive electrode mixture layer containing a positive electrode material.

The negative electrode member includes, for example, a negative electrode current collector and a negative electrode mixture layer containing a negative material. The positive electrode active material corresponds to the positive electrode material, and the negative electrode active material corresponds to the negative electrode material. In addition, a positive electrode lead portion is attached to the positive electrode current collector, and a negative electrode lead portion is attached to the negative electrode current collector.

The positive electrode mixture layers (equivalent to the first layer and the second layer of the laminate structure) containing the positive electrode active material are formed on both surfaces of the positive electrode current collector (equivalent to the substrate of the laminate structure) forming the positive electrode member. A material forming the positive electrode current collector will be described in detail later, and conductive materials such as aluminum, nickel, and/or stainless steel can be presented as examples of the material. As the positive electrode active material, the positive electrode mixture layer contains a positive electrode material capable of storing and releasing lithium. The positive electrode mixture layer may further contain a positive electrode binder, a positive electrode conductive agent, or the like. A lithium-containing compound can be presented as an example of the positive electrode material, and it is preferable that a lithium-containing complex oxide or a lithium-containing phosphate compound is used as the positive electrode material from the viewpoint of being able to obtain a high energy density. The lithium-containing complex oxide is an oxide containing lithium and one or two or more elements (hereinafter, referred to as "other elements"; however, lithium is excluded) as constituent elements, and has a layered rock salt crystal structure or a spinel crystal structure. In addition, the lithium-containing phosphate compound is a phosphate compound containing lithium and one or two or more elements (other elements) as constituent elements, and has an olivine crystal structure.

The negative electrode mixture layers (equivalent to the first layer and the second layer of the laminate structure) containing the negative electrode active material are formed on both surfaces of the negative electrode current collector (equivalent to the substrate of the laminate structure) forming the negative electrode member. A material forming the negative electrode current collector will be described in detail later, and conductive materials such as copper, nickel, and/or stainless steel can be presented as examples of the material. As the negative electrode active material, the negative electrode mixture layer contains a negative electrode material capable of storing and releasing lithium. The negative electrode mixture layer may further contain a negative electrode binder, a negative electrode conductive agent, or the like. The negative electrode binder and the negative electrode conductive agent can be the same as the positive electrode binder and the positive electrode conductive agent.

An electrode structure including the positive electrode member, the separator, and the negative electrode member may be in a state where the positive electrode member, the separator, the negative electrode member, and the separator are wound, or may be in a state where the positive electrode member, the separator, the negative electrode member, and the separator are stacked. The electrode structure or the wound electrode structure can be accommodated in a wound state in the electrode structure accommodation member. The electrode structure can be accommodated in a stacked state in the electrode structure accommodation member. In these cases, the outer shape of the electrode structure accommodation member can be a cylindrical shape or a square shape (planar shape). A coin type, a button type, a disk type, a plate type, a square type, a cylinder type, or a laminate type (laminate film type) can be presented as examples of the shape and the form of the lithium ion secondary battery (hereinafter, simply referred to as a "secondary battery").

Iron (Fe), nickel (Ni), aluminum (Al), titanium (Ti), or alloys thereof, and/or stainless steel (SUS) can be presented as examples of the material of the electrode structure accommodation member (battery can) forming a cylinder type secondary battery. In order to prevent the electrochemical corrosion of the secondary battery which is involved by charge and discharge, it is preferable that the battery can is plated with, for example, nickel or the like. It is preferable that in a laminate type (laminate film type) secondary battery, an exterior member has a laminate structure of a plastic material layer (fusion bonding layer), a metallic layer, and a plastic material layer (surface protection layer), namely, a laminate film type is preferable. In the case of the laminate film type secondary battery, for example, after the exterior member is folded such that portions of the fusion bonding layer are opposite to each other with the electrode structure interposed therebetween, outer peripheral edge portions of the fusion bonding layer are fusion-bonded. However, the exterior member may be obtained by bonding two sheets of laminate films with an adhesive or the like interposed therebetween. For example, the fusion bonding layer is formed of a film that is made of olefin resin such as polyethylene, polypropylene, modified polyethylene, modified polypropylene, or a polymer thereof. The metallic layer is formed of, for example, an aluminum foil, a stainless steel foil, a nickel foil, and/or the like. The surface protection layer is made of, for example, nylon, polyethylene terephthalate, and/or the like. Among these materials, it is preferable that the exterior member is an aluminum laminate film in which a polyethylene film, an aluminum foil, and a nylon film are stacked in order. However, the exterior member may be a laminate film having another laminate structure, may be a polymer film made of polypropylene, or may be a metallic film.

In the use of the secondary battery, one or a plurality of secondary batteries may be used. In the latter case, the plurality of secondary batteries may be connected in series or may be connected in parallel. In addition, an assembled battery where a plurality of sets of secondary batteries which are connected in series are connected in parallel may be used, or an assembled battery where a plurality of sets of secondary batteries which are connected in parallel are connected in series may be used.

The secondary battery of the present disclosure can be used as a drive power source or an auxiliary power source for a personal notebook computer, a battery pack which is used in a personal computer or the like as a detachable power source, various display devices, a portable information terminal including a personal digital assistant (PDA and a portable information terminal), a mobile phone, a smartphone, a base unit or a handset of a cordless telephone, a video movie (a video camera or a camcorder), a digital still camera, an electronic paper such as an electronic publication (electronic book) or an electronic newspaper, an electronic dictionary, a music player, a portable music player, a radio, a portable radio, a headphone, a headphone stereo, a game console, wearable equipment (for example, a smart watch, a wristband, a smart eyeglass, medical equipment, a health care product), a navigation system, a memory card, a cardiac pacemaker, a hearing aid, an electric tool, an electric shaver, a refrigerator, an air conditioner, a television receiver, a stereo, a water heaters, a microwave oven, a dishwasher, a washing machine, a dryer, lighting equipment including an indoor light and the like, various electric equipment (including portable electronic equipment), a toy, medical equipment, a robot, IoT equipment or an IoT terminal, a road conditioner, a traffic signal, a railway vehicle, a golf cart, an electric cart, an electric automobile (including a hybrid automobile), and the like. In addition, the secondary battery can be equipped in a power source or the like for power storage for buildings including a residence or power generation facilities, or can be used to supply electrical power thereto. In the electric automobile, generally, a conversion device to which electrical power is supplied and which converts the electrical power into a drive force is a motor. A control device (control unit) which performs information processing relating to vehicle control includes a control device that displays a remaining secondary battery amount based on information relating to the remaining amount of the secondary battery, and the like. In addition, the secondary battery can be used in a power storage device for a so-called smart grid. Such a power storage device can not only supply electrical power but also store electrical power by receiving a supply of electrical power from other power sources. For example, a thermal power generation, a nuclear power generation, a hydro power generation, solar cells, a wind power generation, a geothermal power generation, fuel cells (including biofuel cells), and the like can be used as the other power sources.

The laminate structure of the present disclosure can be used in a secondary battery and a secondary battery in a battery pack including control means (control unit) for performing control relating to the secondary battery. In addition, the laminate structure of the present disclosure can be used in a secondary battery for electronic equipment that receives a supply of electrical power from the secondary battery.

The laminate structure of the present disclosure can be used in a secondary battery for an electric vehicle including a conversion device which receives a supply of an electrical power from the secondary battery to convert the electric power into a driving force of the vehicle; and a control device (control unit) which performs information processing relating to vehicle control based on information relating to the secondary battery. In the electric vehicle, typically, the conversion device receives a supply of electrical power from the secondary battery to drive a motor, so that a driving force is generated. A regenerative energy can be used to drive the motor. In addition, for example, the control device performs information processing relating to vehicle control based on the remaining battery amount of the secondary battery. For example, the electric vehicle includes a so-called hybrid vehicle in addition to an electric automobile, an electric motorcycle, an electric bicycle, a railway vehicle, and the like.

The secondary battery can be used in a power storage device for a so-called smart grid. Such a power storage device can not only supply electrical power but also store electrical power by receiving a supply of electrical power from other power sources. The laminate structure of the present disclosure can be used in the secondary battery for the power storage device. For example, a thermal power generation, a nuclear power generation, a hydro power generation, solar cells, a wind power generation, a geothermal power generation, fuel cells (including biofuel cells), and the like can be used as other power sources.

The laminate structure of the present disclosure can be used in a secondary battery for a power storage system (or a power supply system) that is configured to receive a supply of electrical power from the secondary battery and/or supply electrical power from a power source to the secondary battery. Just as long as the power storage system uses electrical power, the power storage system may be any power storage system, and also includes a simple power device. For example, the power storage system includes a smart grid, a home energy management system (HEMS), a vehicle, and the like, and can also store electrical power.

The laminate structure of the present disclosure can be used in a secondary battery of a power source for power storage that is configured to include the secondary battery and be connected to electronic equipment to which electrical power is supplied. Regardless of the application of the power source for power storage, basically, the secondary battery can be used in any power storage system, power supply system, or power device, and can be used, for example, in a smart grid.

Example 1

Figure 1B:
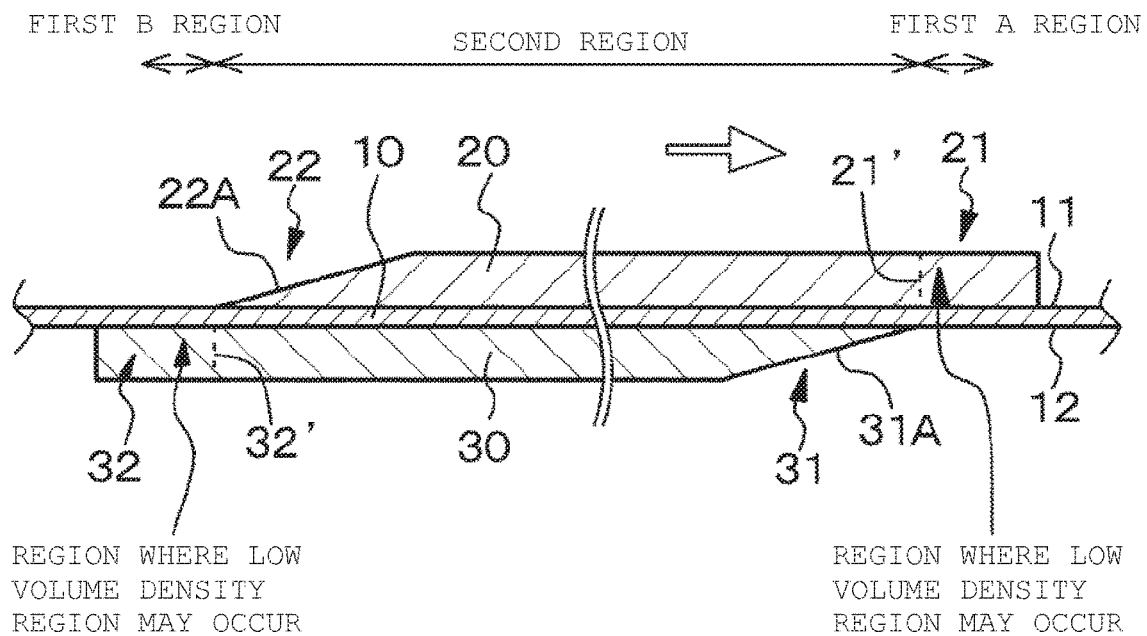

Example 1 relates to the laminate structure of the present disclosure and the method for producing a laminate structure according to the first embodiment of the present disclosure. FIG. 1A or 1B illustrates a schematic cross-sectional view of a laminate structure of Example 1 as taken along a length direction thereof. Incidentally, in FIGS. 1A, 1B, 2A, 2B, 3A, 3B, 4A, and 4B, a "1A region" denotes a first region that is positioned forward in a traveling direction of the laminate structure which is indicated by a white arrow, and a "1B region" denotes a first region that is positioned rearward.

In the related art, as described with reference to FIGS. 24A, 24B, 25A, and 25B, in the region of transition from the first region to the second region, there occurs the phenomenon that the low volume density region 23 occurs in the region 23 of the first layer 20 in the first region which is adjacent to the second region. The laminate structure of Example 1 and a laminate structure obtained by the method for producing a laminate structure according to Example 1 have a configuration and a structure that prevent an occurrence of the phenomenon such as an occurrence of the low volume density region 23.

Specifically the laminate structure of Example 1 includes
a substrate 10 including a first surface 11 and a second surface 12 opposite to the first surface 11;
a first layer 20 formed on the first surface 11 of the substrate 10; and
a second layer 30 formed on the second surface 12 of the substrate 10,
in which
the first layer 20 includes a 1A end portion 21 and a 1B end portion 22 along a width direction of the substrate 10,
the second layer 30 includes a 2A end portion 31 and a 2B end portion 32 along the width direction of the substrate 10,
the 1A end portion 21 is opposite to the 2A end portion 31,
the 1B end portion 22 is opposite to the 2B end portion 32, and
the 2A end portion 31 is positioned closer to a central portion side of the substrate 10 than the 1A end portion 21.

Then, an end surface 31A of the 2A end portion 31 is an inclined surface or has a stair shape or a combined shape of the inclined surface and the stair shape. Specifically, in the laminate structure of Example 1, the end surface 31A of the 2A end portion 31 is an inclined surface.

In addition, in the method for producing a laminate structure according to Example 1 which includes
the substrate 10 including the first surface 11 and the second surface 12 opposite to the first surface 11,
the first layer 20 formed on the first surface 11 of the substrate 10, and
the second layer 30 formed on the second surface 12 of the substrate 10, and in which
the first layer 20 includes the 1A end portion 21 and the 1B end portion 22 along the width direction of the substrate 10,
the second layer 30 includes the 2A end portion 31 and the 2B end portion 32 along the width direction of the substrate 10,
the 1A end portion 21 is opposite to the 2A end portion 31,
the 1B end portion 22 is opposite to the 2B end portion 32,
the 2A end portion 31 is positioned closer to the central portion side of the substrate 10 than the 1A end portion 21, and
the end surface 31A of the 2A end portion 31 is an inclined surface or has a stair shape or a combined shape of the inclined surface and the stair shape,
in which
the laminate structure passes between a pair of press rolls, so that the laminate structure is pressed (pressurized and compressed).

The first layer 20 includes the 1A end portion 21 and the 1B end portion 22 along the width direction (direction vertical to the drawing sheet) of the substrate 10, and the 1A end portion 21 may be parallel to the width direction of the substrate 10 or may not be parallel thereto in some cases. Similarly, the 1B end portion 22 may be parallel to the width direction of the substrate 10 or may not be parallel thereto in some cases. In addition, the second layer 30 includes the 2A end portion 31 and the 2B end portion 32 along the width direction of the substrate 10, and the 2A end portion 31 may be parallel to the width direction of the substrate 10 or may not be parallel thereto in some cases. Similarly, the 2B end portion 32 may be parallel to the width direction of the substrate 10 or may not be parallel thereto in some cases. In Example 1 or Example 2 and Example 3 which will be described later, the 1A end portion 21, the 1B end portion 22, the 2A end portion 31, and the 2B end portion 32 are parallel to the width direction of the substrate 10. The 1A end portion 21 is opposite to the 2A end portion 31; however, an orthographic image of the 1A end portion 21 on the substrate 10 and an orthogonal image of the 2A end portion 31 on the substrate 10 do not coincide with each other in their entirety. In addition, the 1B end portion 22 is opposite to the 2B end portion 32; however, an orthographic image of the 1B end portion 22 on the substrate 10 and an orthogonal image of the 2B end portion 32 on the substrate 10 do not coincide with each other in their entirety.

A radius r of a pair of press rolls 40 was 0.375 m, a thickness c of the substrate 10 was 10 μm, a thickness of a thickness e of the first layer 20 was 74 μm, and a thickness of the second layer 30 was 74 μm.

Figure 14:
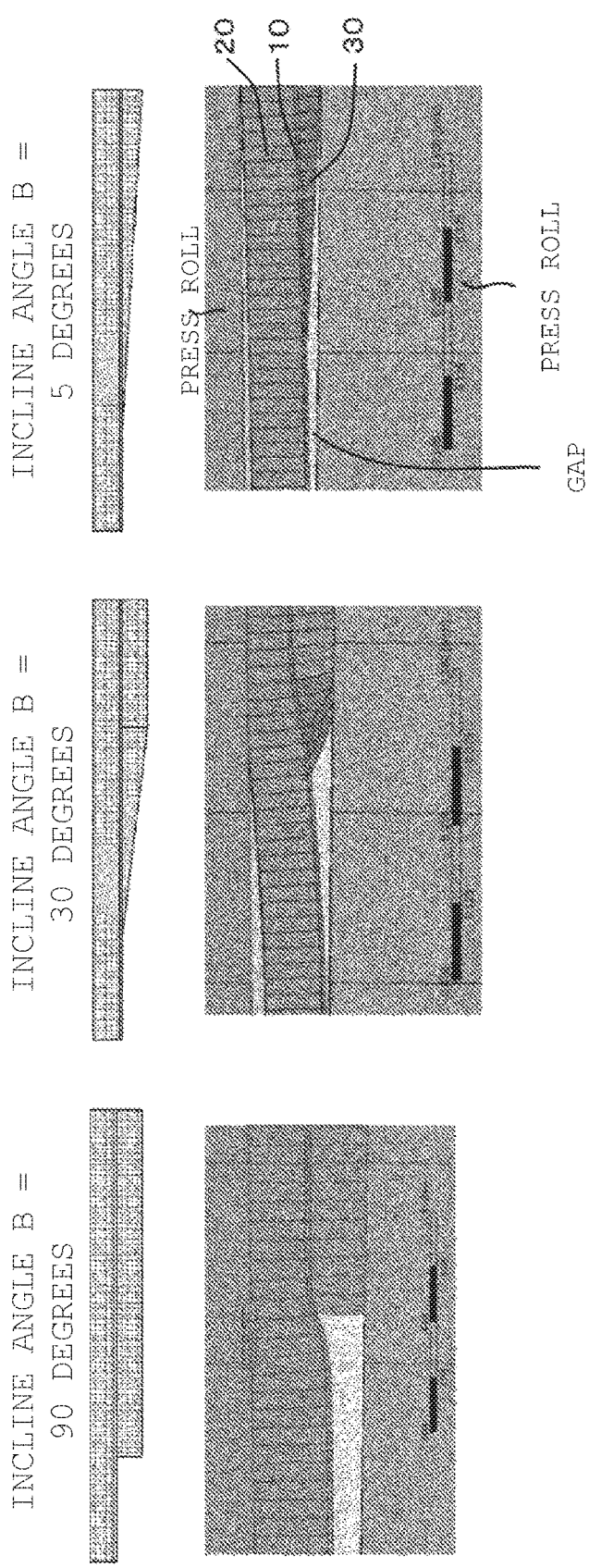
FIG. 14 illustrates pictures showing a result of a simulation performed to figure out the size of a gap occurring between the surface of a press roll and the surface of a second layer in a region of transition from a first region to a second region when an incline angle B is 90 degrees, 30 degrees, or 5 degrees in Example 1 according to an embodiment of the present disclosure.

Then, a simulation was performed to figure out the size of a gap occurring between the surface of the press roll 40 and the surface of the second layer 30 in a region of transition from the 1A region to the second region when an incline angle B was 90 degrees, 30 degrees, or 5 degrees. The results are illustrated at the bottom, the middle, and the top in FIG. 14. It can be found out that as the incline angle B is reduced, the gap is reduced.

Figure 15:
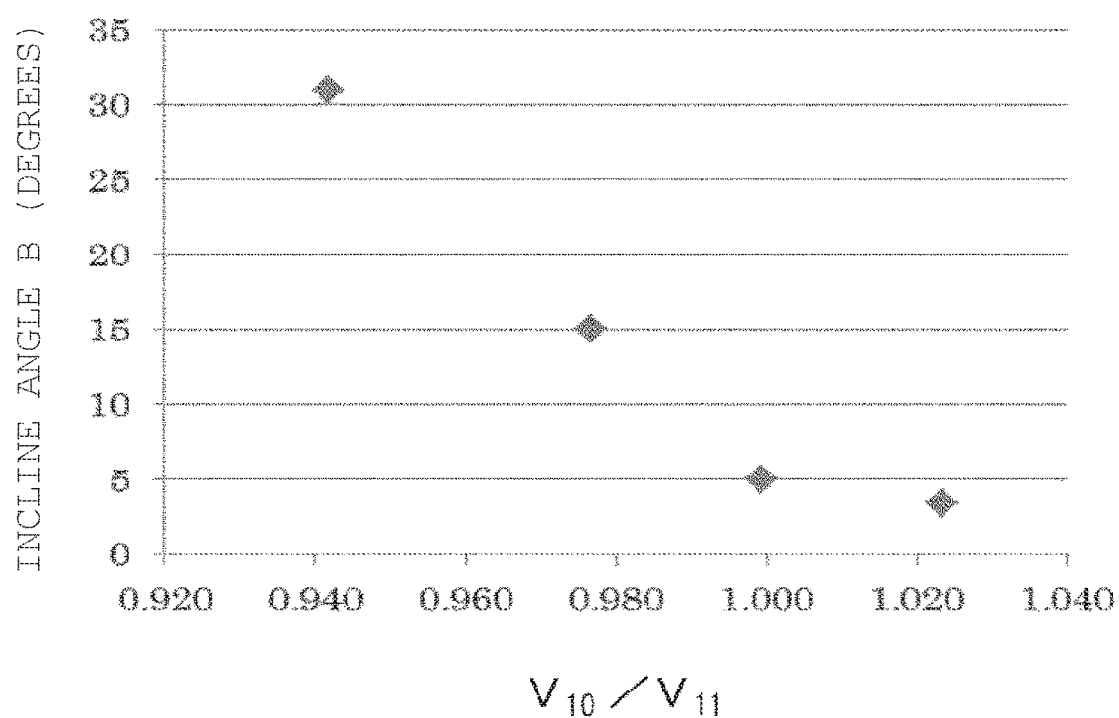
FIG. 15 is a graph showing a simulation result of a relationship between the incline angle B and $V_{10}/V_{11}$ in Example 1 according to an embodiment of the present disclosure.

Subsequently, FIG. 15 shows a simulation result of a relationship between the incline angle B and $V_{10}/V_{11}$. From FIG. 15, when the value of the incline angle B is 5 degrees or less, the value of $V_{10}/V_{11}$ is 0.94 or greater; and thereby, it is possible to prevent an occurrence of the low volume density region. Incidentally, for the sake of convenience, the value of $V_{10}/V_{11}$ is referred to as a "desired value of $V_{10}/V_{11}$". Here, the incline angle B is an angle that is formed between a straight line, which connects a lowermost end and an uppermost end of the inclined surface, and the second surface 12 of the substrate 10. $V_{10}$ is the average volume density value of a region with a length of 1 mm in the first layer 20 from one portion which is 2 mm apart outward from a portion 21' of the first layer 20 which is opposite to the 2A end portion 31 to another portion which is 3 mm apart from the portion 21', and $V_{11}$ is the average volume density value of a region in the first layer 20 which is sufficiently apart inward from the portion 21' of the first layer 20 which is opposite to the 2A end portion 31 (specifically, a region with a length of 1 mm in the first layer 20 from one portion which is 3 mm apart inward from the portion 21' of the first layer 20 which is opposite to the 2A end portion 31 to another portion which is 4 mm apart from the portion 21'). In such case, the value of the incline angle when $V_{10}/V_{11} \geq 0.94$ is satisfied is an optimal incline angle $B_{opt}$ which will be subsequently described.

The optimal incline angle $B_{opt}$ required to set the value of $V_{10}/V_{11}$ to the desired value of $V_{10}/V_{11}$ changes depending on the radius r of the press roll 40, the thickness of the substrate 10, or the thicknesses of the first layer 20 and the second layer 30. Then, in the following conditions shown in Table 1, a simulation was performed with parameters such as the radius r of the press roll 40, the thickness of the first layer 20, the thickness of the second layer 30, the thickness of the substrate 10, and the area densities, the volume densities, and the linear pressures during press of the first layer 20 and the second layer 30 in a laminate structure A (laminate structure suitable for forming a positive electrode member of a lithium ion secondary battery) and a laminate structure B (laminate structure suitable for forming a negative electrode member of the lithium ion secondary battery).

TABLE 1

| | |
|---|---|
| Radius r of press roll | 0.25 m to 0.50 m |
| Thicknesses of first layer and second layer | 50 μm to 125 μm |
| Thickness of substrate | 4 μm to 20 μm |
| Laminate structure A | |
| Area density | 30 mg/cm$^2$ to 50 mg/cm$^2$ |
| Volume density | 3.9 g/cm$^3$ to 4.3 g/cm$^3$ |
| Linear pressure during press | 10 kN/cm to 40 kN/cm |
| Laminate structure B | |
| Area density | 10 mg/cm$^2$ to 30 mg/cm$^2$ |
| Volume density | 3.9 g/cm$^3$ to 4.3 g/cm$^3$ |
| Linear pressure during press | 6 kN/cm to 30 kN/cm |

Figure 16A:
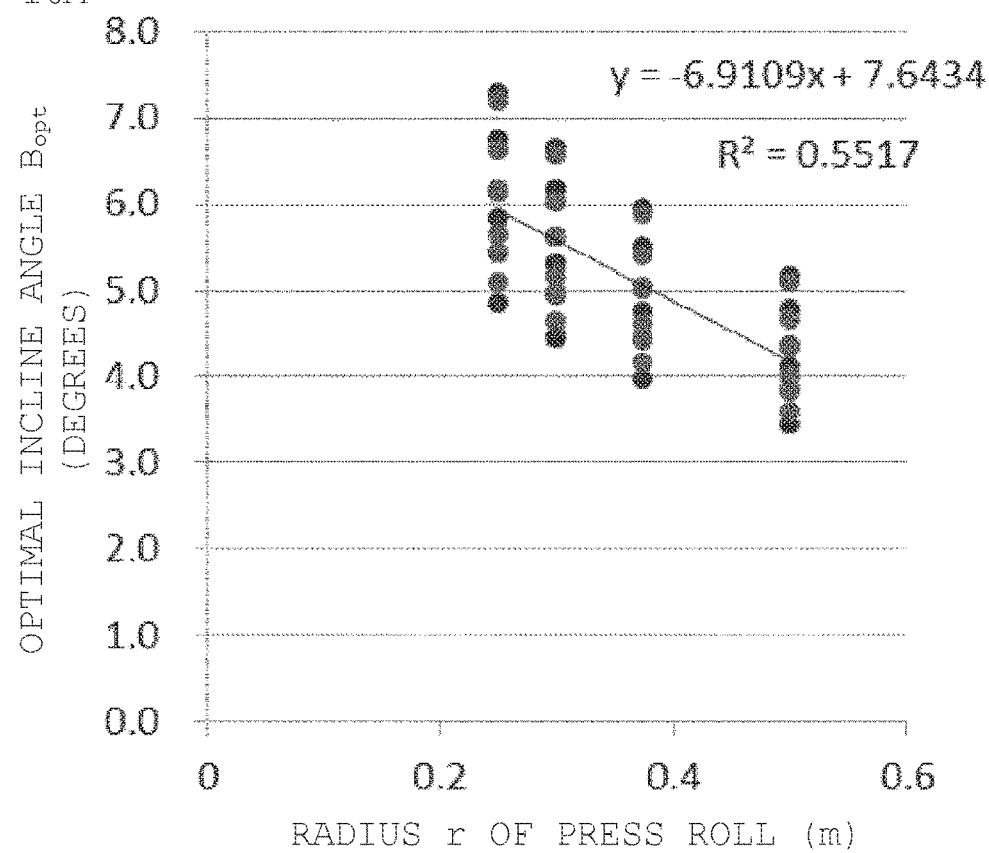
FIG. 16A is a graph showing a simulation result of a relationship between a radius r of the press roll and an optimal incline angle $B_{opt}$ in Example 1.
Figure 16B:
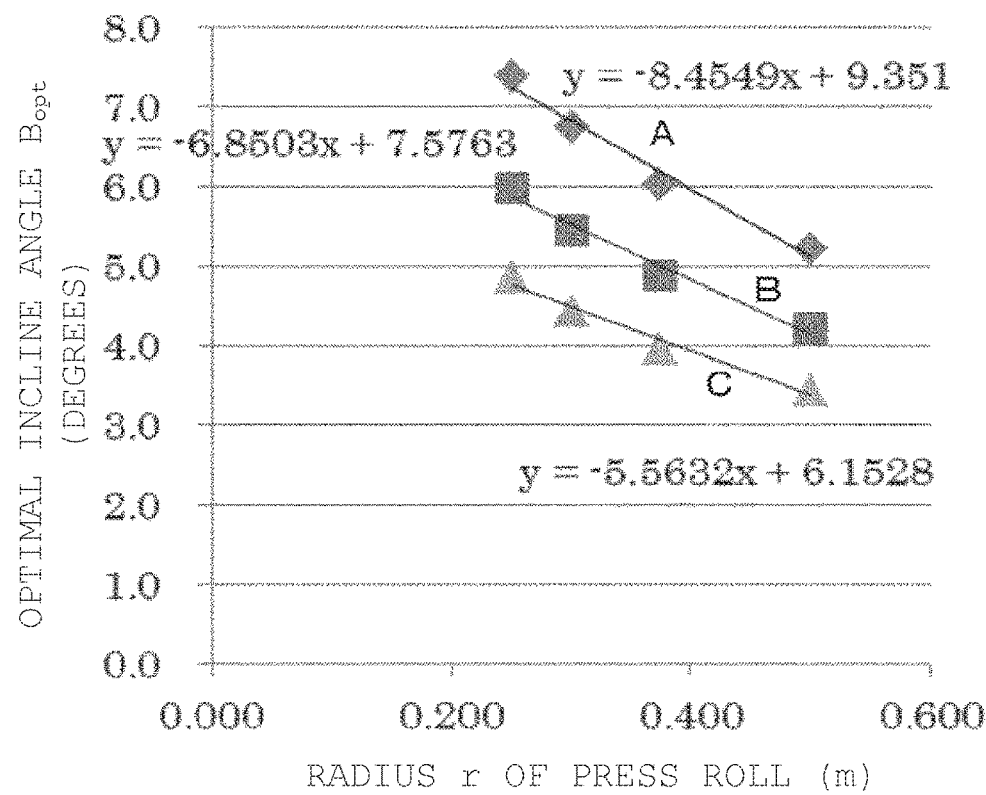
FIG. 16B is a graph showing a graphic result of the relationship between the radius r of the press roll and the maximum value, the median value, and the minimum value of the optimal incline angle $B_{opt}$ shown in FIG. 16A according to an embodiment of the present disclosure.
Figure 17:
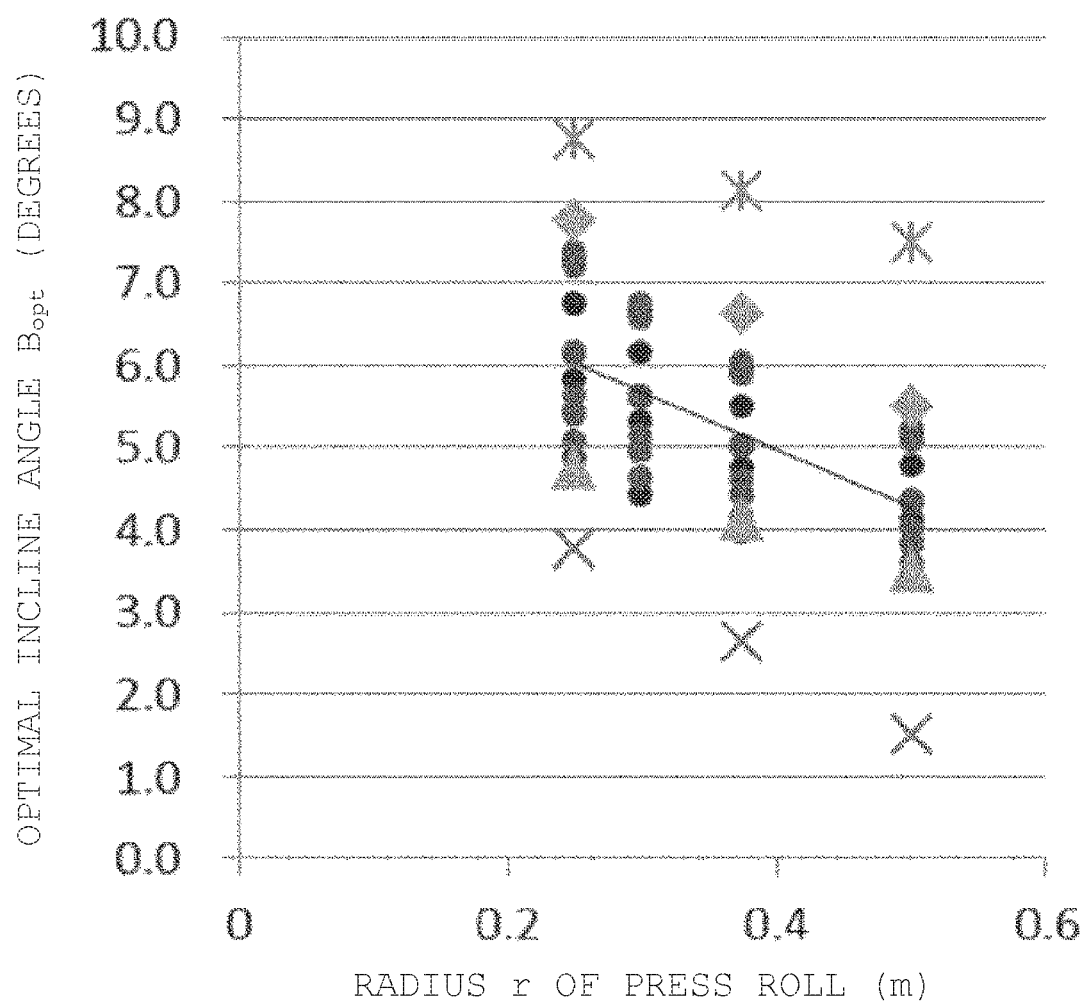
FIG. 17 is a graph where the data shown in FIG. 16A and the result shown in FIG. 16B overlap each other according to an embodiment of the present disclosure.

The obtained relationship between the radius r of the press roll 40 and the optimal incline angle $B_{opt}$ is shown in FIG. 16A, and the result of $B_{opt}=-6.9109r+7.6534$ is obtained where $R^2=0.5517$. Incidentally, a regression line equation is written in a part of the graph. "x" in the regression line equation indicates a value on the horizontal axis of the graph, and "y" indicates a value on the vertical axis of the graph. In addition, FIG. 16B shows a graphic result of the obtained relationship between the radius r of the press roll 40 and the maximum value (refer to "A" of FIG. 16B), the median value (refer to "B" of FIG. 16B), and the minimum value (refer to "C" of FIG. 16B) of the optimal incline angle $B_{opt}$. From the result shown in FIG. 16B, it can be found out that since $B_{opt}=p \times r+q$ is satisfied where $-9 \leq p \leq -5$ and $6 \leq q \leq 10$, it is possible to obtain the laminate structure where the value of $V_{10}/V_{11}$ is the desired value of $V_{10}/V_{11}$. Incidentally, FIG. 17 shows a graph where $B_{opt}=-9 \times r+10$ (1-1) (refer to a plot marked with diamonds in FIG. 17), $B_{opt}=-5 \times r+10$ (1-2) (refer to a plot marked with "*" in FIG. 17), $B_{opt}=-9 \times r+6$ (1-3) (refer to a plot marked with "x" in FIG. 17), $B_{opt}=-5 \times r+6$ (1-4) (refer to a plot marked with triangles in FIG. 17), the data shown in FIG. 16A, and the result shown in FIG. 16B overlap each other, and a region defined by the equation (1-1), the equation (1-2), the equation (1-3), and the equation (1-4) includes all of the data shown in FIG. 16A.

In the laminate structure of Example 1, as illustrated in FIG. 1A, when either one (2B end portion 32) of the 1B end portion 22 and the 2B end portion 32 is positioned closer to the central portion side of the substrate 10 than the other (1B end portion 22), and either one (2B end portion 32) of the 1B end portion 22 and the 2B end portion 32 is referred to as an inner end portion, an end surface 32A of the inner end portion 32 is an inclined surface or has a stair shape or a combined shape of the inclined surface and the stair shape. In the illustrated example, the end surface 32A of the inner end portion 32 is an inclined surface. Then, similar to the above description, it is preferable that the incline angle of the end surface 32A of the inner end portion 32 is 5 degrees or less. Furthermore, when the other (1B end portion 22) of the 1B end portion 22 and the 2B end portion 32 is referred to as an outer end portion, and when $V_{20}$ is the average volume density value of a region of a region with a length of 1 mm in a layer (first layer 20) from one portion which is 2 mm apart outward from a portion 22' of the layer (first layer 20) including the outer end portion 22 opposite to the inner end portion 32 to another portion which is 3 mm apart from the portion 22', and $V_{21}$ is the average volume density value of a region in the layer which is sufficiently inward from the portion 22' of the layer (first layer 20) including the outer end portion 22 opposite to the inner end portion 32 (specifically, a region with a length of 1 mm in the layer (first layer 20) from one portion which is 3 mm apart inward from the portion 22' of the layer (first layer 20) which is opposite to the 2B end portion 32 to another portion which is 4 mm apart from the portion 22'), $V_{20}/V_{21} \geq 0.94$ is satisfied.

Alternatively, in the laminate structure of Example 1, as illustrated in FIG. 1B, when either one (1B end portion 22) of the 1B end portion 22 and the 2B end portion 32 is positioned closer to the central portion side of the substrate 10 than the other (2B end portion 32), and either one (1B end portion 22) of the 1B end portion 22 and the 2B end portion 32 is referred to as an inner end portion, an end surface 22A of the inner end portion 22 is an inclined surface or has a stair shape or a combined shape of the inclined surface and the stair shape. In the illustrated example, the end surface 22A of the inner end portion 22 is an inclined surface. Then, similar to the above description, it is preferable that the incline angle of the end surface 22A of the inner end portion 22 is 5 degrees or less. Furthermore, when the other (2B end portion 32) of the 1B end portion 22 and the 2B end portion 32 is referred to as an outer end portion, and when $V_{20}$ is the average volume density value of a region with a length of 1 mm in a layer (second layer 30) from one portion which is 2 mm apart outward from a portion 32' of the layer (second layer 30) including the outer end portion 32 opposite to the inner end portion 22 to another portion which is 3 mm apart from the portion 32', and $V_{21}$ is the average volume density value of a region in the layer which is sufficiently inward from the portion 32' of the layer (second layer 30) including the outer end portion 32 opposite to the inner end portion 22 (specifically, a region with a length of 1 mm in the layer (second layer 30) from one portion which is 3 mm apart inward from the portion 32' of the second layer 30 which is opposite to the 1B end portion 22 to another portion which is 4 mm apart from the portion 32'), $V_{20}/V_{21} \geq 0.94$ is satisfied.

It is possible to obtain the laminate structure before being pressed, for example, by coating the first surface 11 of the substrate 10 with the first layer 20 and the second surface 12 of the substrate 10 with the second layer 30 using a coating device with a die and a back roll. Incidentally, it is possible to form the first layer 20 and the second layer 30 by intermittently supplying a coating liquid (a positive electrode mixture slurry or a negative electrode mixture slurry) to the die. Here, the thicknesses of the first layer 20 and the second layer 30 are determined by a gap between the die and the back roll, the flow rate of the coating liquid, the lip angle of the die, and the transport speed of the substrate. In addition, the shape of the end surface 31A of the 2A end portion 31 in the second layer 30 is determined mainly by the flow rate of the coating liquid.

Figure 5:
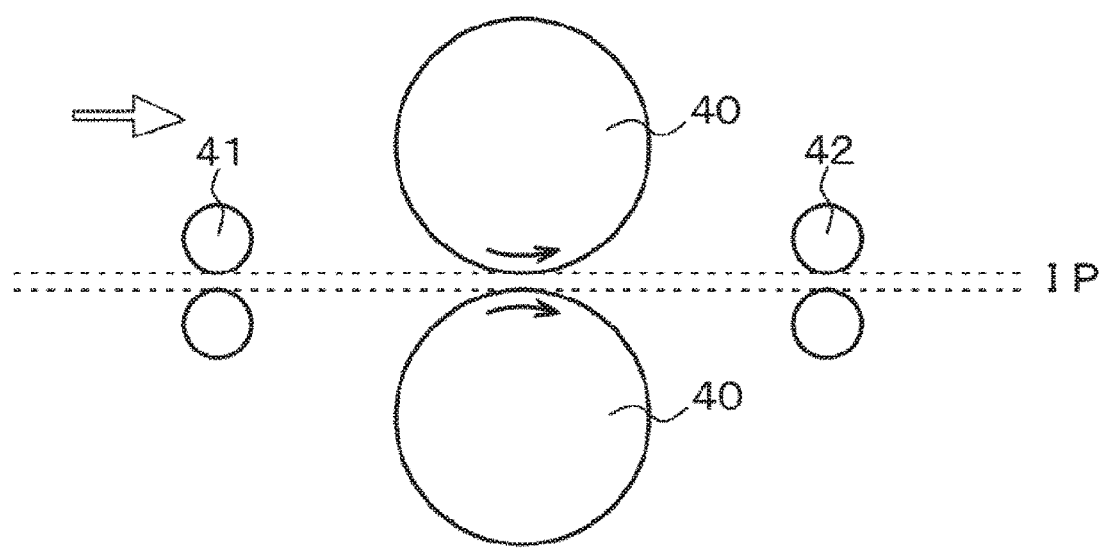
FIG. 5 is a conceptual view of a roll press device which is used in a method for producing a laminate structure according to Example 1 according to an embodiment of the present disclosure.

Firstly, the long laminate structure before being pressed which is obtained in such a manner is preheated, and subsequently, after the first layer 20 and the second layer 30 are continually pressed (pressurized and compressed) by the roll press device (refer to FIG. 5), the long laminate structure is cooled and inspected, and winding is performed on the long laminate structure. Thereafter, various processes are performed on the laminate structure based on the specifications required for the laminate structure and the specifications required for a product in which the laminate structure is used. In FIG. 5, reference number 41 denotes guide rolls that are disposed upstream, and reference number 42 denotes guide rolls that are disposed downstream. In addition, in FIG. 5, a virtual plan IP which the laminate structure includes when the laminate structure passes between the pair of press rolls 40 is indicted by the dotted lines. The laminate structure contact surfaces of the guide rolls 41 and 42 are positioned in the virtual plane IP which the laminate structure includes when the laminate structure passes between the guide rolls 41 and between the guide rolls 42. Namely, when the laminate structure passes between the guide rolls 42 and between the pair of press rolls 40 (or a pair of press rolls 50 to be described later), there is no change in the position of the laminate structure in an upward and downward direction. Similarly, when the laminate structure passes between the pair of press rolls 40 (or the pair of press rolls 50 to be described later) and between the guide rolls 41, there is no change in the position of the laminate structure in the upward and downward direction. Incidentally, also in the examples which will be described hereinafter, it is possible to produce the laminate structure in substantially the same method.

As described above, in the laminate structure of Example 1 or in the laminate structure produced by the method for producing a laminate structure according to Example 1, the end surface of the 2A end portion is an inclined surface; and thereby, it is possible to effectively prevent an occurrence of the low volume density region.

Example 2

Figure 2A:
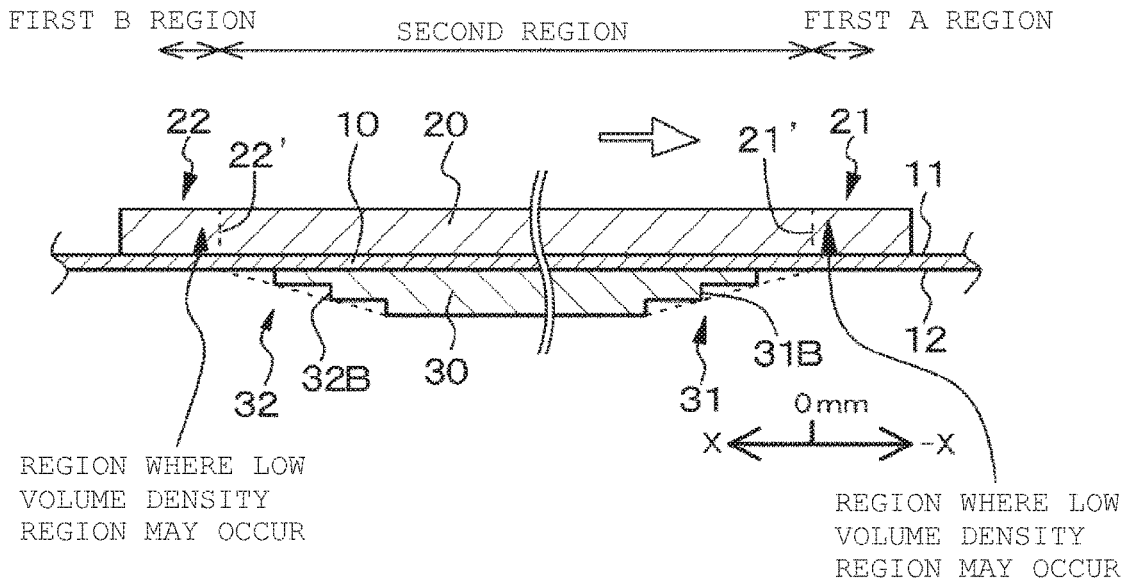
FIGS. 2A and 2B are schematic cross-sectional views of a laminate structure of Example 2 as taken along a length direction thereof.
Figure 2B:
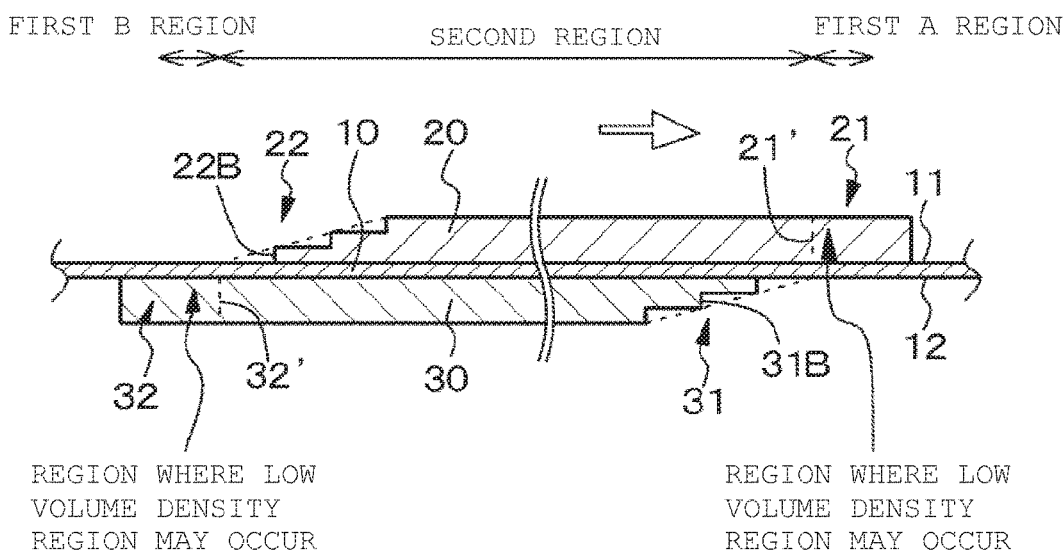
Figure 2C:
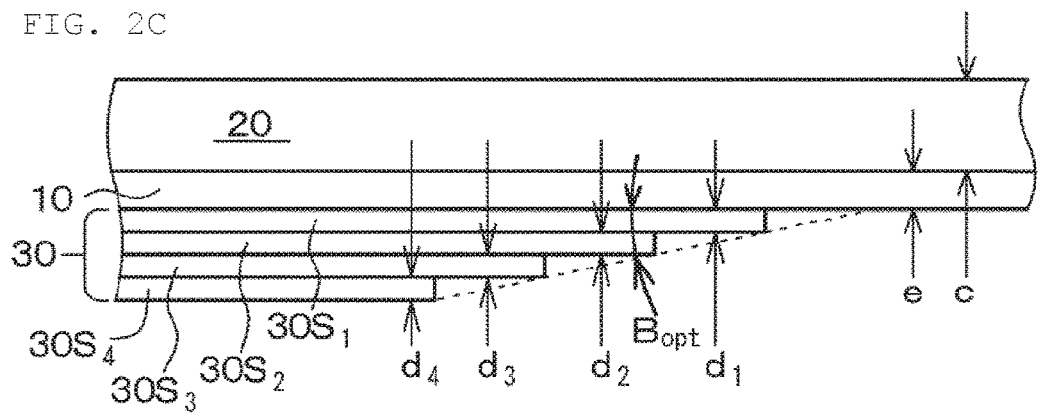
FIG. 2C is a schematic partially enlarged cross-sectional view of the laminate structure of Example 2 as taken along the length direction according to an embodiment of the present disclosure.

Example 2 is a modification of Example 1. In a laminate structure of Example 2, as illustrated in 2A or 2B which is a schematic cross-sectional view of the laminate structure as taken along a length direction thereof, an end surface 31B of the 2A end portion 31 has a stair shape. The incline angle of the end surface 31B of the 2A end portion 31, which is equivalent to a riser plate portion of a stair, is 90 degrees. In addition, it is assumed that a straight line connects a point where a curved line (straight line in some cases and indicated by the dotted line in FIGS. 2A, 2B, 2C, 3A, and 3B) which smoothly connects portions equivalent to stair noses intersects the second surface 12 of the substrate 10 and the portions equivalent to the stair noses, and the incline angle of the entirety of the end surfaces 31B of the 2A end portion 31 indicates an angle which is formed between this straight line and the second surface 12 of the substrate 10. The 2A end portion 31 has a structure where N (where N≥2) layers of second layer segments $30S_n$ are stacked. Incidentally, in the illustrated example, N=3. In addition, FIG. 2C illustrates a schematic partially enlarged cross-sectional view of the laminate structure of Example 2 as taken along the length direction, and in this example, N=4. In FIG. 2C, the hatching lines are not illustrated.

Similar to Example 1, the optimal incline angle $B_{opt}$ required to set the value of $V_{10}/V_{11}$ to the desired value of $V_{10}/V_{11}$ changes depending on the radius r of the press roll 40, the thickness of the substrate 10, or the thicknesses of the first layer 20 and the second layer 30. Then, in the same conditions as those shown in Table 1, a simulation was performed with parameters such as the radius r of the press roll 40, the thickness of the first layer 20, the thickness of the second layer 30, the thickness of the substrate 10, and the area densities, the volume densities, and the linear pressures during press of the first layer 20 and the second layer 30 in the laminate structure A and the laminate structure B. Incidentally, the radius r of the press roll 40 was set to 0.25 m, 0.375 m, and 0.50 m. In addition, in the simulation, N=1.

Figure 18A:
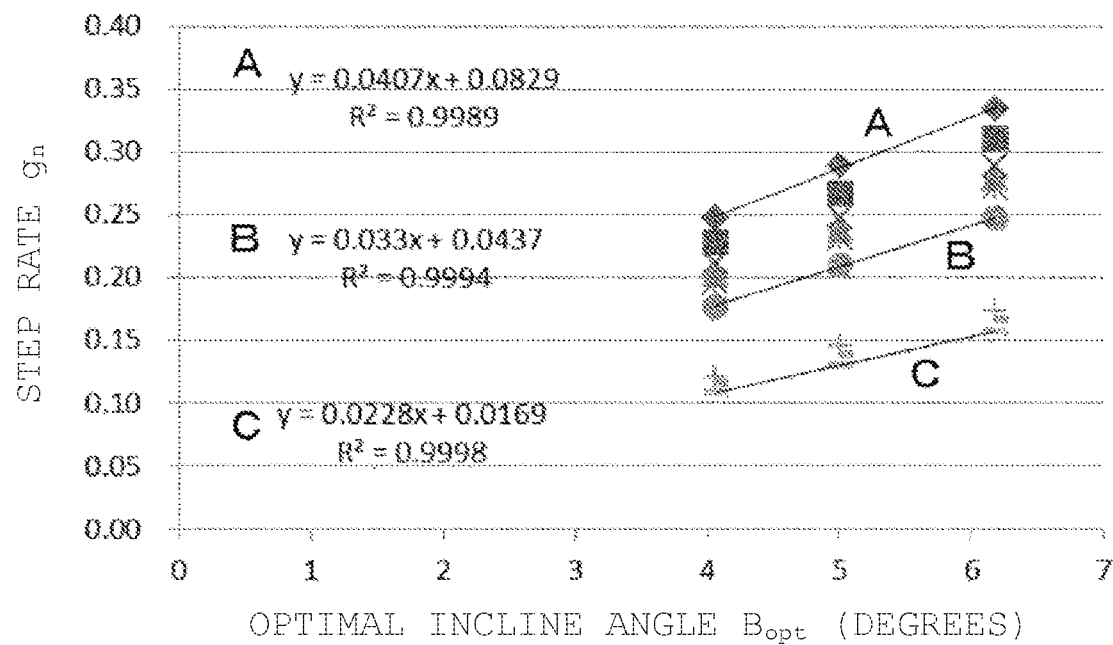
FIGS. 18A and 18B are graphs showing a simulation result of a relationship between a step rate $g_n$ and the optimal incline angle $B_{opt}$ when the radius r of the press roll is set to 0.25 m and 0.375 in in Example 2 according to an embodiment of the present disclosure.
Figure 18B:
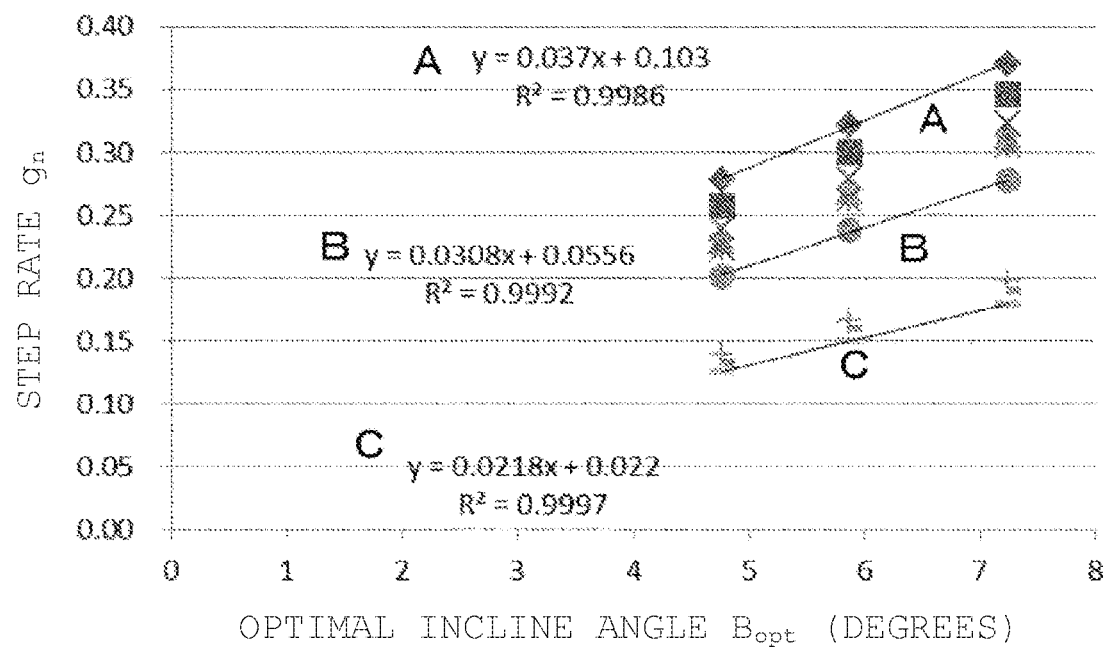
Figure 19:
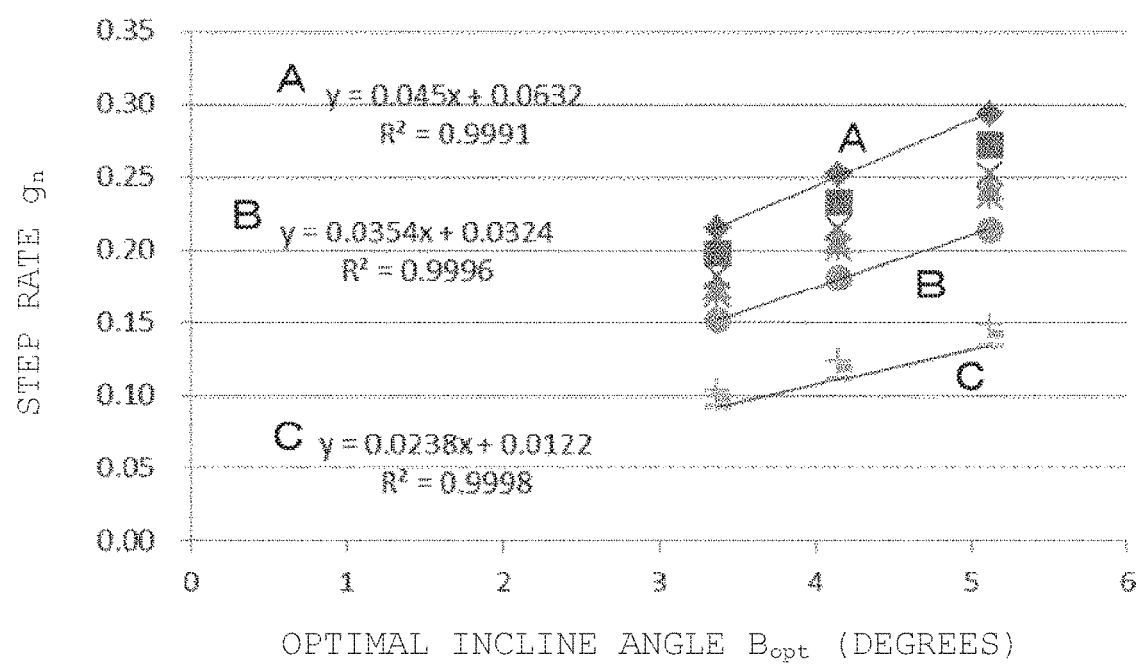
FIG. 19 is a graph showing a simulation result of a relationship between the step rate $g_n$ and the optimal incline angle $B_{opt}$ when the radius r of the press roll is set to 0.50 m in Example 2 according to an embodiment of the present disclosure.

FIGS. 18A, 18B, and 19 illustrate a simulation result of a relationship between the step rate $g_n$ and the optimal incline angle $B_{opt}$ when the radius r of the press roll 40 is set to 0.25 m, 0.375 m, and 0.50 m. Incidentally, as illustrated in FIG. 2C, when the thickness of each of the second layer segments $30S_n$ equivalent to the risers is $d_n$ (where n=1, 2, ... N), the thickness of the first layer 20 is c, the thickness of the substrate 10 is e, and a sum of thicknesses from a first layer of second layer segment $30S_1$ to an $n^{th}$ layer of second layer segment $30S_n$ is $\Sigma d_n$, the step rate $g_n$ is obtained by $g_n = d_n/(\Sigma d_n + c + e)$.

When the radius r of the press roll 40 is 0.25 m, as shown in FIG. 18A, according to the relationship between the optimal incline angle $B_{opt}$ (degrees) and the step rate $g_n$ in the end surface of the 2A end portion, the <maximum value> (represented by "A" in FIG. 18A) is represented by $g_n=0.0407B_{opt}+0.0829$ where $R^2=0.9989$, the <median value> (represented by "B" in FIG. 18A) is represented by $g_n=0.0330B_{opt}+0.0437$ where $R^2=0.9994$, and the <minimum value> (represented by "C" in FIG. 18A) is represented by $g_n=0.0228B_{opt}+0.0169$ where $R^2=0.9998$.

In addition, when the radius r of the press roll 40 is 0.375 m, as shown in FIG. 18B, according to the relationship between the optimal incline angle $B_{opt}$ (degrees) and the step rate $g_n$ in the end surface of the 2A end portion, the <maximum value> (represented by "A" in FIG. 18B) is represented by $g_n=0.0370B_{opt}+0.103$ where $R^2=0.9986$, the <median value> (represented by "B" in FIG. 18B) is represented by $g_n=0.0308B_{opt}+0.0556$ where $R^2=0.9992$, and the <minimum value> (represented by "C" in FIG. 18B) is represented by $g_n=0.0218B_{opt}+0.0220$ where $R^2=0.9997$.

Furthermore, when the radius r of the press roll 40 is 0.50 m, as shown in FIG. 19, according to the relationship between the optimal incline angle $B_{opt}$ (degrees) and the step rate $g_n$ in the end surface of the 2A end portion, the <maximum value> (represented by "A" in FIG. 19) is represented by $g_n=0.0450B_{opt}+0.0632$ where $R^2=0.9991$, the <median value> (represented by "B" in FIG. 19) is represented by $g_n=0.0354B_{opt}+0.0324$ where $R^2=0.9996$, and the <minimum value> (represented by "C" in FIG. 19) is represented by $g_n=0.0238B_{opt}+0.0122$ where $R^2=0.9998$.

Figure 20A:
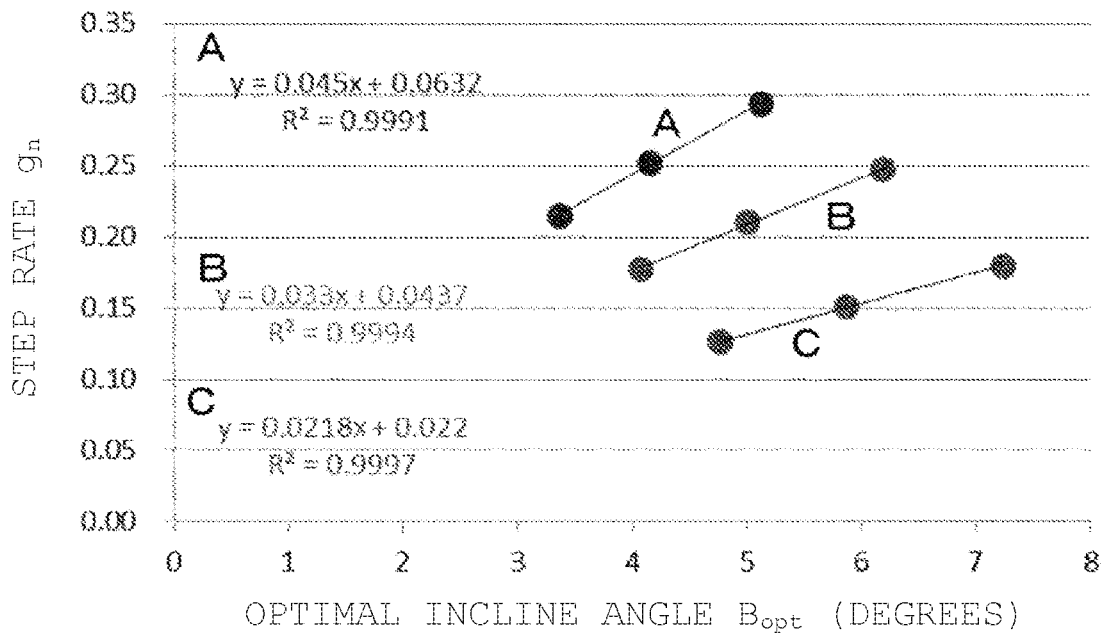
FIG. 20A is a graph showing a graphic result of the relationship between the radius r of the press roll and the maximum value, the median value, and the minimum value of the optimal incline angle $B_{opt}$ in Example 2.
Figure 20B:
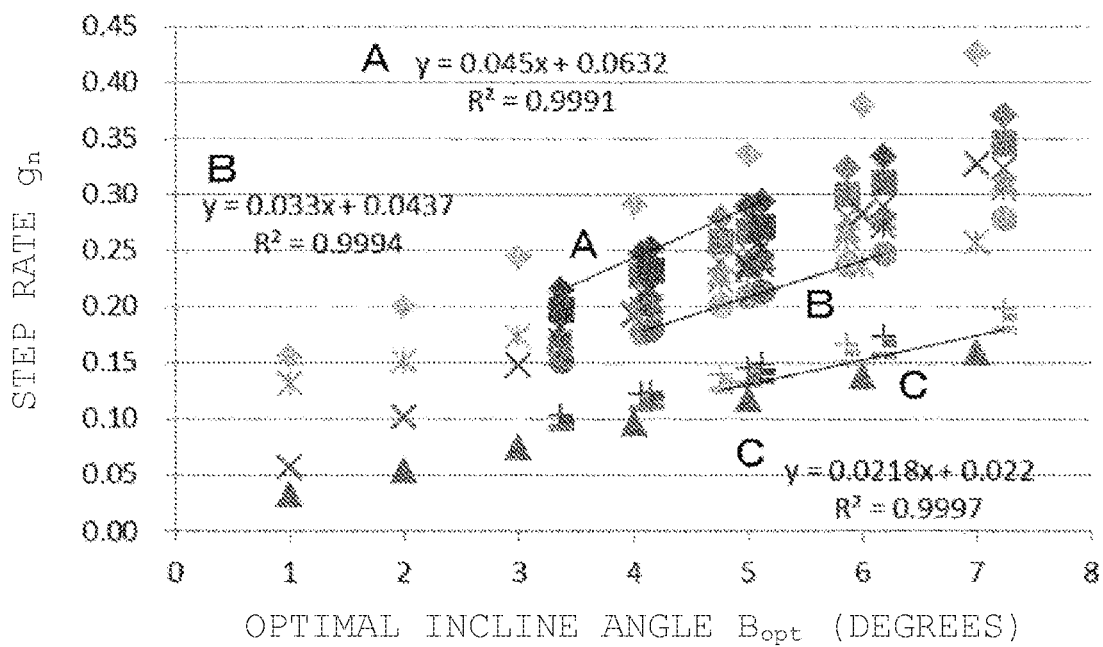
FIG. 20B is a graph where the data illustrated in FIG. 20A and the data illustrated in FIGS. 18A, 18B, and 19 overlap each other according to an embodiment of the present disclosure.

FIG. 20A shows a graphic result of the obtained relationship between the radius r of the press roll 40 and the maximum value (represented by "A" in FIG. 20A), the median value (represented by "B" in FIG. 20A), and the minimum value (represented by "C" in FIG. 20A) of the optimal incline angle $B_{opt}$. From the result shows in FIG. 20A, it can be found out that since $0.022B_{opt}+0.022 \leq g_n < 0.045B_{opt}+0.063$ is satisfied, it is possible to obtain the laminate structure where the value of $V_{10}/V_{11}$ is the desired value of $V_{10}/V_{11}$. Incidentally, FIG. 20B shows a graph where $g_n=0.045B_{opt}+0.063$ (2-1) (refer to a plot marked with diamonds in FIG. 20B), $g_n=0.022B_{opt}+0.063$ (refer to a plot marked with "*" in FIG. 20B), $g_n=0.045B_{opt}+0.022$ (2-3) (refer to a plot marked with "x" in FIG. 20B), $g_n=0.022B_{opt}+0.022$ (2-4) (refer to a plot marked with triangles in FIG. 20B), and the data illustrated in FIGS. 18A, 18B, and 19 overlap each other, and a region interposed between the plot represented by the equation (2-1) and the plot represented by the equation (2-4) includes all of the data illustrated in FIGS. 18A, 18B, and 19.

Figure 21A:
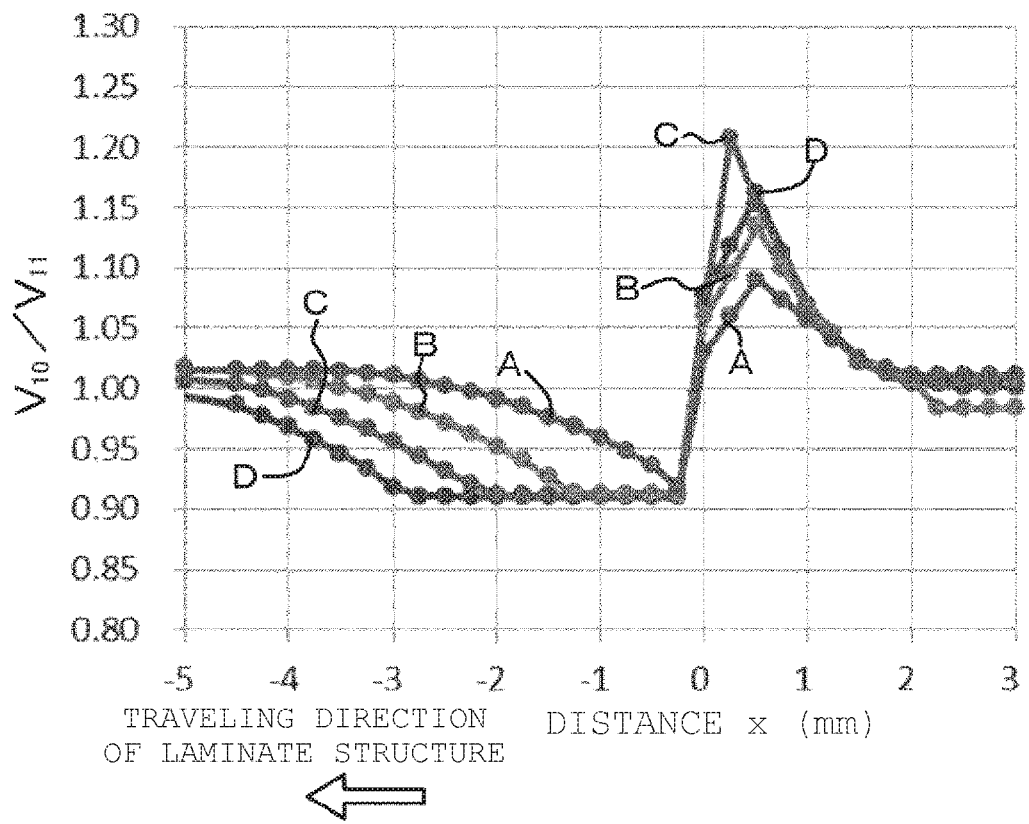
FIG. 21A is a graph showing a simulation result of a relationship among the step rate $g_n$, a volume density, and a distance X from a portion of a first layer which is opposite to a 2A end portion in Example 2.

FIG. 21A shows a simulation result of a relationship among the step rate $g_n$, the volume density, and a distance X from the portion 21' of the first layer 20 which is opposite to the 2A end portion 31.

Figure 21B:
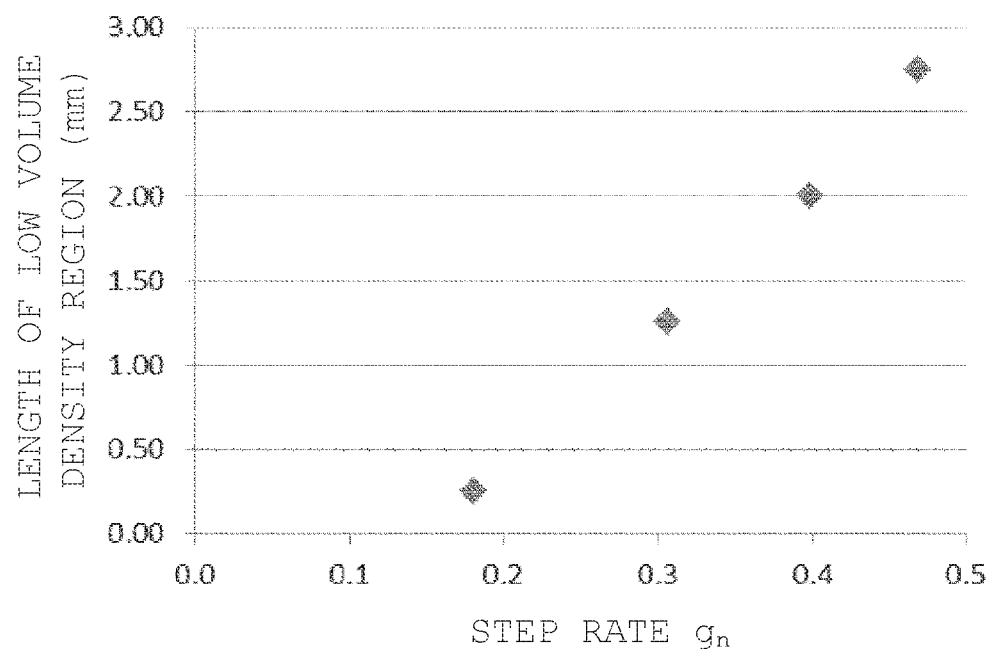
FIG. 21B is a graph showing a relationship between the step rate $g_n$ and the length of a low volume density region according to an embodiment of the present disclosure.

In addition, FIG. 21B shows a relationship between the step rate $g_n$ and the length of the low volume density region. Here, the length of the low volume density region is defined as a length of 3 mm from X=0 mm to X=−3 mm. Incidentally, the numbers which are the basis of each step rate are as follows.

Step rate $g_n=0.47$ (refer to "D" of FIG. 21).
$d_n=100$ μm
$\Sigma d_n=100$ μm
c=100 μm
e=10 μm
Step rate $g_n=0.40$ (refer to "C" of FIG. 21).
$d_n=75$ μm
$\Sigma d_n=75$ μm
c=100 μm
e=0 μm
Step rate $g_n=0.31$ (refer to "B" of FIG. 21).
$d_b=50$ μm
$\rho d_n=50$ μm
c=100 μm
e=10 μm
Step rate $g_n=0.18$ (refer to "A" of FIG. 21).
$d_n=25$ μm
$\Sigma d_n=25$ μm
c=100 μm
e=10 μm From the result shown in FIG. 21B, it is possible to achieve the desired value of the $V_{10}/V_{11}$ by setting the step rate $g_n$ to 0.15 or less. Incidentally, when the value of c, the value of e, and the total thickness of the second layer are determined, the value of N required to set the step rate $g_n$ to 0.15 or less is determined and the thickness $d_n$ of each of the second layer segments $30S_n$ is determined. For example, in a case where the radius r of the pair of press rolls 40 is 0.375 m, the thickness (c) of the substrate 10 is 10 μm, and the thickness (e) of the first layer 20 and the thickness of the second layer 30 are 100 μm, N=4, and $d_1=20$ μm, $d_2=23$ μm, $d_3=27$ μm, and $d_4=30$ μm.

Figure 3A:
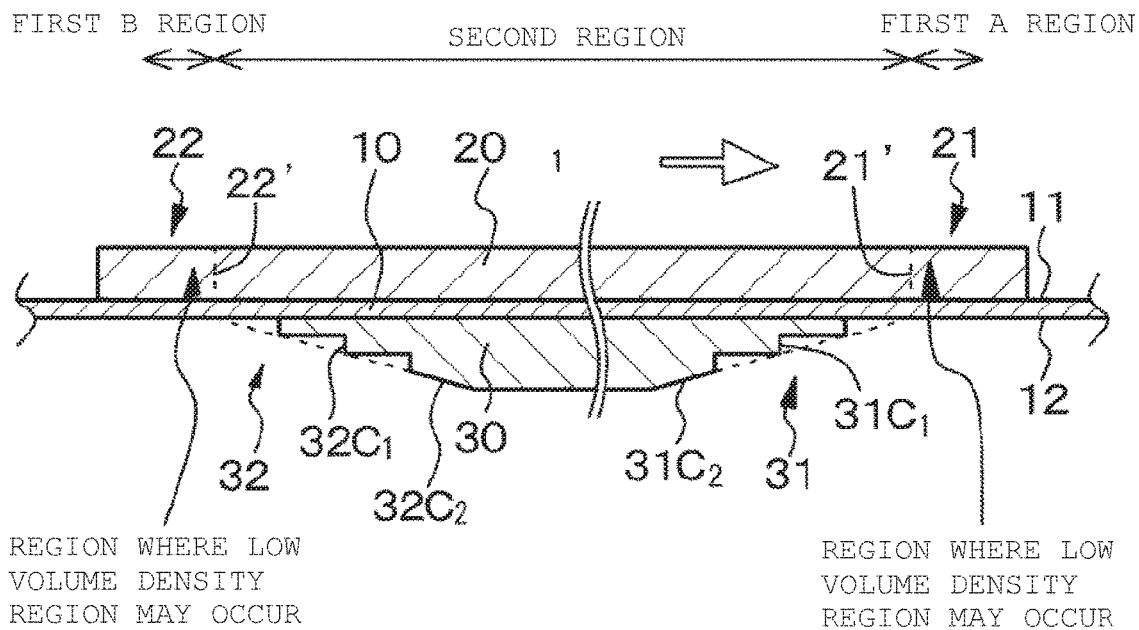
FIGS. 3A and 3B are schematic cross-sectional views of a laminate structure in a modification example of Example 2 as taken along a length direction thereof according to an embodiment of the present disclosure.
Figure 3B:
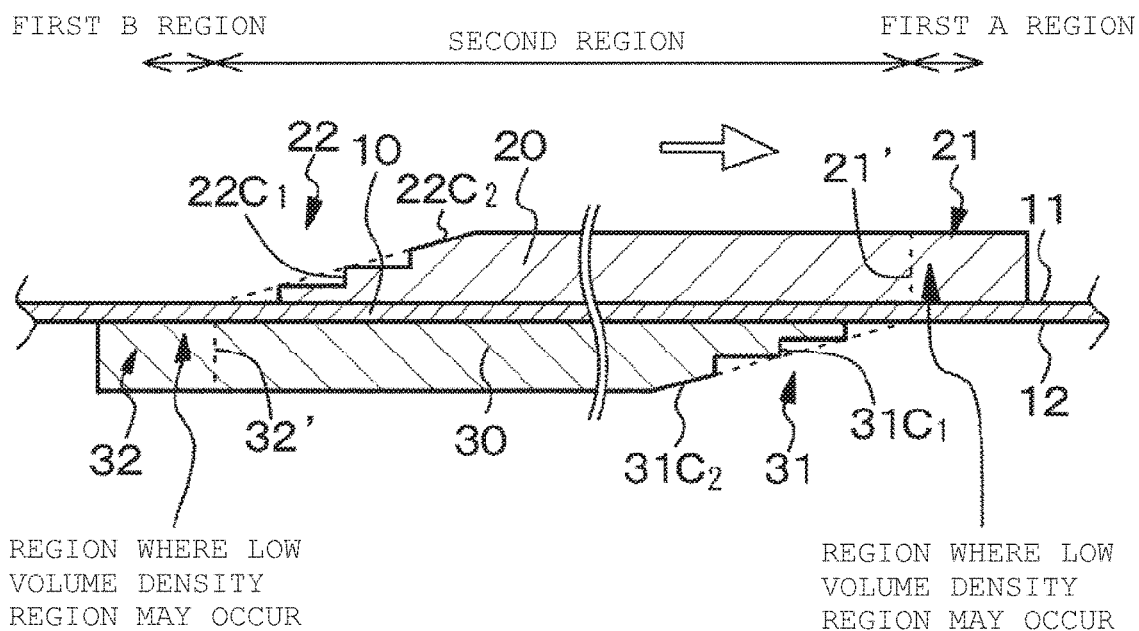

Incidentally, as illustrated in FIG. 3A or 3B which is a schematic cross-sectional view of a laminate structure as taken along a length direction thereof, an end surface of the 2A end portion 31 may have a combined shape of an inclined surface $31C_2$ and a stair shape $31C_1$. In a modification example of Example 2, in a case where the end surface 31A of the 2A end portion 31 has a combined shape of a stair shape (N=3) with three steps and an inclined surface with an incline angle of 5 degrees, a result of a simulation performed to figure out the size of a gap occurring between the surface of the press roll and the surface of the second layer in the region of transition from the 1A region to the second region is shown at the top of FIG. 22, and it is found that there is almost no gap. In addition, in a case where the end surface 31A of the 2A end portion 31 is an inclined surface with an incline angle of 5 degrees, a result of a simulation performed to figure out the size of the gap between the surface of the press roll and the surface of the second layer in the region of transition from the 1A region to the second region is shown in at the bottom of FIG. 22.

Example 3

Example 3 relates to the roll press device of the present disclosure and a method for producing a laminate structure according to a second embodiment of the present disclosure. Except for a difference in the shape of the end surface 31A of the 2A end portion 31, a laminate structure of Example 3 has the same configuration and structure as those of the laminate structure of Example 1. Namely, in the laminate structure of Example 3, as illustrated in FIG. 4A or 4B which is a schematic cross-sectional view of the laminate structure as taken along a length direction thereof, the incline angle of an end surface 31D of the 2A end portion 31, which is equivalent to a riser plate portion of a stair, is 90 degrees.

The roll press device (a roll press device for producing an electrode for a secondary battery, a roll press device for producing an electrode member for a secondary battery, or a roll press device for producing a positive electrode member or a negative electrode member for a secondary battery) of Example 3 includes the pair of press rolls 50, and auxiliary rolls 51 and 52 that are disposed upstream, downstream, or upstream and downstream of the pair of press rolls 50, and the roll press device presses (pressurizes and compresses) the laminate structure by allowing the laminate structure to pass between the pair of press rolls 50. Then, the laminate structure contact surfaces of the auxiliary rolls 51 and 52 are positioned above or below the virtual plane IP (indicated by the dotted lines in the drawings) which the laminate structure includes when the laminate structure passes between the pair of press rolls 50. It is possible to control the positions of the auxiliary rolls 51 and 52 in the upward and downward direction by a well-known method (for example, a method for controlling the positions of the auxiliary rolls 51 and 52 in the upward and downward direction using a position detector and a hydraulic cylinder or an air cylinder based on a detection result of the position detector).

In addition, in the method for producing a laminate structure according to Example 3, the roll press device including the pair of press rolls 50 and the auxiliary rolls 51 and 52 that are disposed upstream, downstream, or upstream and downstream of the pair of press rolls 50 is used, the laminate structure contact surfaces of the auxiliary rolls 51 and 52 are positioned above or below the virtual plane IP which the laminate structure includes when the laminate structure passes between the pair of press rolls 50, and the laminate structure passes between the pair of press rolls 50, so that the laminate structure is pressed (pressurized and compressed).

Figure 6A:
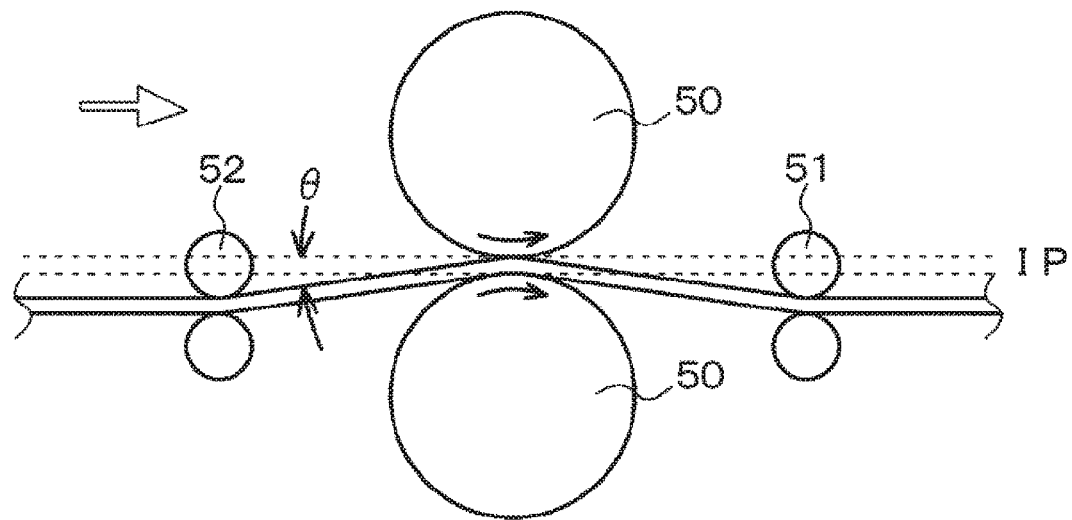
FIGS. 6A and 6B are conceptual views of a roll press device of Example 3 which is used in a method for producing a laminate structure according to Example 3 according to an embodiment of the present disclosure.
Figure 6B:
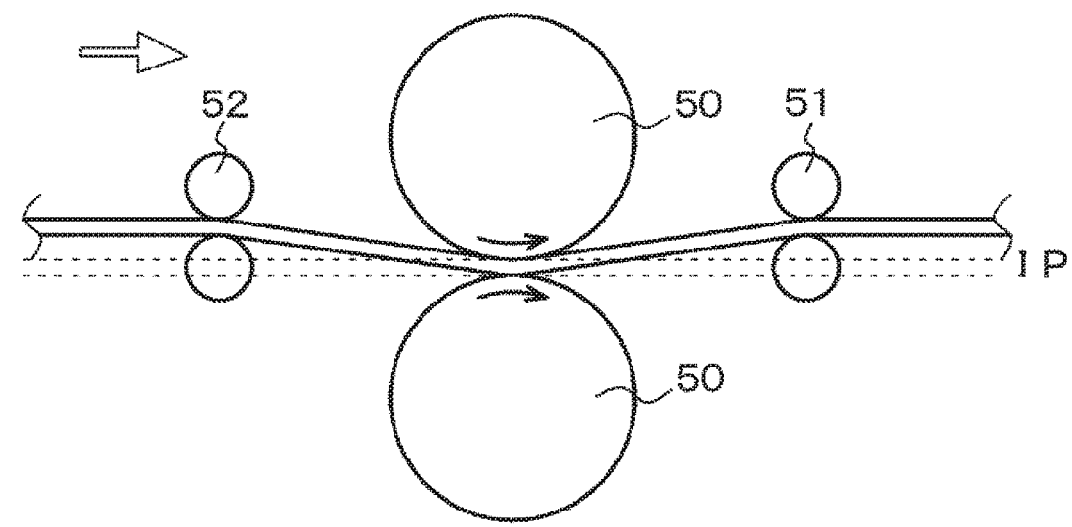

In the roll press device of Example 3 illustrated in FIGS. 6A and 6B, a pair of the auxiliary rolls 51 are disposed upstream of the pair of press rolls 50, and a pair of the auxiliary rolls 52 are disposed downstream of the pair of press rolls 50. In addition, in the roll press device of Example 3 illustrated in FIGS. 7A and 7B, one auxiliary roll

51 is disposed upstream of the pair of press rolls 50, and one auxiliary roll 52 is disposed downstream of the pair of press rolls 50.

Then, in the example illustrated in FIGS. 6A and 7A, in the laminate structure, the first layer 20 is positioned above, the second layer 30 is positioned below, and the laminate structure contact surfaces of the auxiliary rolls 51 and 52 are positioned below the virtual plane IP which the laminate structure includes when the laminate structure passes between the pair of press rolls 50. In addition, in the example illustrated in FIGS. 6B and 7B, in the laminate structure, the first layer 20 is positioned below, the second layer 30 is positioned above, and the laminate structure contact surfaces of the auxiliary rolls 51 and 52 are positioned above the virtual plane IP which the laminate structure includes when the laminate structure passes between the pair of press rolls 50.

Figure 7A:
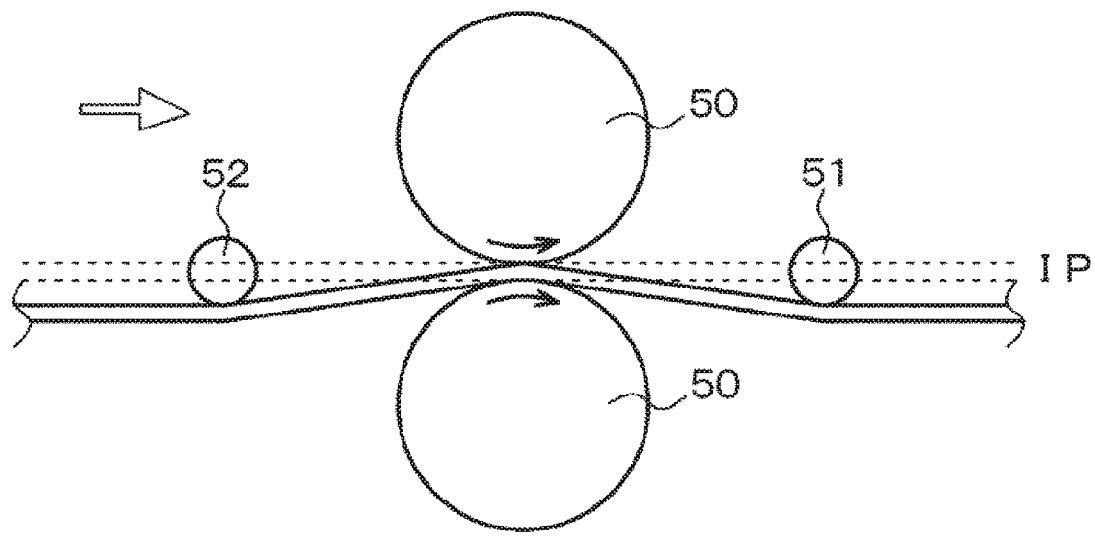
FIGS. 7A and 7B are conceptual views of a roll press device in a modification example of Example 3 which is used in the method for producing a laminate structure according to Example 3 according to an embodiment of the present disclosure.
Figure 7B:
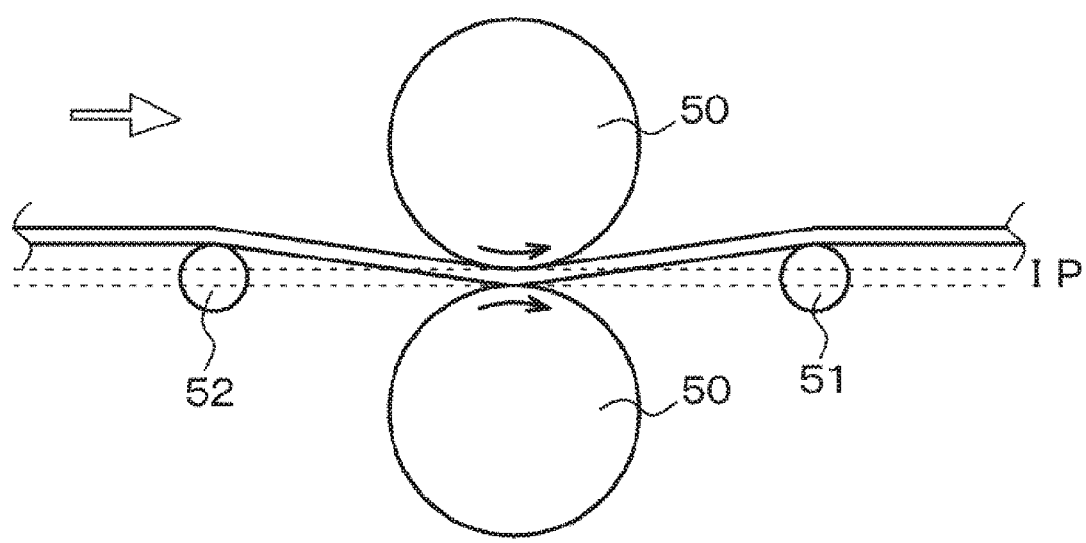

The roll press device of Example 3 illustrated in FIGS. 6A and 7A is a roll press device suitable for pressing the laminate structure illustrated in FIG. 4A. In addition, the roll press device of Example 3 illustrated in FIGS. 6B and 7B is a roll press device suitable for pressing a laminate structure having a structure obtained by inverting the laminate structure illustrated in FIG. 4A.

Figure 8A:
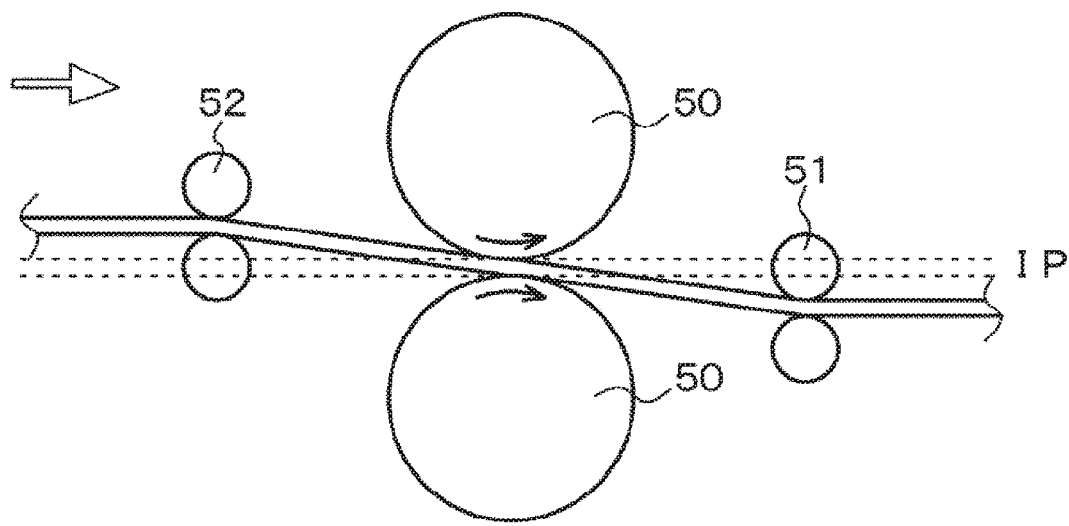
FIGS. 8A and 8B are conceptual views of a roll press device in another modification example of Example 3 which is used in the method for producing a laminate structure according to Example 3 according to an embodiment of the present disclosure.
Figure 8B:
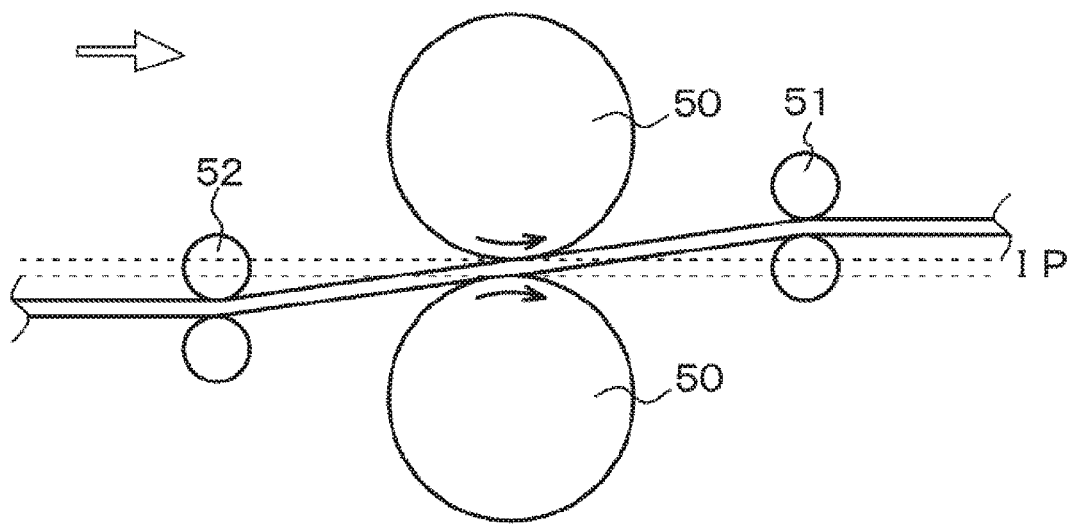

In the roll press device of Example 3 illustrated in FIGS. 8A and 8B, the pair of auxiliary rolls 51 are disposed upstream of the pair of press rolls 50, and the pair of auxiliary rolls 52 are disposed downstream of the pair of press rolls 50. In addition, in the roll press device of Example 3 illustrated in FIGS. 9A and 9B, one auxiliary roll 51 is disposed upstream of the pair of press rolls 50, and one auxiliary roll 52 is disposed downstream of the pair of press rolls 50.

Then, in the example illustrated in FIGS. 8A and 9A, in the laminate structure, the first layer 20 is positioned below, the second layer 30 is positioned above, and the laminate structure contact surface of the auxiliary roll 51 is positioned below and the laminate structure contact surface of the auxiliary roll 52 is positioned above the virtual plane IP which the laminate structure includes when the laminate structure passes between the pair of press rolls 50. In addition, in the example illustrated in FIGS. 8B and 9B, in the laminate structure, the first layer 20 is positioned above, the second layer 30 is positioned below, and the laminate structure contact surface of the auxiliary roll 51 is positioned above and the laminate structure contact surface of the auxiliary roll 52 is positioned below the virtual plane IP which the laminate structure includes when the laminate structure passes between the pair of press rolls 50.

Figure 9A:
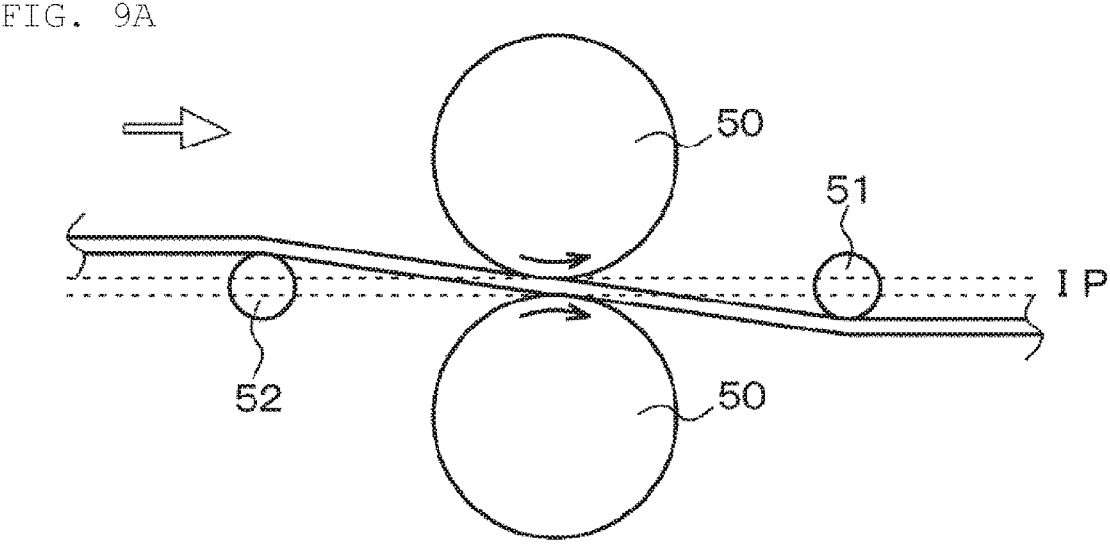
FIGS. 9A and 9B are conceptual views of a roll press device in further another modification example of Example 3 which is used in the method for producing a laminate structure according to Example 3 according to an embodiment of the present disclosure.
Figure 9B:
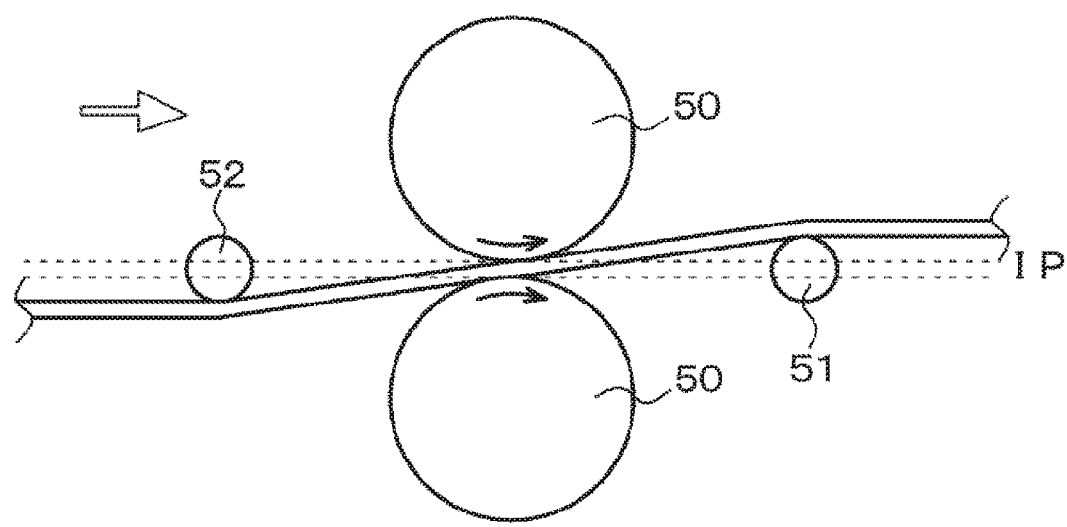

The roll press device of Example 3 illustrated in FIGS. 8A and 9A is a roll press device suitable for pressing a laminate structure having a structure obtained by inverting the laminate structure illustrated in FIG. 4B. In addition, the roll press device of Example 3 illustrated in FIGS. 8B and 9B is a roll press device suitable for pressing the laminate structure illustrated in FIG. 4B.

Figure 10A:
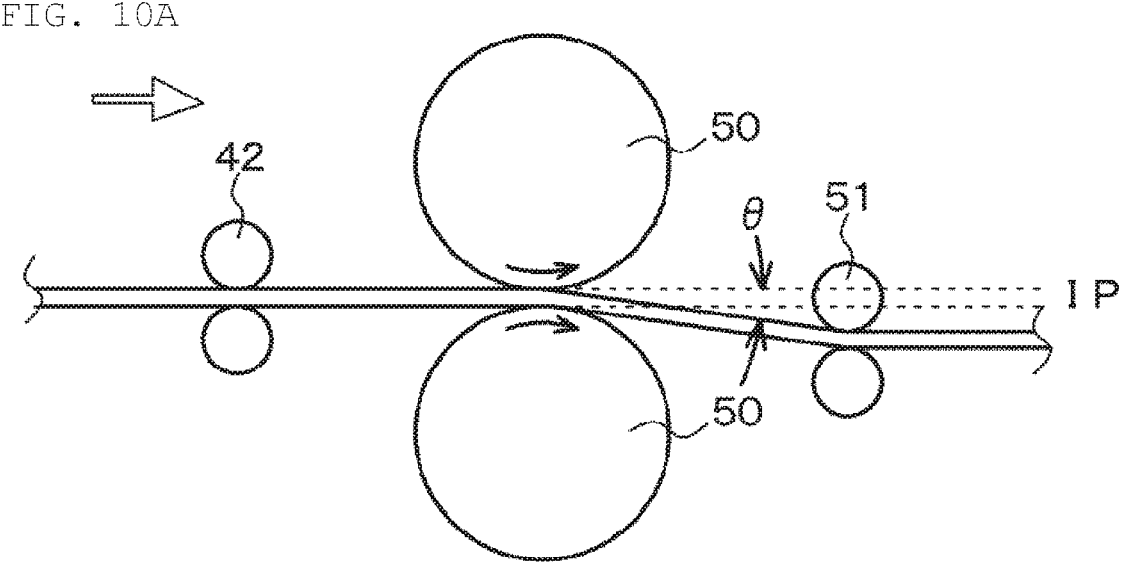
FIGS. 10A and 10B are conceptual views of a roll press device in further another modification example of Example 3 which is used in the method for producing a laminate structure according to Example 3 according to an embodiment of the present disclosure.
Figure 10B:
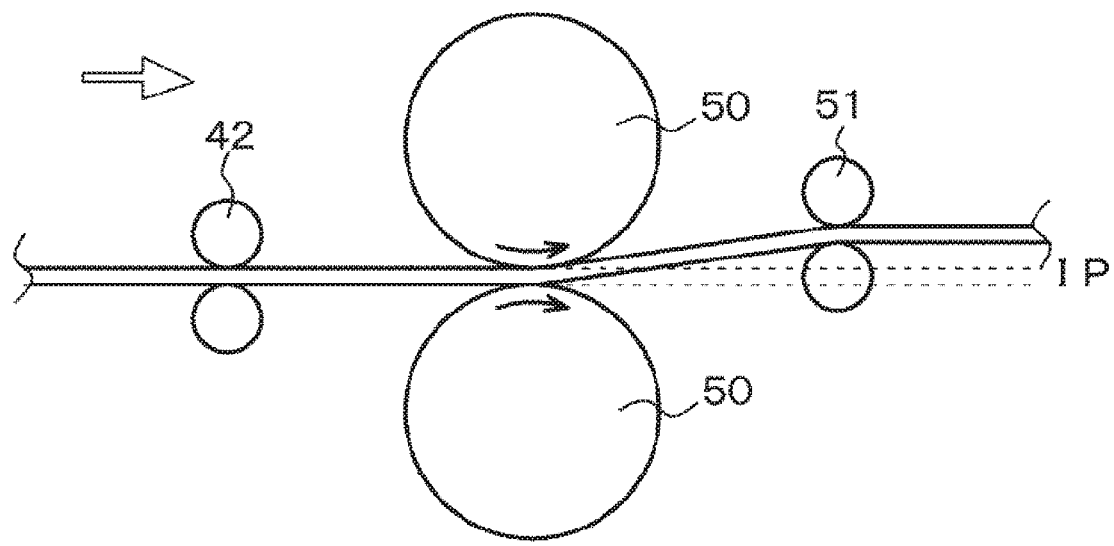

In the roll press device of Example 3 illustrated in FIGS. 10A and 10B, the pair of auxiliary rolls 51 are disposed upstream of the pair of press rolls 50, and a pair of the guide rolls 42 are disposed downstream of the pair of press rolls 50. In addition, in the roll press device of Example 3 illustrated in FIGS. 11A and 11B, one auxiliary roll 51 is disposed upstream of the pair of press rolls 50, and the pair of guide rolls 42 are disposed downstream of the pair of press rolls 50.

Then, in the example illustrated in FIGS. 10A and 11A, in the laminate structure, the first layer 20 is positioned above, the second layer 30 is positioned below, and the laminate structure contact surface of the auxiliary roll 51 is positioned below the virtual plane IP which the laminate structure includes when the laminate structure passes between the pair of press rolls 50. In addition, in the example illustrated in FIGS. 10B and 11B, in the laminate structure, the first layer 20 is positioned below, the second layer 30 is positioned above, and the laminate structure contact surface of the auxiliary roll 51 is positioned above the virtual plane IP which the laminate structure includes when the laminate structure passes between the pair of press rolls 50.

Figure 11A:
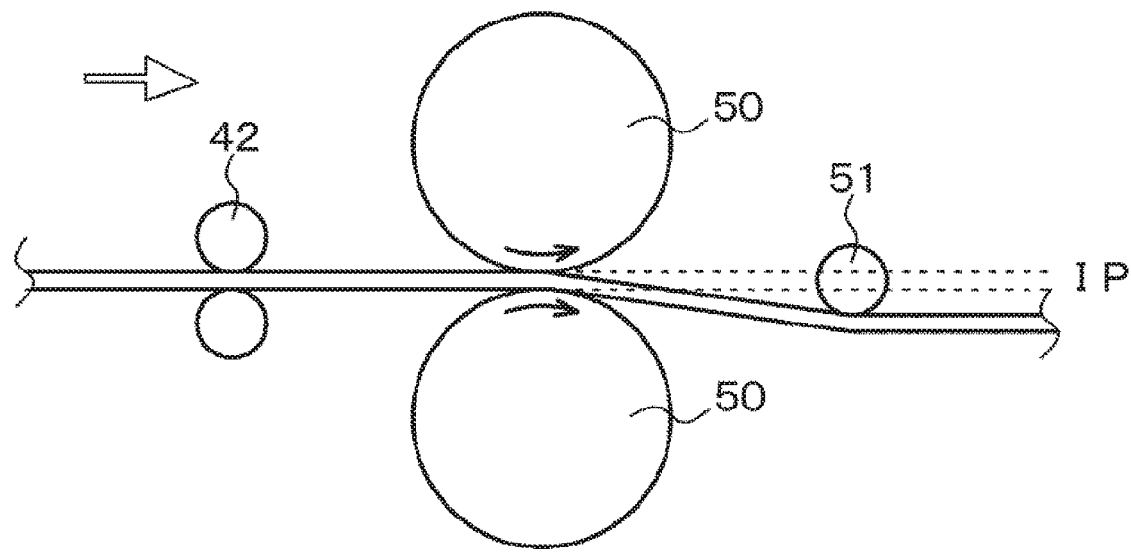
FIGS. 11A and 11B are conceptual views of a roll press device in further another modification example of Example 3 which is used in the method for producing a laminate structure according to Example 3 according to an embodiment of the present disclosure.
Figure 11B:
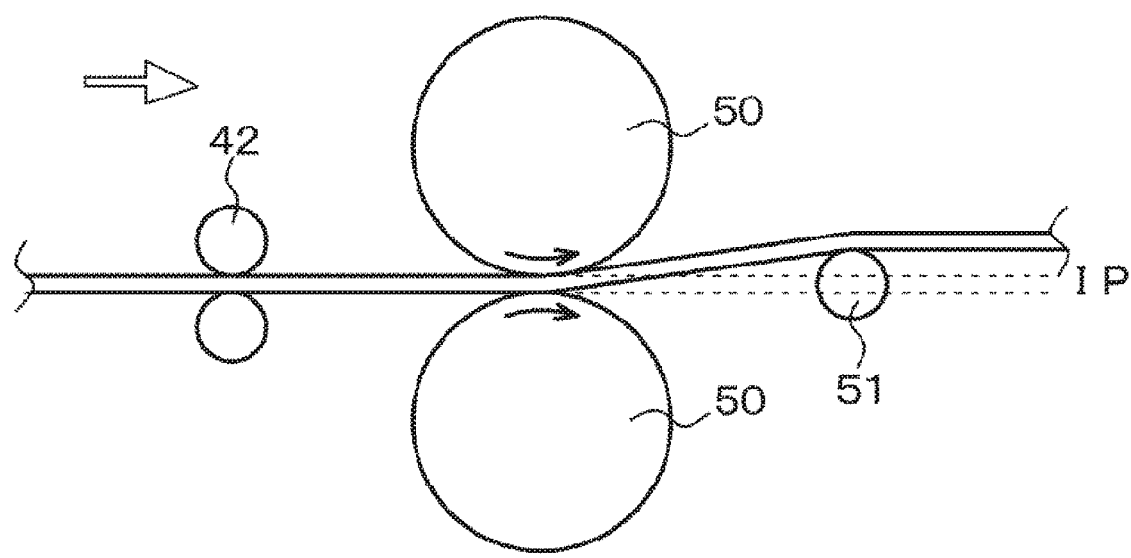

The roll press device of Example 3 illustrated in FIGS. 10A and 11A is a roll press device suitable for pressing the laminate structure illustrated in FIG. 4A. In addition, the roll press device of Example 3 illustrated in FIGS. 10B and 11B is a roll press device suitable for pressing the laminate structure having the structure obtained by inverting the laminate structure illustrated in FIG. 4A.

Alternatively, in the example illustrated in FIGS. 10A and 11A, in the laminate structure, the first layer 20 is positioned below, the second layer 30 is positioned above, and the laminate structure contact surface of the auxiliary roll 51 is positioned below the virtual plane IP which the laminate structure includes when the laminate structure passes between the pair of press rolls 50. In addition, in the example illustrated in FIGS. 10B and 11B, in the laminate structure, the first layer 20 is positioned above, the second layer 30 is positioned below, and the laminate structure contact surface of the auxiliary roll 51 is positioned above the virtual plane IP which the laminate structure includes when the laminate structure passes between the pair of press rolls 50.

Then, the roll press device of Example 3 illustrated in FIGS. 10A and 11A is a roll press device suitable for pressing the laminate structure having the structure obtained by inverting the laminate structure illustrated in FIG. 4B. In addition, the roll press device of Example 3 illustrated in FIGS. 10B and 11B is a roll press device suitable for pressing the laminate structure illustrated in FIG. 4B.

Figure 12A:
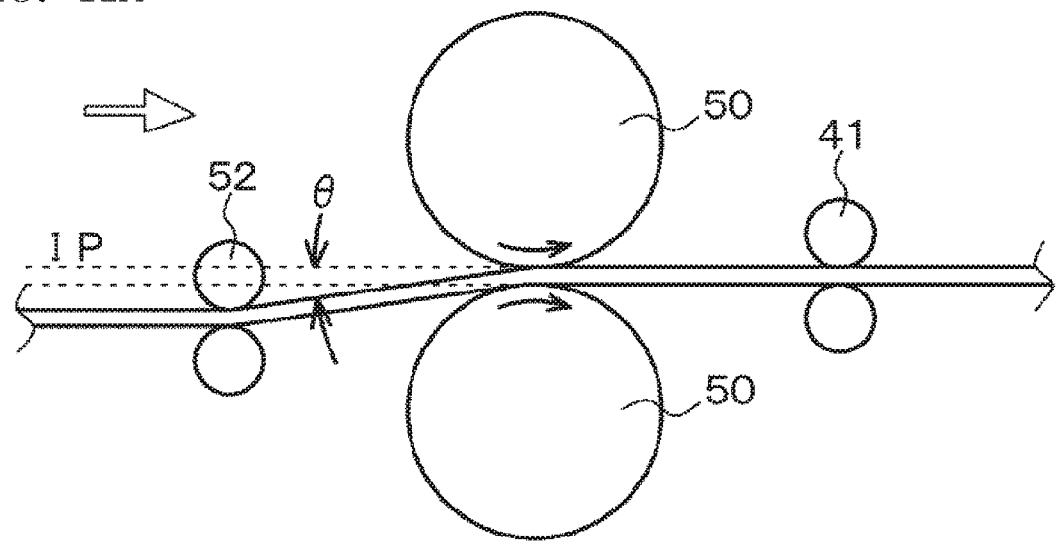
FIGS. 12A and 12B are conceptual views of a roll press device in further another modification example of Example 3 which is used in the method for producing a laminate structure according to Example 3 according to an embodiment of the present disclosure.
Figure 12B:
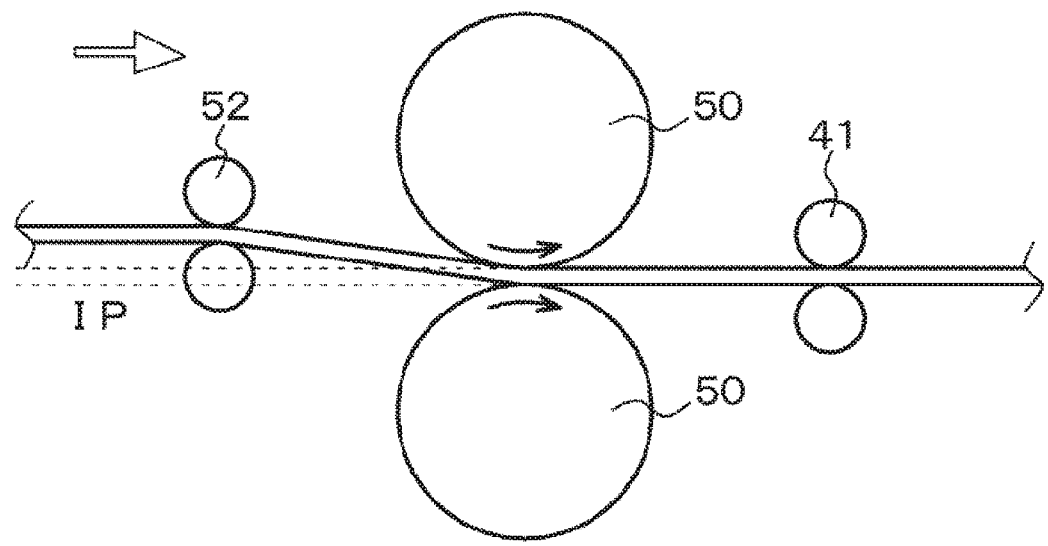

In the roll press device of Example 3 illustrated in FIGS. 12A and 12B, the pair of auxiliary rolls 52 are disposed downstream of the pair of press rolls 50, and a pair of the guide rolls 41 are disposed upstream of the pair of press rolls 50. In addition, in the roll press device of Example 3 illustrated in FIGS. 13A and 13B, one auxiliary roll 52 is disposed downstream of the pair of press rolls 50, and the pair of guide rolls 41 are disposed upstream of the pair of press rolls 50.

Then, in the example illustrated in FIGS. 12A and 13A, in the laminate structure, the first layer 20 is positioned above, the second layer 30 is positioned below, and the laminate structure contact surface of the auxiliary roll 52 is positioned below the virtual plane IP which the laminate structure includes when the laminate structure passes between the pair of press rolls 50. In addition, in the example illustrated in FIGS. 12B and 13B, in the laminate structure, the first layer 20 is positioned below, the second layer 30 is positioned above, and the laminate structure contact surface of the auxiliary roll 52 is positioned above the virtual IP which the laminate structure includes when the laminate structure passes between the pair of press rolls 50.

Figure 13A:
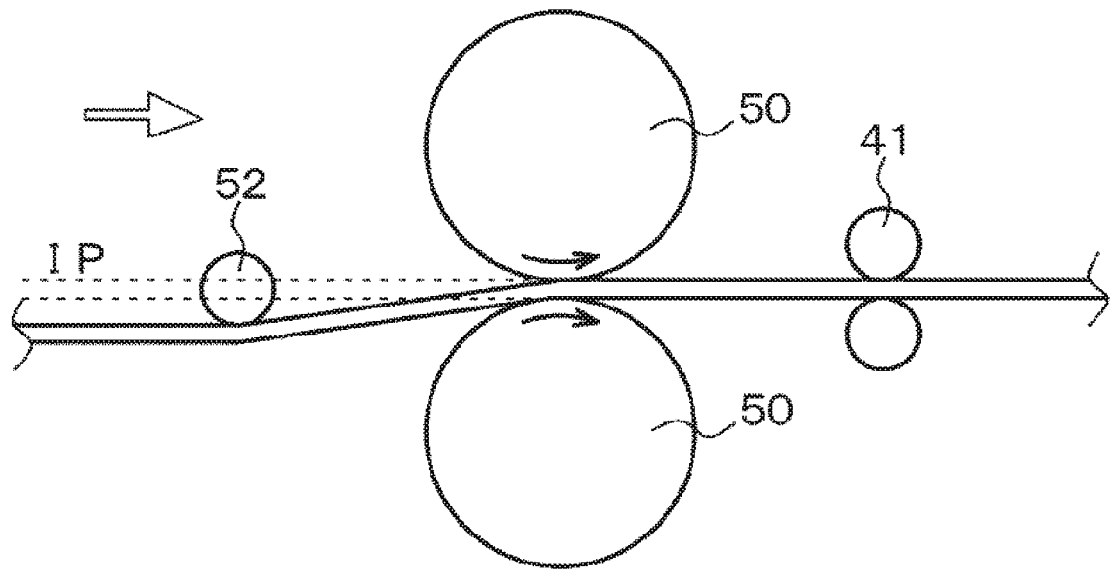
FIGS. 13A and 13B are conceptual views of a roll press device in further another modification example of Example 3 which is used in the method for producing a laminate structure according to Example 3 according to an embodiment of the present disclosure.
Figure 13B:
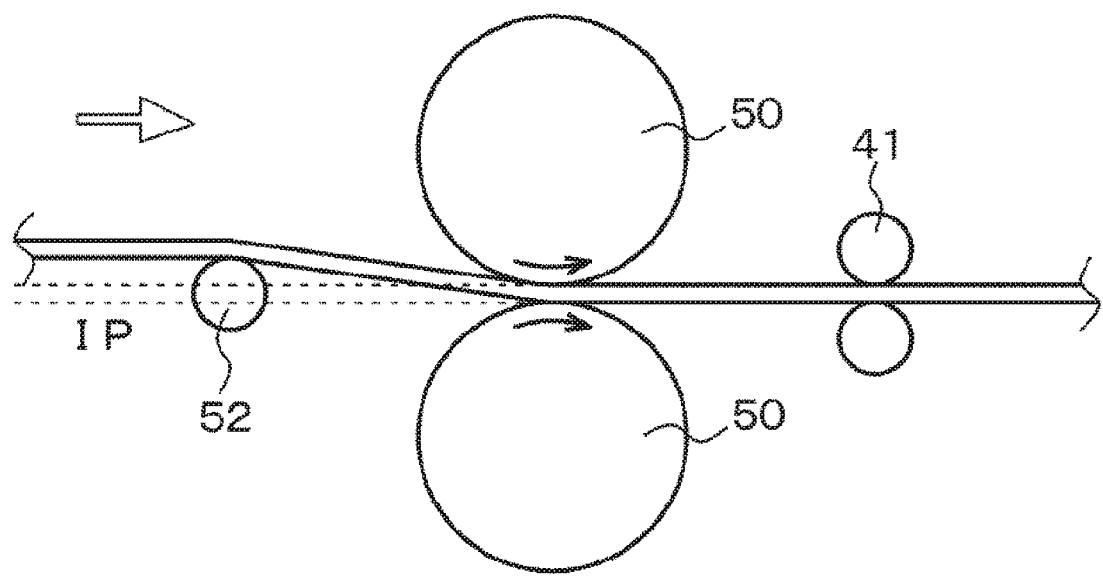

The roll press device of Example 3 illustrated in FIGS. 12A and 13A is a roll press device suitable for pressing the laminate structure illustrated in FIG. 4A or 4B. In addition, the roll press device of Example 3 illustrated in FIGS. 12B and 13B is a roll press device suitable for pressing the laminate structure having the structure obtained by inverting the laminate structure illustrated in FIG. 4A or 4B.

Namely, in Example 3,
there is provided the laminate structure including
the substrate 10 including the first surface 11 and the second surface 12 opposite to the first surface 11;
the first layer 20 formed on the first surface 11 of the substrate 10; and
the second layer 30 formed on the second surface 12 of the substrate 10,
in which
the first layer 20 includes the 1A end portion 21 and the 1B end portion 22 along the width direction of the substrate 10,
the second layer 30 includes the 2A end portion 31 and the 2B end portion 32 along the width direction of the substrate 10,
the 1A end portion 21 is opposite to the 2A end portion 31,
the 1B end portion 22 is opposite to the 213 end portion 32,
the 2A end portion 31 is positioned closer to the central portion side of the substrate 10 than the 1A end portion 21, and
the end surface 31A of the 2A end portion 31 is an inclined surface or has a stair shape or a combined shape of the inclined surface and the stair shape. Alternatively, the laminate structure has the configurations and the structures described in Example 1 and Example 2. Then,
the laminate structure penetrates between the pair of press rolls 50, and
in a case where the second layer 30 is positioned below the first layer 20, the laminate structure contact surfaces of the auxiliary rolls 51 and 52 are positioned below the virtual plane IP, and in a case where the second layer 30 is positioned above the first layer 20, the laminate structure contact surfaces of the auxiliary rolls are positioned above the virtual plane IP.

Figure 23:
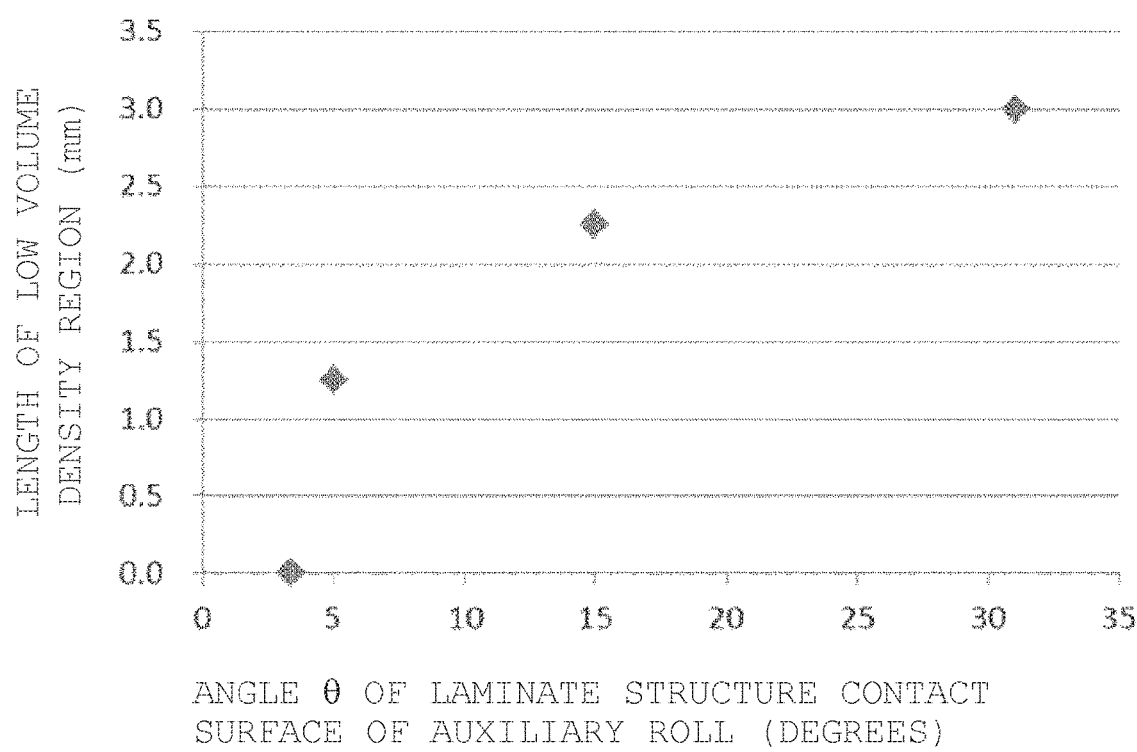
FIG. 23 is a graph showing the result of obtaining a relationship between an angle of a laminate structure contact surface of an auxiliary roll with respect to a virtual plane and the length of a low volume density region based on a simulation result of the relationship between the volume density and the distance from the portion of the first layer which is opposite to the 2A end portion in Example 3 according to an embodiment of the present disclosure.
Figure 24A:
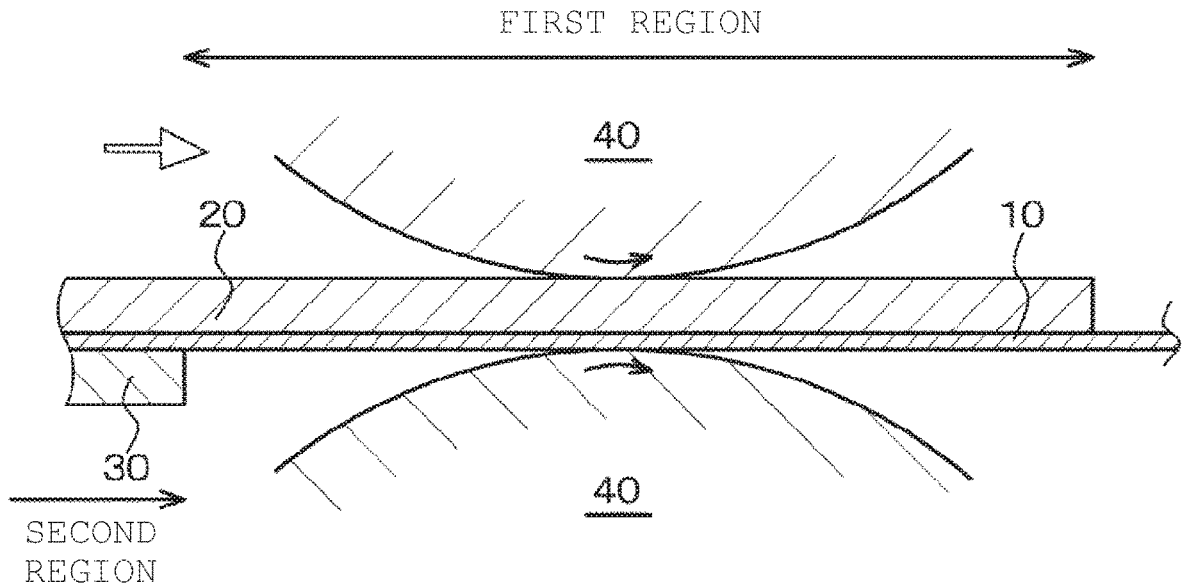
FIGS. 24A and 24B are schematic views for describing a problem which may occur when a laminate structure is pressed using a roll press device in the related art.
Figure 24B:
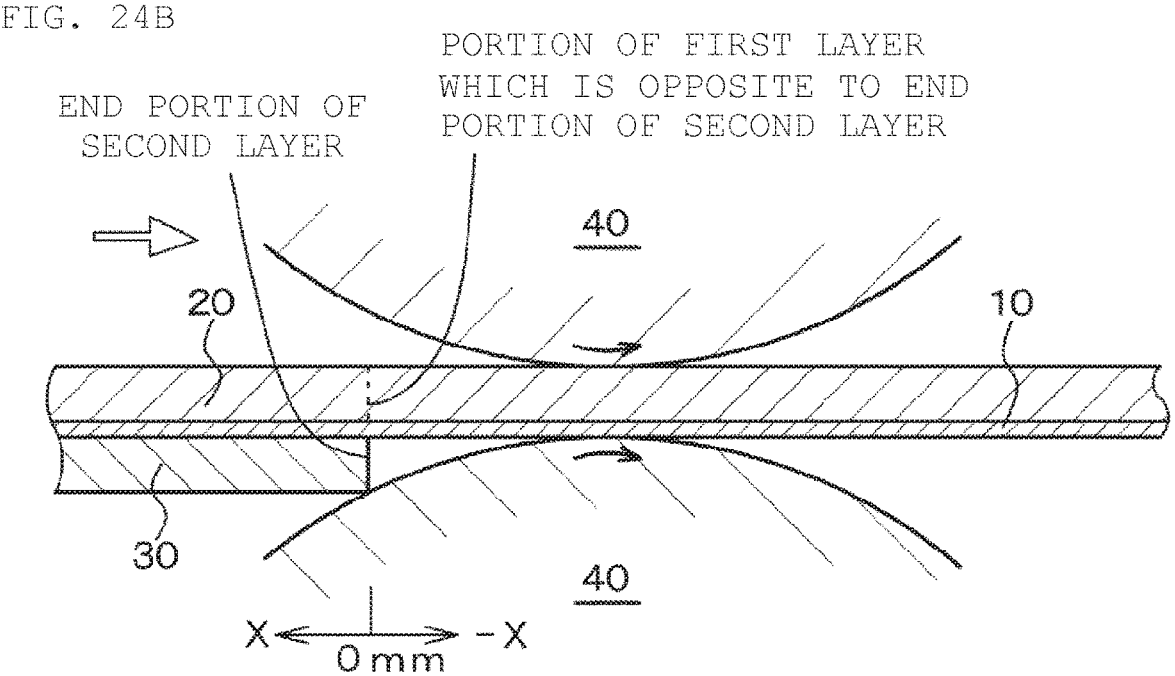
Figure 25A:
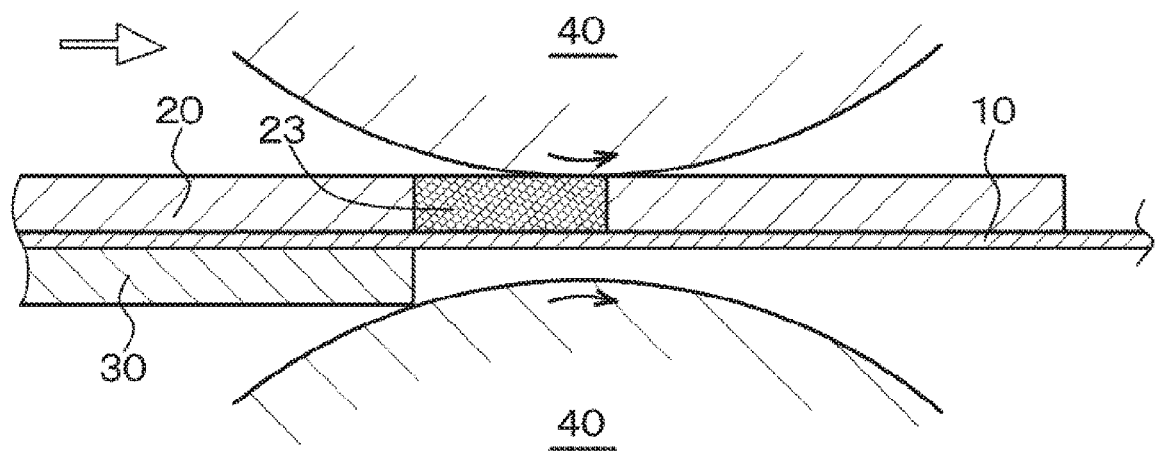
FIGS. 25A and 25B are schematic views for describing the problem which may occur when the laminate structure is pressed using the roll press device in the related art, consecutively from FIG. 24B.
Figure 25B:
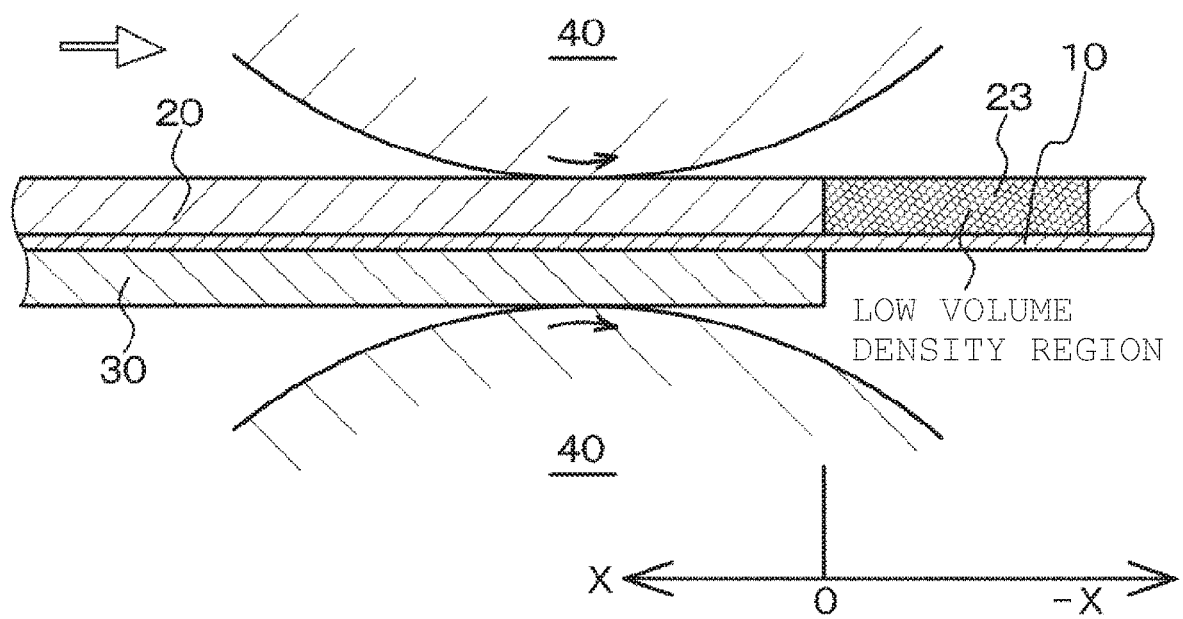
Figure 26:
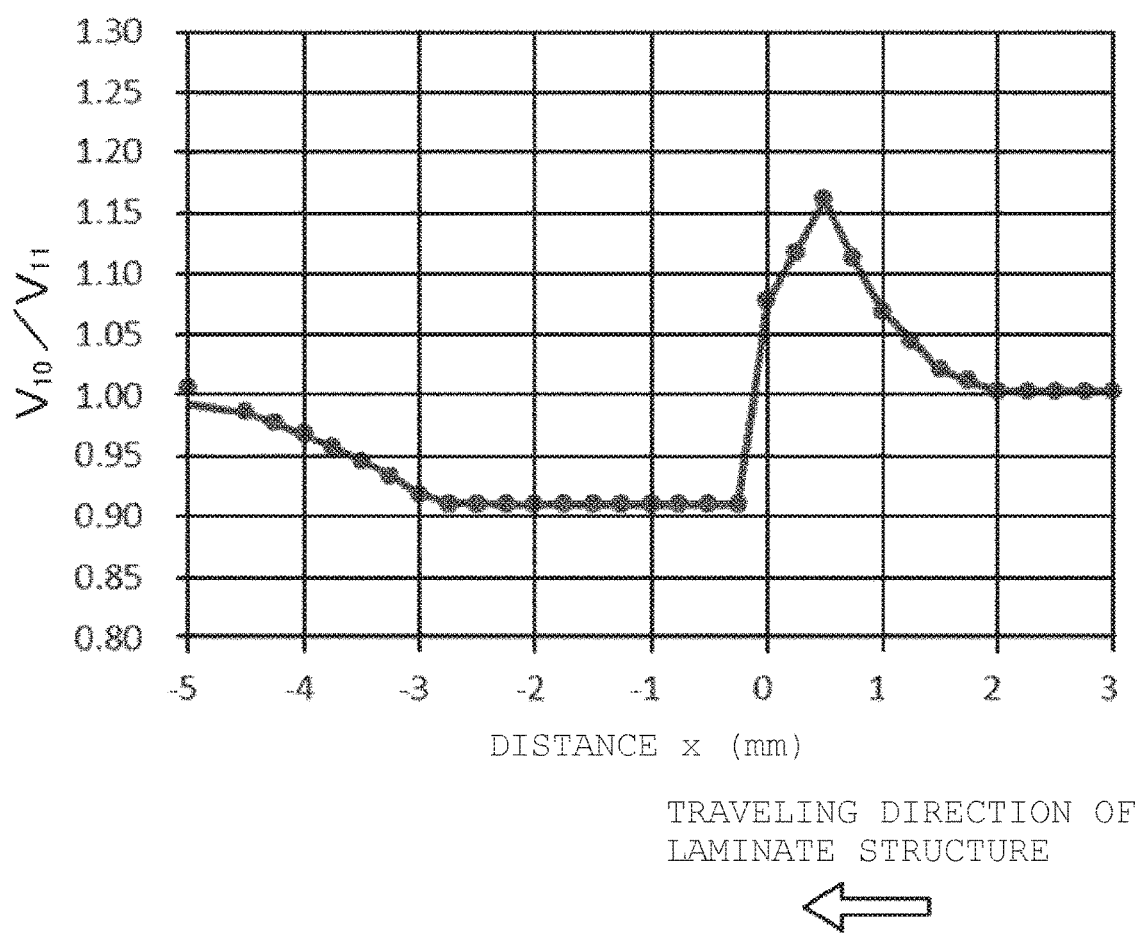
FIG. 26 is a graph showing a simulation result of a relationship between the volume density of the first layer and the distance X from a portion of the first layer which is opposite an end portion of the second layer, when press is continually performed from the first region to the second region by a pair of press rolls according to the technology in the related art.

FIG. 23 shows the result of obtaining a relationship between the angle θ (refer to FIG. 6A) of the laminate structure contact surface of the auxiliary roll with respect to the virtual plane IP and the length of the low volume density region based on the simulation result of the relationship between the volume density and the distance X (refer to FIG. 4A) from the portion 21' of the first layer 20 which is opposite to the 2A end portion 31. In this case, it can be found out that at θ=5 degrees, the length of low volume density region is a minimum. In addition, from the foregoing result, it can be found out that the angle θ of the laminate structure contact surface of the auxiliary roll with respect to the virtual plane IP preferably exceeds zero degrees and is 10 degrees or less.

In the roll press device of Example 3 and the method for producing a laminate structure according to Example 3, the laminate structure contact surface of the auxiliary roll is positioned above or below the virtual plane which the laminate structure includes when the laminate structure passes between the pair of press rolls, and the laminate structure passes between the pair of press rolls, so that the laminate structure is pressed; and thereby, it is possible to effectively prevent an occurrence of the low volume density region. Incidentally, it is also possible to produce the laminate structures described in Example 1 or Example 2 using the roll press device of Example 3.

Example 4

In Example 4, an electrode member of a battery is formed from the laminate structure obtained in Example 1 to Example 3. Here, the battery is formed of, for example, a lithium ion secondary battery. Specifically, the laminate structure forms an electrode member (a positive electrode member or a negative electrode member) of the lithium ion secondary battery. The substrate 10 forms a current collector of the electrode member (a positive electrode current collector of the positive electrode member), and the first layer 20 and the second layer 30 form a mixture layer (positive electrode mixture layer) of the electrode member (positive electrode member). In addition, the substrate 10 forms a current collector of the electrode member (a negative electrode current collector of the negative electrode member), and the first layer 20 and the second layer 30 form a mixture layer (negative electrode mixture layer) of the electrode member (negative electrode member).

Figure 27:
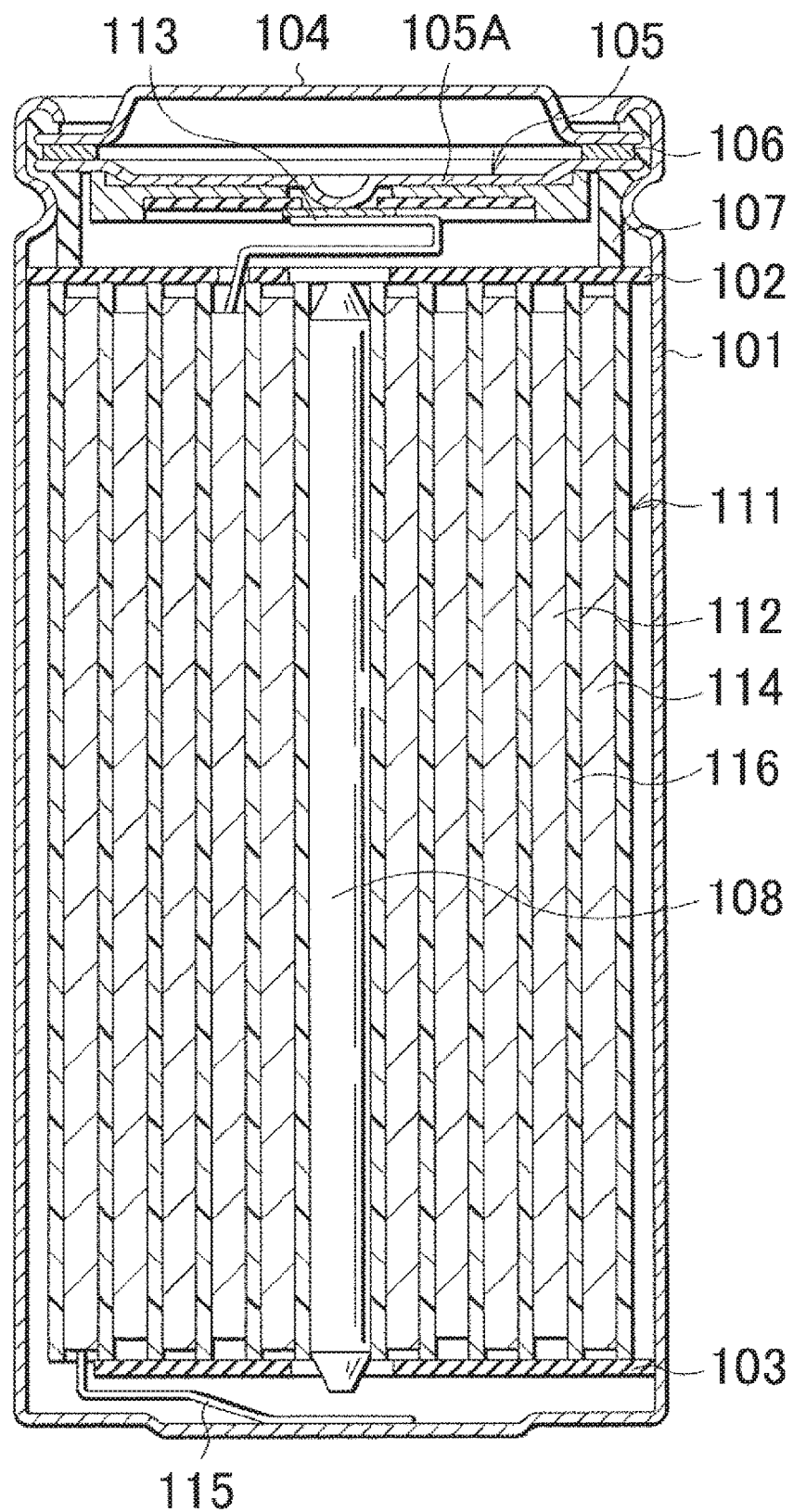
FIG. 27 is a schematic cross-sectional view of a secondary battery of Example 4 according to an embodiment of the present disclosure.
Figure 28:
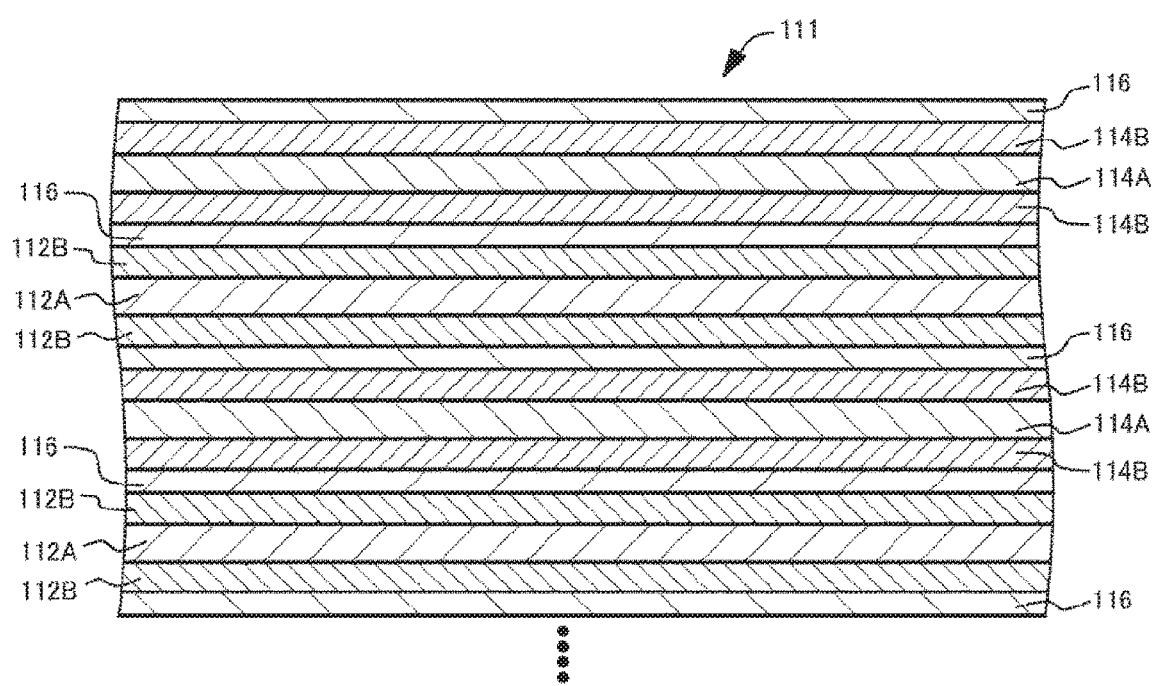
FIG. 28 is a schematic partial cross-sectional view of a wound electrode structure in the secondary battery of Example 4 according to an embodiment of the present disclosure.

In Example 4, a lithium ion secondary battery formed of a cylinder type lithium ion secondary battery will be described. FIG. 27 illustrates a schematic cross-sectional view of the cylinder type lithium ion secondary battery of Example 4. In addition, FIG. 28 illustrates a schematic partial cross-sectional view of an electrode structure forming the lithium ion secondary battery of Example 4 as taken along a longitudinal direction. Here, FIG. 28 illustrates a schematic partial cross-sectional view of a portion in which a positive electrode lead portion and a negative electrode lead portion are not disposed, and in order to simplify the drawing, the electrode structure is illustrated flat; however, since the electrode structure is wound, the electrode structure is curved.

In the lithium ion secondary battery of Example 4, an electrode structure 111 and a pair of insulation plates 102 and 103 are accommodated in an electrode structure accommodation member 101 having a substantially hollow tubular shape. It is possible to produce the electrode structure 111, for example, by stacking a positive electrode member 112 and a negative electrode member 114 with a separator 116 interposed therebetween to obtain an electrode structure, and then winding the electrode structure.

The electrode structure accommodation member (battery can) 101 has a hollow structure where one end portion thereof is closed and the other end portion thereof is open, and is made of iron (Fe), aluminum (Al), and/or the like. The surface of the electrode structure accommodation member 101 may be plated with nickel (Ni) or the like. The pair of insulation plates 102 and 103 are disposed to interpose the electrode structure 111 therebetween and extend perpendicular to a peripheral winding surface of the electrode structure 111. A battery cover 104, a safety valve mechanism 105, and a positive temperature coefficient element (PTC element) 106 are crimped with the open end portion of the electrode structure accommodation member 101 with a gasket 107 interposed therebetween, and accordingly, the electrode structure accommodation member 101 is sealed. The battery cover 104 is made of, for example, the same material of that of the electrode structure accommodation member 101. The safety valve mechanism 105 and the positive temperature coefficient element 106 are provided inside the battery cover 104, and the safety valve mechanism 105 is electrically connected to the battery cover 104 via the positive temperature coefficient element 106. In the safety valve mechanism 105, when the internal pressure is a predetermined value or greater due to an internal short circuit, heating from outside, or the like, a disk plate 105A flips. Then, accordingly, electrical connection between the battery cover 104 and the electrode structure 111 is cut off. In order to prevent abnormal heat generation caused by a large current, the resistance of the positive temperature coefficient element 106 increases in response to a rise in temperature. The gasket 107 is made of, for example, an insulation material. The surface of the gasket 107 may be coated with asphalt or the like.

A center pin 108 is inserted into the winding center of the electrode structure 111. However, the center pin 108 may not be inserted into the winding center. A positive electrode lead portion 113 made of a conductive material such as aluminum is connected to the positive electrode member 112. Specifically, the positive electrode lead portion 113 is attached to a positive electrode current collector 112A. A negative electrode lead portion 115 made of a conductive material such as copper is connected to the negative electrode member 114. Specifically, the negative electrode lead portion 115 is attached to a negative electrode current collector 114A. The negative electrode lead portion 115 is welded to the electrode structure accommodation member 101, and is electrically connected to the electrode structure accommodation member 101. The positive electrode lead portion 113 is welded to the safety valve mechanism 105, and is electrically connected to the battery cover 104. Incidentally, in the example illustrated in FIG. 27, the negative electrode lead portion 115 is provided at one location (an outermost peripheral portion of the wound electrode structure); however, the negative electrode lead portion 115 may be provided at two locations (an outermost peripheral portion and an innermost peripheral portion of the wound electrode structure).

The electrode structure 111 is formed by stacking the positive electrode member 112 where a positive electrode mixture layer 112B is formed on the positive electrode current collector 112A (specifically, on both surfaces of the positive electrode current collector 112A) and the negative electrode member 114 where a negative electrode mixture layer 114B is formed on the negative electrode current collector 114A (specifically, on both surfaces of the negative electrode current collector 114A), with the separator 116 interposed therebetween. The positive electrode mixture layer 112B is not formed in a region in the positive electrode current collector 112A, to which the positive electrode lead portion 113 is attached, and the negative electrode mixture layer 114B is not formed in a region in the negative electrode current collector 114A, to which the negative electrode lead portion 115 is attached.

The specifications of the lithium ion secondary battery of Example 1 are presented as an example in the following Table 2.

TABLE 2

| | |
|---|---|
| Positive electrode current collector 112A | Aluminum foil with thickness of 20 μm |
| Positive electrode mixture layer 112B | Thickness of 50 μm per single surface |
| Positive electrode lead portion 113 | Aluminum (Al) foil with thickness of 100 μm |
| Negative electrode current collector 114A | Copper foil with thickness of 20 μm |
| Negative electrode mixture layer 114B | Thickness of 50 μm per single surface |
| Negative electrode lead portion 115 | Nickel (Ni) foil with thickness of 100 μm |

The positive electrode member 112 can be produced based on the following method. Namely, firstly, lithium-containing complex oxide ($LiCoO_2$) is obtained by mixing lithium carbonate ($Li_2CO_3$) and cobalt carbonate ($CoCO_3$) and then firing the mixture in an air atmosphere (900° C.×5 hours). In this case, the mixing ratio by mole is: for example, $Li_2CO_3$:$CoCO_3$=0.5:1. Then, 91 parts by mass of a positive electrode active material ($Li_xCoO_2$), 3 parts by mass of a positive electrode binder (polyvinylidene fluoride), and 6 parts by mass of a positive electrode conductive agent (black lead or graphite) are mixed to form a positive electrode mixture. Then, the positive electrode mixture is mixed with an organic solvent (N-methyl-2-pyrrolidone) to form a paste-state positive electrode mixture slurry. Subsequently, after both surfaces of the positive electrode current collector 112A (equivalent to a substrate and formed of an aluminum foil with a thickness of 20 μm) having a belt shape are coated with the positive electrode mixture slurry using a coating device, the positive electrode mixture slurry is dried to form the laminate structure (positive electrode mixture layer 112B) described in Example 1 to Example 3. Then, the first layer and the second layer (positive electrode mixture layer 112B) of the laminate structure are pressed (pressurized and compressed) using the method described in Example 1 to Example 3 and the roll press machine described in Example 1 to Example 3.

When the negative electrode member 114 is produced, firstly, 97 parts by mass of a negative electrode active material (black lead (graphite) or a mixed material of black lead and silicon) and 3 parts by mass of a negative electrode binder (polyvinylidene fluoride) are mixed to form a negative electrode mixture. An average particle size $d_{50}$ of black lead is 20 μm. Alternatively, for example, a mixture of 1.5 parts by mass of an acrylic modified styrene-butadiene copolymer and 1.5 parts by mass of carboxymethyl cellulose is used as the negative electrode binder. Subsequently, the negative electrode mixture is mixed with an organic solvent (N-methyl-2-pyrrolidone) to form a paste-state negative electrode mixture slurry. Then, after both surfaces of the negative electrode current collector 114A (equivalent to a substrate and formed of a copper foil with a thickness of 20 μm) having a belt shape are coated with the negative electrode mixture slurry using the coating device, the negative electrode mixture slurry is dried to form the laminate structure (negative electrode mixture layer 114B). Then, the first layer and the second layer (negative electrode mixture layer 114B) of the laminate structure are pressed (pressurized and compressed) using the method described in Example 1 to Example 3 and the roll press machine described in Example 1 to Example 3.

The separator 116 is formed of a microporous polyethylene film with a thickness of 20 μm. In addition, the electrode structure 111 is infiltrated with a non-aqueous electrolytic solution having a composition shown in the following Table 3, Table 4, or Table 5. Incidentally, in a broad concept, the solvent of the non-aqueous electrolytic solution includes not only a liquid material but also a material with ionic conductivity which is capable of dissociating an electrolyte salt. Therefore, in a case where a polymer compound with ionic conductivity is used, the solvent includes also the polymer compound.

TABLE 3

Organic solvent: EC/PC = 1/1 by mass ratio
Lithium salt forming non-aqueous electrolytic solution: 1.0 mole of $LiPF_6$/1 kg of organic solvent
Other additives: 1% by mass of vinylene carbonate (VC)

TABLE 4

Organic solvent: EC/DMC = 3/5 by mass ratio
Lithium salt forming non-aqueous electrolytic solution: 1.0 mole of $LiPF_6$/1 kg of organic solvent

TABLE 5

Organic solvent: EC/DMC/FEC
2.7/6.3/1.0 by mass ratio
Lithium salt forming non-aqueous electrolytic solution: 1.0 mole
of $LiPF_6$/1 kg of organic solvent Alternatively, when the non-aqueous electrolytic solution is prepared, a first compound, a second compound, a third compound, and other materials are mixed and stirred. Lithium bisfluorosulfonylimide (LiFSI) or lithium bistrifluoromethylsulfonylimide (LiTFSI) is used as the first compound. In addition, acetonitrile (AN), propionitrile (PN), or butyronitrile (BN) which is a non-oxygen containing mononitrile compound, or methoxyacetonitrile (MAN) which is an oxygen-containing mononitrile compound is used as the second compound. Furthermore, vinylene carbonate (VC), vinylethylene carbonate (VEC), or methylene ethylene carbonate (MEC) which is an unsaturated cyclic carbonate, 4-fluoro-1,3-dioxolan-2-one (FEC) or bis(fluoromethyl)carbonate (DFDMC) which is halogenated carbonate, or succinonitrile (SN) which is a polynitrile compound is used as the third compound. Furthermore, ethylene carbonate (EC) which is a cyclic carbonate, dimethyl carbonate (DMC) which is a chain carbonate, and electrolyte salt lithium hexafluorophosphate ($LiPF_6$) and/or lithium tetrafluoroborate ($LiBF_4$) which are electrolyte salts are used as the other materials. However, the electrolytic solution is not limited to such a composition.

The lithium ion secondary battery can be produced, for example, based on the following procedure.

Namely, firstly, as described above, the positive electrode mixture layers 112B are formed on both surfaces of the positive electrode current collector 112A, and the negative electrode mixture layers 114B are formed on both surfaces of the negative electrode current collector 114A.

Thereafter, the positive electrode lead portion 113 is attached to the positive electrode current collector 112A using a welding method or the like. In addition, the negative electrode lead portion 115 is attached to the negative electrode current collector 114A using a welding method or the like. Subsequently, after the electrode structure 111 is produced by stacking and winding the positive electrode member 112 and the negative electrode member 114 with the separator 116 formed of a microporous polyethylene film with a thickness of 20 μm interposed therebetween (more specifically, winding the electrode structure (laminate structure) of the positive electrode member 112/the separator 116/the negative electrode member 114/the separator 116), a protective tape (not illustrated) is affixed to an outermost peripheral portion of the electrode structure 111. Thereafter, the center pin 108 is inserted into the center of the electrode structure 111. Subsequently, the electrode structure 111 is accommodated in the electrode structure accommodation member (battery can) 101 in a state where the electrode structure 111 is interposed between the pair of insulation plates 102 and 103. In this case, a tip portion of the positive electrode lead portion 113 is attached to the safety valve mechanism 105, and a tip portion of the negative electrode lead portion 115 is attached to the electrode structure accommodation member 101 using a welding method or the like. Thereafter, the separator 116 is infiltrated with an organic electrolytic solution or a non-aqueous electrolytic solution by injecting the organic electrolytic solution or the non-aqueous electrolytic solution in a decompression method. Subsequently, the battery cover 104, the safety valve mechanism 105, and the positive temperature coefficient element 106 are crimped with the open end portion of the electrode structure accommodation member 101 with the gasket 107 interposed therebetween.

Example 5

Figure 29:
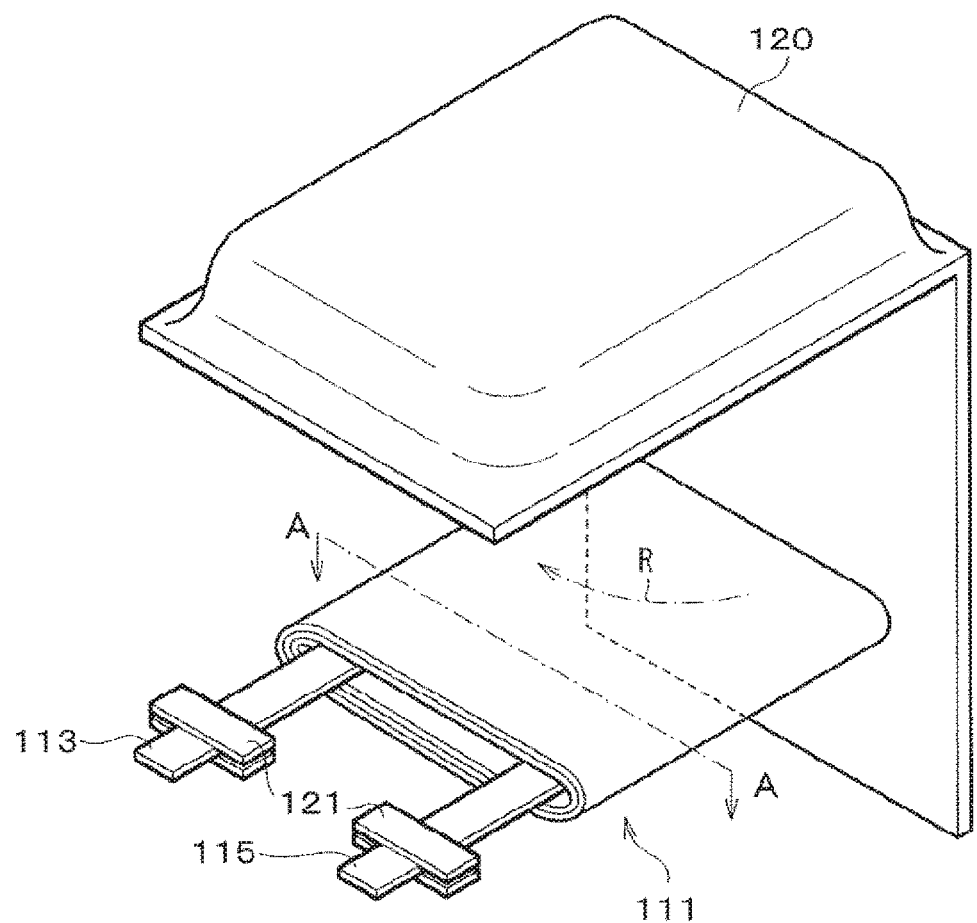
FIG. 29 is a schematic exploded perspective view of a laminate film type lithium ion secondary battery having a square shape in Example 5 according to an embodiment of the present disclosure.
Figure 30A:
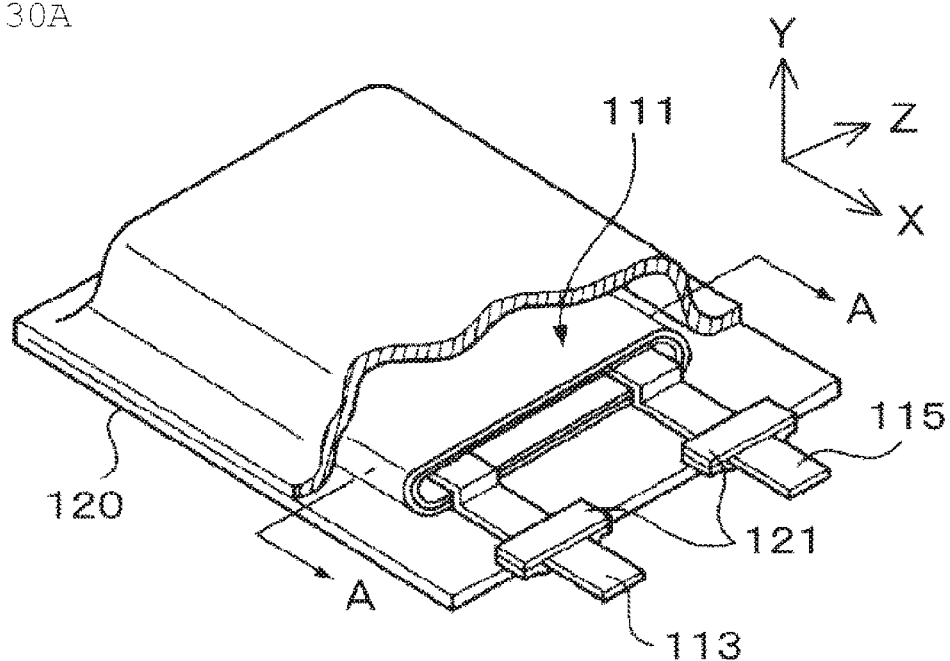
FIG. 30A is a schematic exploded perspective view of the laminate film type lithium ion secondary battery of Example 5 in a state which is different from the state illustrated in FIG. 29.
Figure 30B:
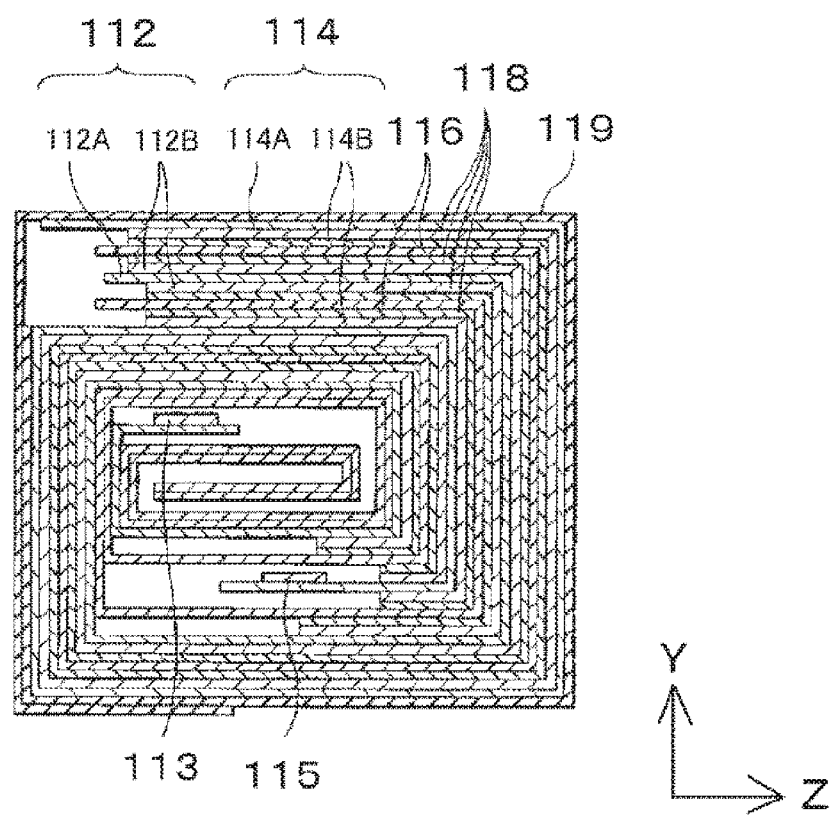
FIG. 30B is a schematic cross-sectional view of an electrode structure in the laminate film type lithium ion secondary battery of Example 5 as taken along a line A-A in FIGS. 29 and 30A according to an embodiment of the present disclosure.

In Example 5, a lithium ion secondary battery is formed of a planar laminate film type lithium ion secondary battery in which a positive electrode member, a separator, and a negative electrode member are wound. FIGS. 29 and 30A illustrate a schematic exploded perspective view of the secondary battery of Example 5. FIG. 30B illustrates a schematic enlarged cross-sectional view of an electrode structure (laminate structure) illustrated in FIGS. 29 and 30A as taken along a line A-A (schematic enlarged cross-sectional view taken along a plane YZ). Furthermore, the schematic partial cross-sectional view of an electrode structure illustrated in FIG. 30B where the electrode structure is partially enlarged (schematic enlarged cross-sectional view taken along a plane XY) is the same as that illustrated in FIG. 28.

In the secondary battery of Example 5, the electrode structure 111 which is basically the same as that in Example 4 is accommodated in an exterior member 120 formed of a laminate film. It is possible to produce the electrode structure 111 by stacking the positive electrode member 112 and the negative electrode member 114 with the separator 116 and an electrolyte layer 118 interposed therebetween and then winding the laminate structure. The positive electrode lead portion 113 is attached to the positive electrode member 112, and the negative electrode lead portion 115 is attached to the negative electrode member 114. The outermost peripheral portion of the electrode structure 111 is protected by a protective tape 119.

The positive electrode lead portion 113 and the negative electrode lead portion 115 protrude outward from inside the exterior member 120 in the same direction. The positive electrode lead portion 113 is formed from a conductive material such as aluminum. The negative electrode lead portion 115 is formed from a conductive material such as copper, nickel, and/or stainless steel. The conductive materials have, for example, a thin planar shape or a mesh shape.

The exterior member 120 is one sheet of film that can be folded in the direction of an arrow R illustrated in FIG. 29, and a recession (or embossing) for accommodating the electrode structure 111 is provided in a part of the exterior member 120. The exterior member 120 is, for example, a laminate film in which a fusion bonding layer, a metallic layer, and a surface protection layer are stacked in order. In a process of producing the lithium ion secondary battery, after the exterior member 120 is folded such that portions of the fusion bonding layer are opposite to each other with the electrode structure 111 interposed therebetween, outer peripheral edge portions of the fusion bonding layer are fusion-bonded. However, the exterior member 120 may be obtained by bonding two sheets of laminate films with an adhesive or the like interposed therebetween. The fusion bonding layer is formed of, for example, a film made of polyethylene, polypropylene, and/or the like. The metallic layer is formed of, for example, an aluminum foil or the like. The surface protection layer is made of, for example, nylon, polyethylene terephthalate, and/or the like. Among these materials, it is preferable that the exterior member 120 is an aluminum laminate film in which a polyethylene film, an aluminum foil, and a nylon film are stacked in order. However, the exterior member 120 may be a laminate film having another laminate structure, may be a polymer film made of polypropylene, or may be a metallic film.

Specifically, the exterior member 120 is formed of a moisture-resistant aluminum laminate film (total thickness of 100 µm) in which a nylon film (thickness of 30 µm), an aluminum foil (thickness of 40 µm), and an unstretched polypropylene film (thickness of 30 µm) are stacked in order from outside.

In order to prevent the intrusion of outside air, adhesive films 121 are inserted between the exterior member 120 and the positive electrode lead portion 113 and between the exterior member 120 and the negative electrode lead portion 115. The adhesive film 121 is made of a material having adhesion to the positive electrode lead portion 113 and the negative electrode lead portion 115, namely, the material such as polyolefin resin, more specifically, polyolefin resins such as polyethylene, polypropylene, modified polyethylene, and/or modified polypropylene.

As illustrated in FIG. 30B, the positive electrode member 112 includes the positive electrode mixture layers 112B on both surfaces of the positive electrode current collector 112A. In addition, the negative electrode member 114 includes the negative electrode mixture layers 114B on both surfaces of the negative electrode current collector 114A.

The electrolyte layer contains a non-aqueous electrolytic solution and a retentive polymer compound, and a configuration where the non-aqueous electrolytic solution is retained by the retentive polymer compound can be also adopted. The electrolyte layer is a gel-state electrolyte, provides high ionic conductivity (for example, 1 mS/cm or greater at room temperature), and prevents the leakage of the non-aqueous electrolytic solution. The electrolyte layer may further contain other materials such as an additive.

Incidentally, in the electrolyte layer which is a gel-state electrolyte, in a broad concept, the solvent of the non-aqueous electrolytic solution includes not only a liquid material but also a material with ionic conductivity which is capable of dissociating an electrolyte salt. Therefore, in a case where a polymer compound with ionic conductivity is used, the solvent includes also the polymer compound. Instead of the gel-state electrolyte layer, the non-aqueous electrolytic solution may be used as it is. In this case, the electrode structure is infiltrated with the non-aqueous electrolytic solution.

Specifically, when the electrolyte layer is formed, firstly, the non-aqueous electrolytic solution is prepared.

Then, the non-aqueous electrolytic solution, the retentive polymer compound, and the organic solvent (dimethyl carbonate) are mixed to prepare a sol-state precursor solution. A copolymer of hexafluoropropylene and vinylidene fluoride (amount of copolymerization of hexafluoropropylene=6.9% by mass) is used as the retentive polymer compound. Subsequently, after the positive electrode member and the negative electrode member are coated with the precursor solution, the precursor solution is dried to form a gel-state electrolyte layer.

The lithium ion secondary battery including the gel-state electrolyte layer can be produced, for example, based on the following three types of procedures.

In a first procedure, firstly, the positive electrode mixture layers 112B are formed on both surfaces of the positive electrode current collector 112A, and the negative electrode mixture layers 114B are formed on both surfaces of the negative electrode current collector 114A. The positive electrode member and the negative electrode member are formed from the laminate structures described in Example 1 to Example 3 based on the method described in Example 1 to Example 3. On the other hand, the non-aqueous electrolytic solution, the retentive polymer compound, and the organic solvent are mixed to prepare a sol-state precursor solution. Then, after the positive electrode member 112 and the negative electrode member 114 are coated with the precursor solution, the precursor solution is dried to form a gel-state electrolyte layer.

Thereafter, the positive electrode lead portion 113 is attached to the positive electrode current collector 112A, and the negative electrode lead portion 115 is attached to the negative electrode current collector 114A using a welding method or the like. Subsequently, after the electrode structure 111 is produced by stacking and winding the positive electrode member 112 and the negative electrode member 114 with the separator 116 formed of a microporous propylene film interposed therebetween, the protective tape 119 is affixed to the outermost peripheral portion of the electrode structure 111. Thereafter, the exterior member 120 is folded to interpose the electrode structure 111 therebetween, and then, outer peripheral edge portions of the exterior member 120 are bonded using a heat fusion method or the like to seal the electrode structure 111 inside the exterior member 120. Incidentally, the adhesive films (acid-modified propylene films) 121 are inserted between the positive electrode lead portion 113 and the exterior member 120 and between the negative electrode lead portion 115 and the exterior member 120.

Alternatively, in a second procedure, firstly, the positive electrode member 112 and the negative electrode member 114 are produced. Then, the positive electrode lead portion 113 is attached to the positive electrode member 112, and the negative electrode lead portion 115 is attached to the negative electrode member 114. Thereafter, a winding body which is a precursor of the electrode structure 111 is produced by stacking and winding the positive electrode member 112 and the negative electrode member 114 with the separator 116 interposed therebetween, and then, the protective tape 119 is affixed to an outermost peripheral portion of the winding body. Subsequently, after the exterior member 120 is folded to interpose the winding body therebetween, the remaining outer peripheral edge portions of the exterior member 120 except for an outer peripheral edge portion of one side of the exterior member 120 are bonded using a heat fusion method or the like to accommodate the winding body in the exterior member 120 having a bag shape. On the other hand, a composite for the electrolyte is prepared by mixing the non-aqueous electrolytic solution, monomers which are a raw material for a polymer compound, a polymerization initiator, and other materials such as a polymerization inhibitor as needed. Then, after the composite for the electrolyte is injected into the exterior member 120 having a bag shape, the exterior member 120 is sealed using a heat fusion method or the like. Thereafter, the monomers are thermally polymerized to form the polymer compound. Accordingly, a gel-state electrolyte layer is formed.

Alternatively, in a third procedure, except that the separator 116 of which both surfaces are coated with a polymer compound, similar to the second procedure, a winding body is produced and accommodated in the exterior member 120 having a bag shape. The polymer compound with which the separator 116 is coated is, for example, a polymer (a homopolymer, a copolymer or a multi-component copolymer) containing vinylidene fluoride as a component, or the like. Specifically, the polymer compound is polyvinylidene fluoride, a binary copolymer containing vinylidene fluoride and hexafluoropropylene as components, a ternary copolymer containing hexafluoropropylene and chlorotrifluoroethylene as components, or the like. One or two or more polymer compounds may be used together with a polymer containing vinylidene fluoride as a component. Thereafter, a non-aqueous electrolytic solution is prepared and injected into the exterior member 120, and then, a cavity of the exterior member 120 is sealed using a heat fusion method or the like. Subsequently, the separator 116 is brought into close contact with the positive electrode member 112 and the negative electrode member 114 with the polymer compound interposed therebetween, by heating the exterior member 120 while applying a load thereto. Accordingly, the polymer compound is infiltrated with the non-aqueous electrolytic solution and the polymer compound gels to form an electrolyte layer.

According to the third procedure, the expansion of the lithium ion secondary battery is better prevented than that in the first procedure. In addition, in the third procedure, since almost no solvent, monomers which are a raw material for the polymer compound, and the like remain in the electrolyte layer, a step of forming the polymer compound is better controlled than that in the second procedure. For this reason, the positive electrode member 112, the negative electrode member 114, the separator 116, and the electrolyte layer are in sufficient close contact with each other.

Each of the positive electrode member 112 and the negative electrode member 114 can be produced in the same method as that described in Example 4.

Alternatively, a negative electrode active material (silicon) and a precursor of a negative electrode binder (polyamic acid) can be mixed to form a negative electrode mixture. In this case, the mixing ratio by dry mass is: silicon:polyamic acid=80:20. The average particle size $d_{50}$ of silicon is 1 µm. N-methyl-2-pyrrolidone and N,N-dimethylacetamide are used as a solvent of the polyamic acid. In addition, after compression molding, a negative electrode mixture slurry is heated in a vacuum atmosphere in a condition of 100° C.×12 hours. Accordingly, polyimide which is a negative electrode binder is formed.

Example 6

In Example 6, application examples of the present disclosure will be described.

The present disclosure can be applied to a lithium ion secondary battery that is used a machine, equipment, an appliance, a device, a system (aggregate of a plurality of equipment) which is capable of using a battery (specifically, lithium ion secondary battery) with the laminate structure described in Example 1 to Example 3 as a drive or operation power source or a power storage source for power storage, without being specifically limited. The lithium ion secondary battery used as a power source may be a main power source (power source which is preferentially used), or may be an auxiliary power source (power source which is used instead of the main power source or which is used by being switched from the main power source). In a case where the lithium ion secondary battery is used as the auxiliary power source, the main power source is not limited to the lithium ion secondary battery.

As application examples, the lithium ion secondary battery can be used to drive an electrical power-to-driving force conversion device (specifically, for example, a power motor), specifically for various electronic equipment and electric equipment (including portable electronic equipment) such as a video camera, a camcorder, a digital still camera, a mobile phone, a personal computer, a television receiver, various display devices, a cordless telephone, a headphone stereo, a music player, a portable radio, electronic papers including an electronic book and an electronic newspaper, and a portable information terminal including a PDA; a toy; a portable living appliance such as an electric shaver; a lighting appliance such as an indoor light; medical electronic equipment such as a pacemaker or a hearing aid; a memory device such as a memory card; a battery pack which is used in a personal computer or the like as a detachable power source; an electric tool such as an electric drill or an electric saw; a power storage system or a home energy server (home power storage device) such as a home battery system which stores electrical power for the case of emergency or the like and a power supply system; a power storage unit or a backup power source; electric vehicles such as an electric automobile, an electric motorcycle, an electric bicycle, and Segway (registered trademark); and an aircraft or a ship; however, the lithium ion secondary battery is not limited to these applications.

Among the foregoing application examples, the lithium ion secondary battery in the present disclosure is effectively applied to the battery pack, the electric vehicle, the power storage system, the power supply system, the electric tool, the electronic equipment, the electric equipment, and the like. Since excellent battery characteristics are required, the lithium ion secondary battery in the present disclosure is used; and thereby, it is possible to effectively improve the performance. The battery pack is a power source using the lithium ion secondary battery, and is a so-called assembled battery or the like. The electric vehicle is a vehicle that operates (travels) using the lithium ion secondary battery as a drive power source, and may be an automobile including a drive source in addition to the secondary battery. The power storage system (power supply system) is a system that uses the lithium ion secondary battery as a power storage source. For example, in the home power storage system (power supply system), since electrical power is stored in the lithium ion secondary battery which is a power storage source, it is possible to use home electric products and the like using the electrical power. The electric tool is a tool of which a movable portion (for example, a drill) is movable with the lithium ion secondary battery serving as a drive power source. The electronic equipment or the electric equipment is equipment that performs various functions using the lithium ion secondary battery as an operation power source (power supply).

Hereinafter, several application examples of the lithium ion secondary battery will be specifically described. Incidentally, the configuration of each application example to be described hereinafter is merely one example, and the configuration can be appropriately changed.

The battery pack is a simple battery pack (so-called soft pack) using one lithium ion secondary battery, and is equipped, for example, in electronic equipment or the like which is represented by a smartphone. Alternatively, the battery pack includes, for example, an assembled battery formed of six lithium ion secondary batteries of which two are connected in parallel and three are connected in series.

Incidentally, the connection form of the lithium ion secondary battery may be series connection, parallel connection, or combined connection of both.

Figure 31:
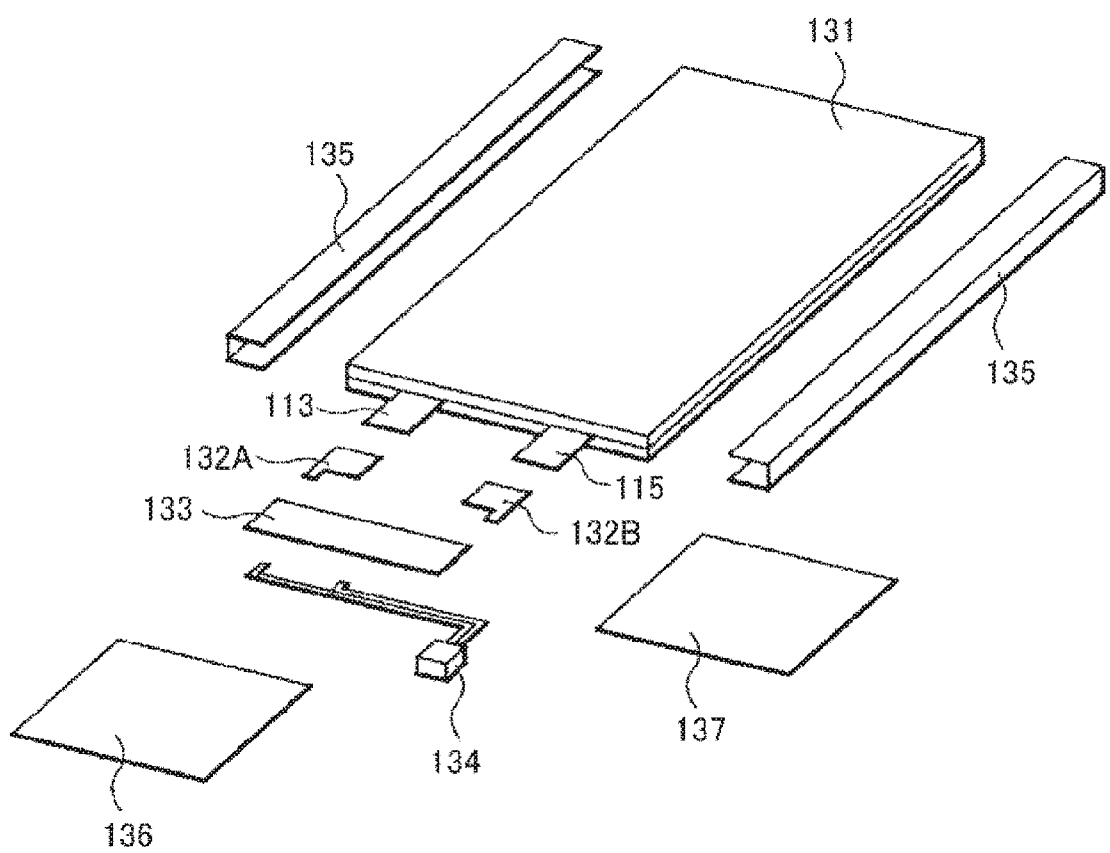
FIG. 31 is a schematic exploded perspective view of an application example (battery pack: single battery) of Example 6 of the lithium ion secondary battery with the laminate structure of Example 4 and Example 5 according to an embodiment of the present disclosure.

FIG. 31 illustrates a schematic exploded perspective view of a battery pack using a single battery. The battery pack is a simple battery pack (so-called soft pack) using one lithium ion secondary battery, and is equipped, for example, in electronic equipment or the like which is represented by a smartphone. For example, the battery pack includes a power source 131 formed of the lithium ion secondary battery described in Example 5, and a circuit board 133 connected to the power source 131. The positive electrode lead portion 113 and the negative electrode lead portion 115 are attached to the power source 131.

A pair of adhesive tapes 135 are affixed to both side surfaces of the power source 131. A protection circuit module (PCM) is provided on the circuit board 133. The circuit board 133 is connected to the positive electrode lead portion 113 via a tab 132A, and is connected to the negative electrode lead portion 115 via a tab 132B. In addition, a lead wire 134 with a connector for external connection is connected to the circuit board 133. In a state where the circuit board 133 is connected to the power source 131, the circuit board 133 is protected by a label 136 and an insulation sheet 137. When the label 136 is affixed, the circuit board 133 and the insulation sheet 137 are fixed. The circuit board 133 includes a control unit, a switch unit, a PTC, and a temperature detection unit that are not illustrated. The power source 131 can be connected to the outside via a positive terminal and a negative terminal that are not illustrated, and the power source 131 is charged and discharged via the positive terminal and the negative terminal. The temperature detection unit can detect the temperature via a temperature detection terminal (so-called T terminal).

Figure 32A:
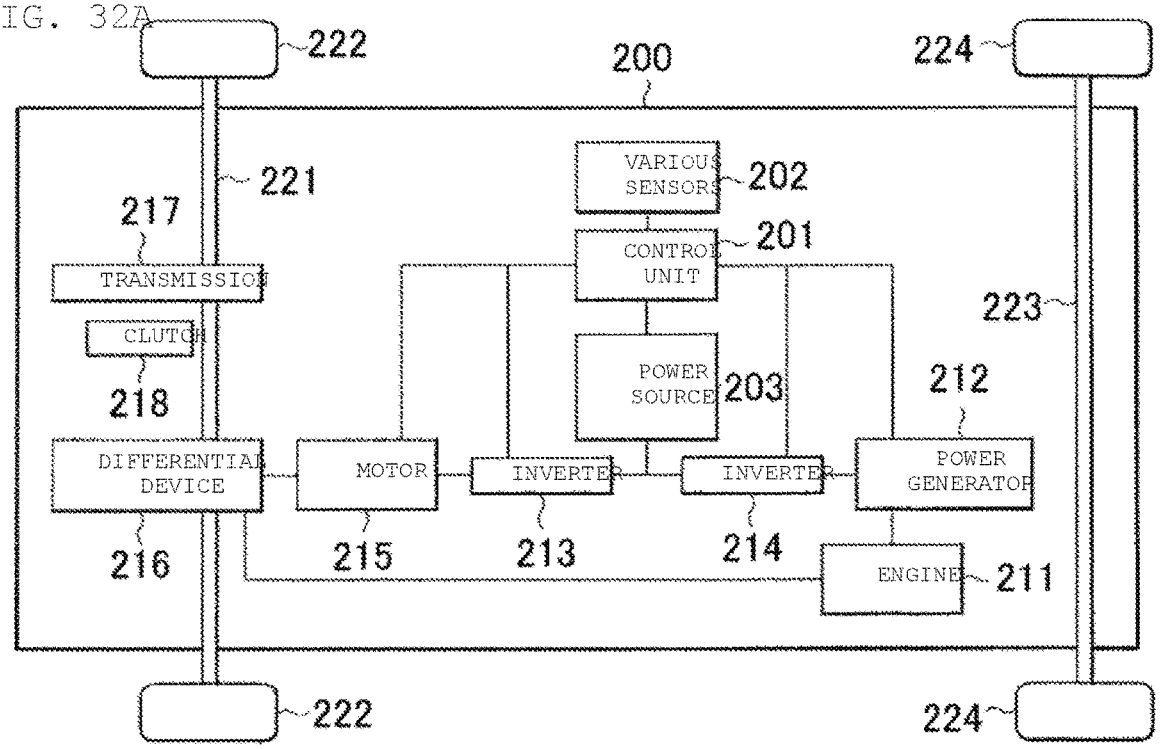
FIG. 32A is a block diagram representing the configuration of an application example (electric vehicle) of Example 6 of the lithium ion secondary battery with the laminate structure of Example 4 and Example 5.

Subsequently, FIG. 32A illustrates a block diagram representing the configuration of an electric vehicle such as a hybrid automobile which is one example of the electric vehicle. For example, the electric vehicle includes a control unit 201, various sensors 202, a power source 203, an engine 211, a power generator 212, inverters 213 and 214, a motor 215 for drive, a differential device 216, a transmission 217, and a clutch 218 in a casing 200 made of metal. In addition to that, for example, the electric vehicle includes a front wheel drive shaft 221 connected to the differential device 216 or the transmission 217, front wheels 222, a rear wheel drive shaft 223, and rear wheels 224.

The electric vehicle can travel on, for example, either one of the engine 211 and a motor 215 serving as a drive source. The engine 211 is a main power source and is, for example, a gasoline engine or the like. In a case where the engine 211 is a power source, for example, the driving force (rotational force) of the engine 211 is transmitted to the front wheels 222 or the rear wheels 224 via the differential device 216, the transmission 217, and the clutch 218 that are drive units. The rotational force of the engine 211 is also transmitted to the power generator 212, the power generator 212 generates an alternating current electrical power from the rotational force, the alternating current electrical power is converted into a direct current electrical power by the inverter 214, and the direct current electrical power is stored in the power source 203. On the other hand, in a case where the motor 215 which is a conversion unit is a power source, the electrical power (direct current electrical power) supplied from the power source 203 is converted into an alternating current electrical power by the inverter 213, and the motor 215 is driven by the alternating current electrical power. For example, the driving force (rotational force) which is converted from the electrical power by the motor 215 is transmitted to the front wheels 222 or the rear wheels 224 via the differential device 216, the transmission 217, and the clutch 218 that are drive units.

When the speed of the electric vehicle is reduced by a brake mechanism (not illustrated), a resistance force occurring during speed reduction may be transmitted as a rotational force to the motor 215, and the motor 215 may generate an alternating current electrical power from the rotational force. The alternating current electrical power is converted into a direct current electrical power by the inverter 213, and a direct current regenerative electrical power is stored in the power source 203.

The control unit 201 controls the entire operation of the electric vehicle and includes, for example, a CPU and the like. The power source 203 includes one or two or more lithium ion secondary batteries (not illustrated) described in Example 4 or Example 5. The power source 203 can be also configured to be connected to an external power source and receive a supply of electrical power from the external power source to store the electrical power. The various sensors 202 are used, for example, to control the rotation speed of the engine 211 and control the opening angle of a throttle valve (not illustrated) (throttle opening angle). The various sensors 202 include, for example, a speed sensor, an acceleration sensor, an engine rotation speed sensor, and the like.

Incidentally, the case where the electric vehicle is a hybrid automobile has been described; however, the electric vehicle may be a vehicle (electric automobile) that operates using only the power source 203 and the motor 215 without using the engine 211.

Figure 32B:
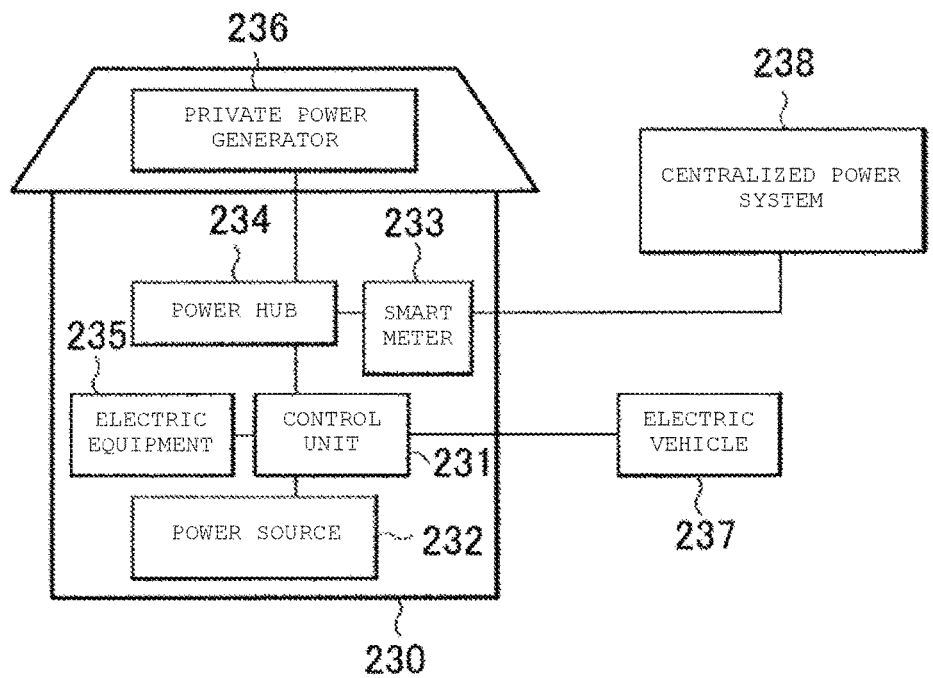
FIG. 32B is a block diagram representing the configuration of an application example (power storage system) of Example 6.

Subsequently, FIG. 32B illustrates a block diagram representing the configuration of a power storage system (power supply system). For example, the power storage system includes a control unit 231, a power source 232, a smart meter 233, and a power hub 234 in a housing 230 of a general residence, a commercial building, and the like.

For example, the power source 232 is connected to electric equipment (electronic equipment) 235 that is installed in the housing 230, and can be connected to an electric vehicle 237 that parks outside the housing 230. In addition, for example, the power source 232 is connected to a private power generator 236 which is installed in the housing 230, via the power hub 234, and can be connected to an external centralized power system 238 via the smart meter 233 and the power hub 234. The electric equipment (electronic equipment) 235 includes, for example, one or two or more electric home appliances. A refrigerator, an air conditioner, a television receiver, and water heater can be presented as examples of the electric home appliance. The private power generator 236 is formed of, for example, a solar power generator, a wind power generator, or the like. An electric automobile, a hybrid automobile, an electric motorcycle, an electric bicycle, and Segway (registered trademark) can be presented as examples of the electric vehicle 237. A commercial power source, a power generation device, a power grid, and a smart grid (next generation power grid) can be presented as examples of the centralized power system 238, and a thermal power plant, a nuclear power plant, a hydro power plant, and a wind power plant can be also presented as examples, and various solar cells, fuel cells, wind power generation devices, micro hydro power generation devices, geothermal power generation devices can be presented as examples of a power generation device provided in the centralized power system 238; however, the centralized power system 238 and the power generation system are not limited to the foregoing examples.

The control unit 231 controls the entire operation (including the usage state of the power source 232) of the power storage system and includes, for example, a CPU and the like. The power source 232 includes one or two or more lithium ion secondary batteries (not illustrated) described in Example 4 or Example 5. The smart meter 233 is a network compatible power meter that is installed in the housing 230 which is a power consumption side, and can communicate with a power supply side. Then, the smart meter 233 enables an efficient and stable energy supply, for example, by controlling a balance between consumption and supply in the housing 230 while communicating with the outside.

In the power storage system, for example, electrical power is stored to the power source 232 from the centralized power system 238 which is an external power source via the smart meter 233 and the power hub 234, and electrical power is stored to the power source 232 from the private power generator 236 which is an independent power source via the power hub 234. Since the electrical power stored in the power source 232 is supplied to the electric equipment (electronic equipment) 235 and the electric vehicle 237 in response to an instruction from the control unit 231, it is possible to operate the electric equipment (electronic equipment) 235, and it is possible to charge the electric vehicle 237. Namely, the power storage system is a system that can store and supply electrical power in the housing 230 using the power source 232.

The electrical power stored in the power source 232 can be randomly used. For this reason, for example, the electrical power can be stored to the power source 232 from the centralized power system 238 at midnight when the electricity rate is cheap, and the electrical power stored in the power source 232 can be used during daytime when the electricity rate is high.

The power storage system described above may be installed for each one house (one household) or may be installed for a plurality of houses (a plurality of households).

Figure 32C:
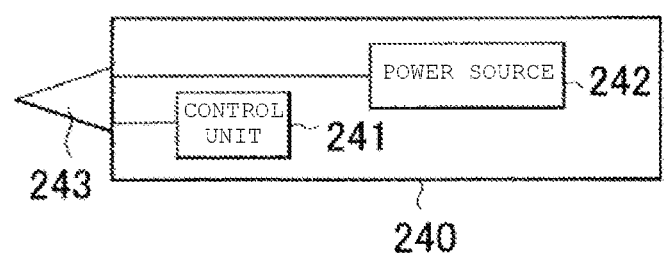
FIG. 32C is a block diagram representing the configuration of an application example (electric tool) of Example 6 according to an embodiment of the present disclosure.

Subsequently, FIG. 32C illustrates a block diagram representing the configuration of an electric tool. The electric tool is, for example, an electric drill and includes a control unit 241 and a power source 242 inside a tool main body 240 made of a plastic material or the like. For example, a drill portion 243 which is a movable portion is rotatably attached to the tool main body 240. The control unit 241 controls the entire operation (including the usage state of the power source 242) of the electric tool and includes, for example, a CPU and the like. The power source 242 includes one or two or more lithium ion secondary batteries (not illustrated) described in Example 4 or Example 5. The control unit 241 supplies electrical power from the power source 242 to the drill portion 243 in response to the operation of an operation switch (not illustrated).

The present disclosure has been described above based on the preferred examples; however, the present disclosure is not limited to these examples and can be modified in various forms. The configuration and the structure of the laminate structure, the configuration and the structure of the roll press device, the method for producing a laminate structure which have been described in the examples are presented as examples, and can be appropriately changed. In the examples, the example where the laminate structure penetrates between the press rolls from the 1A end portion and the 2A end portion of the laminate structure; however, a form where the laminate structure penetrates between the press rolls from the 1B end portion and the 2B end portion of the laminate structure may be adopted. The electrode structure can also be a combination of the positive electrode member or the negative electrode member (electrode member) including the laminate structure described in Example 1 to Example 3 and a positive electrode member or a negative electrode member (electrode member) having a configuration and a structure that are different from those of the positive electrode member or the negative electrode member described in Example 1 to Example 3. The electrode structure may be in a stacked state other than a wound state.

Hereinafter, as an example, in a case where the battery is a lithium ion secondary battery, each of the positive electrode member, the negative electrode member, the positive electrode mixture layer, the positive electrode active material, the negative electrode mixture layer, the negative electrode active material, the binder, the conductive agent, the separator, and the non-aqueous electrolytic solution which form the lithium ion secondary battery will be described.

In the positive electrode member, the positive electrode mixture layers containing the positive electrode active material are formed on both surfaces of the positive electrode current collector. Namely, as the positive electrode active material, the positive electrode mixture layer contains a positive electrode material capable of storing and releasing lithium. The positive electrode mixture layer may further contain a positive electrode binder, a positive electrode conductive agent, or the like. As examples of the material forming the positive electrode current collector, it is possible to present conductive materials such as copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), and/or palladium (Pd), or an alloy containing any one thereof, and or stainless steel. A foil-shaped material can be presented as an example of the form of the positive electrode current collector or the negative electrode current collector to be described later.

A lithium-containing compound can be presented as an example of the positive electrode material, and it is preferable that a lithium-containing complex oxide or a lithium-containing phosphate compound is used as the positive electrode material from the viewpoint of being able to obtain a high energy density. The lithium-containing complex oxide is an oxide containing lithium and one or two or more elements (hereinafter, referred to as "other elements"; however, lithium is excluded) as constituent elements, and has a layered rock salt crystal structure or a spinel crystal structure. In addition, the lithium-containing phosphate compound is a phosphate compound containing lithium and one or two or more elements (other elements) as constituent elements, and has an olivine crystal structure.

The details of the lithium-containing complex oxide and the lithium-containing phosphate compound which are preferred materials forming the positive electrode material are as follows. Incidentally, the other elements forming the lithium-containing complex oxide or the lithium-containing phosphate compound are not specifically limited, and any one or two or more elements belonging to Groups 2 to 15 in the long-period periodic table can be presented as examples of the other elements, and it is preferable that nickel <Ni>, cobalt <Co>, manganese <Mn>, and/or iron <Fe> are used as the other elements from the viewpoint of being able to obtain a high voltage.

Specifically, compounds represented by Equations (B), (C), and (D) can be presented as examples of the lithium-containing complex oxide having a layered rock salt crystal structure.

$$Li_aMn_{1-b-c}Ni_bM_{11c}O_{2-d}F_e \quad (B)$$

Here, $M_{11}$ is at least one element selected from a group of cobalt <Co>, magnesium <Mg>, aluminum <Al>, boron <B>, titanium <Ti>, vanadium <V>, chromium <Cr>, iron <Fe>, copper <Cu>, zinc <Zn>, zirconium <Zr>, molybdenum <Mo>, tin <Sn>, calcium <Ca>, strontium <Sr>, and tungsten <W>, and the values of a, b, c, and d satisfy 0.8≤a≤1.2
0<b<0.5
0≤c≤0.5
b+c<1
−0.1≤d≤0.2
0≤e≤0.1. However, the composition differs depending on a charge and discharge state, and a is a value in a complete discharge state.

$$Li_aNi_{1-b}M_{12b}O_{2-c}F_d \quad (C)$$

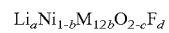

Here, $M_{12}$ is at least one element selected from a group of cobalt <Co>, manganese <Mn>, magnesium <Mg>, aluminum <Al>, boron <B>, titanium <Ti>, vanadium <V>, chromium <Cr>, iron <Fe>, copper <Cu>, zinc <Zn>, molybdenum <Mo>, tin <Sn>, calcium <Ca>, strontium <Sr>, and tungsten <W>, and the values of a, b, c, and d satisfy 0.8≤a≤1.2
0.005≤b≤0.5
−0.1≤c≤0.2
0≤d≤0.1 However, the composition differs depending on a charge and discharge state, and a is a value in a complete discharge state.

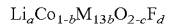

(D)

Here, $M_{13}$ is at least one element selected from a group of nickel <Ni>, manganese <Mn>, magnesium <Mg>, aluminum <Al>, boron <B>, titanium <Ti>, vanadium <V>, chromium <Cr>, iron <Fe>, copper <Cu>, zinc <Zn>, molybdenum <Mo>, tin <Sn>, calcium <Ca>, strontium <Sr>, and tungsten <W>, and the values of a, b, c, and d satisfy 0.8≤a≤1.2
0≤b≤0.5
−0.1≤c≤0.2
0≤d≤0.1 However, the composition differs depending on a charge and discharge and a is a value in a complete discharge state.

Specifically, $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.53}Co_{0.175}Ni_{0.1}O_2$, and $Li_{1.15}(Mn_{0.65}Ni_{0.22}Co_{0.13})_{0.85}O_2$ can be presented as examples of the lithium-containing complex oxide having a layered rock salt crystal structure. In addition, specifically, $LiNi_{0.5}Mn_{1.50}O_4$ can be presented as an example of a LiNiMnO-based material.

For example, in a case where $Li_{1.15}(Mn_{0.65}Ni_{0.22}Co_{0.13})_{0.85}O_2$ is obtained as the positive electrode active material, firstly, nickel sulfate ($NiSO_4$), cobalt sulfate ($CoSO_4$), and manganese sulfate ($MnSO_4$) are mixed. Then, an aqueous solution is prepared by dispersing the mixture in water. Subsequently, a coprecipitate (manganese-nickel-cobalt composite coprecipitated hydroxide) is obtained by adding sodium hydroxide (NaOH) into the aqueous solution while sufficiently stirring the aqueous solution. Thereafter, the coprecipitate is washed with water and then dried, and subsequently, a precursor is obtained by adding lithium hydroxide monohydrate to the coprecipitate. Then, the foregoing positive electrode active material can be obtained by firing the precursor in the atmosphere (800° C.×10 hours).

For example, in a case where $LiNi_{0.5}Mn_{1.50}O_4$ is obtained as the positive electrode active material, firstly, lithium carbonate ($Li_2CO_3$), manganese oxide ($MnO_2$), and nickel oxide (NiO) are weighed, and the weighed materials are mixed using a ball mill. In this case, the mixing ratio (molar ratio) of main elements is: Ni:Mn=25:75. Subsequently, after the mixture is fired in the atmosphere (800° C.×10 hours), the mixture is cooled. Subsequently, the foregoing positive electrode active material can be obtained by re-mixing the fired materials using the ball mill and then re-firing the fired materials in the atmosphere (700° C.×10 hours).

In addition, a compound represented by Equation (E) can be presented as an example of the lithium-containing complex oxide having a spinel crystal structure.

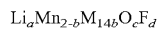

(E)

Here, $M_{14}$ is at least one element selected from a group of cobalt <Co>, nickel <Ni>, magnesium <Mg>, aluminum <Al>, boron <B>, titanium <Ti>, vanadium <V>, chromium <Cr>, iron <Fe>, copper <Cu>, zinc <Zn>, molybdenum <Mo>, tin <Sn>, calcium <Ca>, strontium <Sr>, and tungsten <W>, and the values of a, b, c, and d satisfy 0.9≤a≤1.1
0≤b≤0.6
3.7≤c≤4.1
0≤d≤0.1. However, the composition differs depending on a charge and discharge state, and a is a value in a complete discharge state. Specifically, $LiMn_2O_4$ can be presented as an example of the Lithium-containing complex oxide having a spinel crystal structure.

Furthermore, a compound represented by Equation (F) can be presented as an example of the lithium-containing phosphate compound having an olivine crystal structure.

(F)

Here, $M_{15}$ is at least one element selected from a group of cobalt <Co>, manganese <Mn>, iron <Fe>, nickel <Ni>, magnesium <Mg>, aluminum <Al>, boron <B>, titanium <Ti>, vanadium <V>, niobium <Nb>, Copper <Cu>, zinc <Zn>, molybdenum <Mo>, calcium <Ca>, strontium <Sr>, tungsten <W>, and zirconium <Zr>, and the value of a satisfies 0.9≤a≤1.1. However, the composition differs depending on a charge and discharge state, and a is a value in a complete discharge state. Specifically, $LiFePO_4$, $LiMnPO_4$, $LiFe_{0.5}Mn_{0.5}PO_4$, and $LiFe_{0.3}Mn_{0.7}PO_4$ can be presented as examples of the lithium-containing phosphate compound having an olivine crystal structure.

Alternatively, a compound represented by Equation (G) can be presented as an example of the ithium-containing complex oxide.

(G)

Here, the value of x satisfies

0≤x≤1. However, the composition differs depending on a charge and discharge state, and x is a value in a complete discharge state.

In addition to that, the positive electrode may contain, for example, oxides such as titanium oxide, vanadium oxide, and/or manganese dioxide; disulfides such as titanium disulfide and/or molybdenum sulfide; chalcogenide such as niobium selenide; or conductive polymers such as sulfur, polyaniline, and/or polythiophene.

In the negative electrode member, the negative electrode mixture layers are formed on both surfaces of the negative electrode current collector.

As examples of the material forming the negative electrode current collector, it is possible to present conductive materials such as copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), and/or palladium (Pd), or an alloy containing any one thereof, and/or stainless steel. It is preferable that the surfaces of the negative electrode current collector are roughened from the viewpoint of improving the adhesion of the negative electrode mixture layer to the negative electrode current collector based on so-called anchor effect. In this case, at least the surface of a region in the negative electrode current collector, in which the negative electrode mixture layer has to be formed, may be roughened. A method for forming microparticles using an electrolytic treatment can be presented as an example of a roughening method. The electrolytic treatment is a method for providing roughness on the surfaces of the negative electrode current collector by forming microparticles on the surfaces of the negative electrode current collector in an electrolytic bath using an electrolytic method. Alternatively, the negative electrode member can be formed of a lithium foil, a lithium sheet, and/or a lithium plate. As the negative electrode active material, the negative electrode mixture layer contains a negative electrode material capable of storing and releasing lithium. The negative electrode mixture layer may further contain a negative electrode binder, a negative electrode conductive agent, or the like. The negative electrode binder and the negative electrode conductive agent can be the same as the positive electrode binder and the positive electrode conductive agent.

A carbon material can be presented as an example of the material constituting the negative electrode active material. Since a change in the crystal structure when the carbon material stores and releases lithium is very small, a high energy density can be stably obtained. In addition, since the carbon material serves also as the negative electrode conductive agent, the conductivity of the negative electrode mixture layer improves. Graphitizable carbon (soft carbon), non-graphitizable carbon (hard carbon), black lead (graphite), and/or a highly crystalline carbon material with a developed crystal structure can be presented as examples of the carbon material. However, it is preferable that a gap between (002) planes in the non-graphitizable carbon is 0.37 nm or greater. In addition, it is preferable that a gap between (002) planes in the black lead is 0.34 nm or less. More specifically, as examples of the carbon material, it is possible to present pyrolytic carbons; cokes such as pitch coke, needle coke, and/or petroleum coke; black leads; glassy carbon fibers; an organic polymer compound fired body which can be obtained by firing (carbonizing) polymer compounds such as phenolic resin and/or furan resin at an appropriate temperature; carbon fibers; activated carbon; carbon blacks; and a polymer such as polyacetylene. In addition to that, both low crystalline carbon which is heat treated at a temperature of approximately 1000° C. or less and amorphous carbon can be provided as other examples of the carbon material. The shape of the carbon material may be any one of a fibrous shape, a spherical shape, a granular shape, and a squamous shape.

Alternatively, a material containing one or two or more metallic elements or metalloid elements as constituent elements (hereinafter, referred to as a "metal-based material") can be presented as an example of the material constituting the negative electrode active material, and accordingly, a high energy density can be obtained. The metal-based material may be any one of a simple substance, an alloy, and a compound, may be a material formed of two or more thereof, or may be a material having at least a part of the phases of one or two or more thereof. The alloy includes also a material containing one or more metallic elements and one or more metalloid elements, in addition to a material formed of two or more metallic elements. In addition, the alloy may contain a non-metallic element. A solid solution, a eutectic crystal (eutectic mixture), an intermetallic compound, and a coexistence of two or more thereof can be presented as examples of the structure of the metal-based material.

A metallic element and a metalloid element which are capable of forming an alloy with lithium can be presented as examples of the metallic element and the metalloid element. As examples of the metallic element and the metalloid element, specifically, it is possible to present magnesium (Mg), boron (B), aluminum (Al), gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), palladium (Pd), and/or platinum (Pt), and among these elements, silicon (Si) and/or tin (Sn) are preferable from the viewpoint of having good ability to store and release lithium and being able to provide a very high energy density.

A simple substance of silicon, a silicon alloy, and a silicon compound can be present as examples of a material containing silicon as a constituent element, and a material formed of two or more thereof may be used or a material having at least a part of the phases of one or two or more thereof may be used. A simple substance of tin, a tin alloy, and a tin compound can be presented as examples of a material containing tin as a constituent element, and a material formed of two or more thereof may be used or a material having at least a part of the phases of one or two or more thereof may be used. The simple substance is a simple substance in a merely general sense, may contain a very small amount of impurities, and is not necessarily a simple substance with a purity of 100%.

As examples of elements other than silicon which form the silicon alloy or the silicon compound, it is possible to present tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and/or chromium (Cr), and carbon (C) and/or oxygen (O) can be also presented as examples of the elements.

As examples of the silicon alloy or the silicon compound, specifically, it is possible to present $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $ZnSi_2$, $SiC$, $Si_3N_4$, $Si_2N_2O$, $SiO_v$ ($0<v\leq2$, preferably, $0.2<v<1.4$), and $LiSiO$.

As examples of elements other than tin which form the tin alloy or the tin compound, it is possible to present silicon (Si), nickel (Ni), copper (Cu), iron (Fe), cobalt (Co), manganese (Mn), zinc (Zn), and indium. (In), silver (Ag), titanium (Ti), germanium (Ge), bismuth (Bi), antimony (Sb), and/or chromium (Cr), and carbon (C) and/or oxygen (O) can be also presented as examples of the elements. Specifically, $SnO_w$ ($0<w\leq2$), $SnSiO_3$, $LiSnO$, and $Mg_2Sn$ can be presented as examples of the tin alloy or the tin compound. Particularly, it is preferable that a material containing tin as a constituent element is, for example, a material (hereinafter, referred to as a "Sn-containing material") containing a second constituent element and a third constituent element together with tin (first constituent element). As examples of the second constituent element, it is possible to present cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cesium (Ce), hafnium (Hf), tantalum (Ta), tungsten (W), bismuth (Bi), and/or silicon (Si), and as examples of the third constituent element, it is possible to present boron (B), carbon (C), aluminum (Al), and/or phosphorus (P). When the Sn-containing material contains the second constituent element and the third constituent element, a high battery capacitance, good cycling characteristics, and the like are obtained.

It is preferable that the Sn-containing material is a material (referred to as a "SnCoC-containing material") containing tin (Sn), cobalt (Co), and carbon (C) as constituent elements among the foregoing elements. In the SnCoC-containing material, for example, the carbon content is from 9.9% by mass to 29.7% by mass, and the ratio of content between tin and cobalt {Co/(Sn+Co)} is from 20% by mass to 70% by mass. The reason for this is that a high energy density is obtained. The SnCoC-containing material has a phase containing tin, cobalt, and carbon, and it is preferable that the phase is low crystalline or amorphous. Since this phase is a reaction phase capable of reacting with lithium, good characteristics are obtained due to the presence of the reaction phase. In a case where CuKα rays are used as specific X-rays and the drawing speed is one degree per minute, it is preferable that the half-value width of a diffraction peak (diffraction angle 2θ) obtained by the X-ray diffraction of this reaction phase is one degree or greater. The reason for this is that lithium is more smoothly stored and released and the reactivity with a non-aqueous electrolytic solution is reduced. The SnCoC-containing material may include a phase containing a simple substance or a part of each constituent element in addition to the low crystalline or amorphous phase.

By comparing X-ray diffraction charts before and after an electrochemical reaction with lithium, it is possible to easily determine whether or not the diffraction peak obtained by the X-ray diffraction corresponds to the reaction phase capable of reacting with lithium. For example, in a case where there is a change in the position of the diffraction peak before and after the electrochemical reaction with lithium, the diffraction peak corresponds to the reaction phase capable of reacting with lithium. In this case, for example, the diffraction peak of the low crystalline or amorphous reaction phase, namely, 2θ is between 20 degrees and 50 degrees. It is considered that such a reaction phase contains, for example, each of the foregoing constituent elements and is mainly low crystalline or amorphous due to the presence of carbon.

It is preferable that in the SnCoC-containing material, at least a part of carbon which is a constituent element is bonded to the metallic element or the metalloid element. The reason for this is that the aggregation and crystallization of tin and the like are prevented. The bonding state of elements can be confirmed using X-ray photoelectron spectroscopy (XPS) using Al—Kα rays, Mg—Kα rays, or the like as a soft X-ray source. In a case where at least a part of carbon is bonded to the metallic element or the metalloid element, the peak of a composite wave of is orbitals (C 1s) of carbon appears in a region lower than 284.5 eV Incidentally, it is assumed that the calibration of energy is performed such that the peak of a 4f orbital (Au4f) of the gold atom is obtained at 84.0 eV. In this case, since surface-contaminant carbon is normally present on the material surface, the peak of C1s of the surface-contaminant carbon is 284.8 eV, and the peak is used as an energy reference. In the XPS measurement, the waveform of the peak of C1s is obtained in a form including the peak of the surface-contaminant carbon and the peak of carbon in the SnCoC-containing material. For this reason, for example, analysis may be performed using commercially available software to separate both peaks. In the analysis of the waveform, the position of a main peak which is present on a minimum binding energy side is set as the energy reference (284.8 eV).

The SnCoC-containing material is not limited to a material (SnCoC) of which the constituent elements are only tin, cobalt, and carbon. For example, the SnCoC-containing material may contain any one or two or more constituent elements of silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), bismuth (Bi), and the like in addition to tin, cobalt, and carbon.

Besides the SnCoC-containing material, a material (hereinafter, referred to as "SnCoFeC-containing material") containing tin, cobalt, iron, and carbon as constituent elements is also a preferred material. The composition of the SnCoFeC-containing material is arbitrary. As one example, in a case where the iron content is set low, the carbon content is from 9.9% by mass to 29.7% by mass, the iron content is 0.3% by mass to 5.9% by mass, and the ratio of content between tin and cobalt {Co/(Sn+Co)} is from 30% by mass to 70% by mass.

In addition, in a case where the iron content is set high, the carbon content is from 11.9% by mass to 29.7% by mass, the ratio of content between tin, cobalt, and iron {(Co+Fe)/(Sn+Co+Fe)} is from 26.4% by mass to 48.5% by mass, and the ratio of content between cobalt and iron {Co/(Co+Fe)} is from 9.9% by mass to 79.5% by mass. The reason for this is that a high energy density is obtained in such a range of composition. The physical properties (half-value width and the like) of the SnCoFeC-containing material are the same as those of the foregoing SnCoC-containing material.

Alternatively, in addition to that, as examples of the material forming the negative electrode active material, it is possible to present metal oxides such as iron oxide, ruthenium oxide, and/or molybdenum oxide; and polymer compounds such as polyacetylene, polyaniline, and/or polypyrrole.

It is preferable that the material forming the negative electrode active material contains both of a carbon material and a metal-based material among these materials for the following reasons. Namely, whereas a material containing the metal-based material, particularly, at least one of silicon and tin as a constituent element has an advantage of obtaining a high theoretical capacitance, the material is likely to severely expand and contract during charge and discharge.

On the other hand, whereas the carbon material provides a low theoretical capacitance, the carbon material has an advantage of being unlikely to expand and contract during charge and discharge. Therefore, a high theoretical capacitance other words, battery capacitance) is obtained and the expansion and contraction during charge and discharge is prevented by using both of the carbon material and the metal-based material.

The positive electrode mixture layer or the negative electrode mixture layer can be formed based on, for example, a coating method. Namely, the positive electrode mixture layer or the negative electrode mixture layer can be formed based on a method (for example, a coating method using the foregoing coating device with a die and a back roll) for coating the positive electrode current collector or the negative electrode current collector by mixing the positive electrode active material or the negative electrode active material having a particulate (powder) form with the positive electrode binder or the negative electrode binder and then dispersing the mixture in the solvent such as an organic solvent. However, the coating method is not limited to such a method, and the present disclosure is not limited to the coating method. For example, the negative electrode member can be obtained by molding the negative electrode active material, and the positive electrode member can be obtained by molding the positive electrode active material. For example, a press device may be used in the molding. Alternatively, the positive electrode mixture layer or the negative electrode mixture layer can be formed based on a vapor phase method, a liquid phase method, a thermal spraying method, and a firing method (sintering method). The vapor phase method is physical vapor deposition (PVD) methods such as a vacuum deposition method, a sputtering method, an ion plating method, and a laser ablation method, or various chemical vapor deposition (CVD) methods including a plasma CND method. An electrolytic plating or an electroless plating can be presented as an example of the liquid phase method. The thermal spraying method is a method for spraying the positive electrode active material or the negative electrode active material in a molten state or a semi-molten state onto the positive electrode current collector or the negative electrode current collector. For example, the firing method is a method for performing a heat treatment at a temperature higher than the melting points of the negative electrode binder and the like after coating the negative electrode current collector with the mixture, which is dispersed in the solvent, using the coating method, and an atmospheric firing method, a reaction firing method, a hot press firing method can be present as examples of the firing method.

As examples of the positive electrode binder and the negative electrode binder, specifically, it is possible to present synthetic rubbers such as styrene butadiene-based rubber such as styrene butadiene rubber (SBR), fluorine rubber, and ethylene propylene diene rubber; fluorine resins such as polyvinylidene fluoride (PVdF), polyvinyl fluoride, polyimide, polytetrafluoroethylene (PTFE), and/or ethyl enetetrafluoroethylene (TATE), or copolymers and modified materials of these fluorine resins; polyolefin resin such as polyethylene or polypropylene; acrylic resins such as polyacrylonitrile (PAN) and/or polyacrylate; and a polymer material such as carboxymethyl cellulose (CMC), and at least one selected from copolymers or the like which are formed of mainly these resin materials can be also presented as examples. As examples of a copolymer of polyvinylidene fluoride, more specifically, it is possible to present a polyvinylidene fluoride-hexafluoropropylene copolymer, a polyvinylidene fluoride-tetrafluoroethylene copolymer, a polyvinylidene fluoride-chlorotrifluoroethylene copolymer, and a polyvinylidene fluoride-hexafluoropropylene-tetrafluoroethylene copolymer. In addition, a conductive polymer may be used as the positive electrode binder and the negative electrode binder. For example, substituted or unsubstituted polyaniline, polypyrrole, polythiophene, (co)polymer formed of one or two selected therefrom, or the like can be used as the conductive polymer.

As examples of the positive electrode conductive agent and the negative electrode conductive agent, it is possible to present carbon materials such as black lead, carbon fibers, carbon black, carbon nanotube, graphite, vapor growth carbon fibers (VGCF), acetylene black (AB), and ketchen black (KB), and one or two or more thereof can be used as a mixture. As examples of the carbon nanotube, it is possible to present single-walled carbon nanotube (SWCNT) and/or multi-walled carbon nanotube (MWCNT) such as double-walled carbon nanotube (DWCNT). In addition, a metallic material, a conductive polymer material, or the like may be used as long as the material has conductivity.

In order to prevent unintentional precipitation of lithium on the negative electrode member during charge, it is preferable that the chargeable capacitance of the negative electrode material is larger than the discharge capacitance of the positive electrode material. Namely, it is preferable that the electrochemical equivalent of the negative electrode material capable of storing and releasing lithium is larger than the electrochemical equivalent of the positive electrode material. Incidentally, for example, in a case where the electrode reactant is lithium, lithium precipitated on the negative electrode member is lithium metal.

The positive electrode lead portion can be attached to the positive electrode current collector based on spot welding or ultrasonic welding. It is desirable that the positive electrode lead portion is made of a metallic foil or a mesh; however, the positive electrode lead portion may be made of metal as long as the metal is electrochemically and chemically stable and can conduct electricity. Aluminum (Al), nickel (Ni), and/or the like can be presented as examples of the material of the positive electrode lead portion. The negative electrode lead portion can be attached to the negative electrode current collector based on spot welding or ultrasonic welding. It is desirable that the negative electrode lead portion is made of a metallic foil or a mesh; however, the negative electrode lead portion may be made of metal as long as the metal is electrochemically and chemically stable and can conduct electricity. Copper (Cu), nickel (Ni), and/or the like can be presented as examples of the material of the negative electrode lead portion. The positive electrode lead portion or the negative electrode lead portion can be also formed of a protrusion portion that is a part of the positive electrode current collector or the negative electrode current collector, which protrudes from the positive electrode current collector or the negative electrode current collector.

The separator separates the positive electrode member and the negative electrode member, and allows lithium ions to pass therethrough while preventing a short circuit for current which is caused by contact between the positive electrode member and the negative electrode member. The separator is made of, for example, a porous membrane made of synthetic resin such as polyolefin resin (polypropylene resin or polyethylene resin), polyimide resin, polytetrafluoroethylene resin, polyvinylidene fluoride resin, polyphenylene sulfide resin, and/or aromatic polyamide, a porous membrane such as ceramic, glass fibers (for example, including a glass filter), a non-woven fabric made of liquid crystal polyester fibers, aromatic polyamide fibers, and/or cellulosic fibers, a non-woven fabric made of ceramic, or the like, and a porous film made of polypropylene and/or polyethylene among these materials is preferably used. Alternatively, the separator can be also formed of a laminate membrane where two or more porous membranes are stacked, and can be a separator coated with an inorganic layer or a separator containing an inorganic substance. Among these materials, a porous membrane made of polyolefin resin is preferable due to being very effective in preventing a short circuit and being able to improve the safety of the battery which is caused by the shutdown effect. Since polyethylene resin can provide the shutdown effect within a range from 100° C. to 160° C. and is good also in electrochemical stability, the polyethylene resin is particularly preferable as the material forming the separator. In addition to that, a material which is obtained by copolymerizing or blending a resin having chemical stability with polyethylene or polypropylene can be used. Alternatively, the porous membrane may have, for example, a structure with three or more layers in which a polypropylene resin layer, a polyethylene resin layer, and a polypropylene resin layer are sequentially stacked. The thickness of the separator is preferably from 5 μm to 50 μm, and is more preferably from 7 μm to 30 μm. When the separator is too thick, the amount of fill of the active material decreases, the battery capacitance decreases, the ionic conductivity decreases, so that the current characteristics deteriorate. Conversely, when the separator is too thin, the mechanical strength the separator decreases.

In addition, the separator may have a structure where resin layers are provided on a single surface or both surfaces of a porous membrane which is a substrate. A porous matrix resin layer carrying an inorganic substance can be presented as an example of the resin layer. It is possible to obtain oxidation resistance, and prevent the degradation of the separator by adopting such a structure. Polyvinylidene fluoride (PVdF), hexafluoropropylene (HFP), and/or polytetrafluoroethylene (PTFE) can be presented as examples of the material forming the matrix resin layer, and a copolymer thereof can be also used. A metal, a semiconductor, and an oxide and a nitride thereof can be presented as examples of the inorganic substance. Aluminum (Al), titanium (Ti), and/or the like can be presented as examples of the metal, and silicon (Si), boron (B), and/or the like can be provided as examples of the semiconductor. In addition, it is preferable that the inorganic substance has substantially no conductivity and has a large heat capacitance. In a case where the heat capacitance is large, the inorganic substance is useful as a heat sink when current generates heat, and can more effectively prevent the thermal runaway of the battery. As examples of such an inorganic substance, it is possible to present oxides or nitrides such as alumina ($Al_2O_3$), boehmite (alumina monohydrate), talc, boron nitride (BN), aluminum nitride (AlN), titanium dioxide ($TiO_2$), and/or silicon oxide. For example, the inorganic substance can have a grain size from 1 nm to 10 μm. It is difficult to obtain an inorganic substance with a grain size of less than 1 nm, and even in a case where the inorganic substance can be obtained, the inorganic substance does not worth the cost. When the grain size is larger than 10 μm, the distance between the electrodes becomes large, and it is not possible to fill a sufficient amount of the active material in a limited space, so that the battery capacitance becomes low. The porous membrane serving as the substrate may contain the inorganic substance. The resin layer can be obtained, for example, by coating the substrate (porous membrane) with a slurry formed of matrix resin, the solvent, and the inorganic substance, causing the coated substrate to pass through a poor solvent for the matrix resin and a solvent-friendly bath for the solvent to separate phases, and thereafter, drying the coated substrate.

For example, the separator can have a puncture strength from 100 gf to 1 kgf, preferably from 100 gf to 480 gf. When the puncture strength is low, a short circuit occurs, and when the puncture strength is high, the ionic conductivity decreases, which is a concern. For example, the separator can have a gas permeability from 30 seconds/100 cc to 1,000 seconds/100 cc, preferably from 30 seconds/100 cc to 680 seconds/100 cc. When the gas permeability is too low, a short circuit occurs, and when the gas permeability is too high, the ionic conductivity decreases, which is a concern.

As examples of lithium salt forming the non-aqueous electrolytic solution that is suitable for use in the lithium ion secondary battery, it is possible to present $LiPF_6$, $LiClO_4$, $LiBF_4$, $LiAsF_6$, $LiSbF_6$, $LiTaF_6$, $LiNbF_6$, $LiSiF_6$, $LiAlCl_4$, $LiCF_3SO_3$, $LiCH_3SO_3$, $LiN(CF_3SO_2)_2$, $LiC(CF_3SO_2)_3$, $LiC_4F_9SO_3$, $Li(FSO_2)_2N$, $Li(CF_3SO_2)_2N$, $Li(C_2F_5SO_2)_2N$, $Li(CF_3SO_2)_3C$, $LiBF_3(C_2F_5)$, $LiB(C_2O_4)_2$, $LiB(C_6F_5)_4$, $LiPF_3(C_2F_5)_3$, $½Li_2B_{12}F_{12}$, $Li_2SiF_6$, LiCl, LiBr, LiI and difluoro[oxolato-O,O'].

Lithium borate and/or lithium bisoxalate borate can be presented as examples; however, lithium salt is not limited thereto.

In addition, cyclic carbonates such as ethylene carbonate (EC), propylene carbonate (PC), and/or butylene carbonate (BC) can be used as the organic solvent, and one of ethylene carbonate and propylene carbonate is preferably used or a mixture of both is more preferably used; and thereby, it is possible to improve the cycling characteristics. In addition, from the viewpoint of obtaining a high ionic conductivity, a mixture of these cyclic carbonates and chain carbonate such as diethyl carbonate, dimethyl carbonate, ethyl methyl carbonate, or methyl propyl carbonate can be used as the solvent. Alternatively, the solvent may include 2,4-difluoroanisole and/or vinylene carbonate. 2,4-difluoroanisole can improve the discharge capacitance, and vinylene carbonate can improve the cycling characteristics. Therefore, the mixture thereof is preferably used since the discharge capacitance and the cycling characteristics can be improved.

Alternatively, as examples of the organic solvent, it is possible to present chain carbonates such as dimethyl carbonate (DMC), ethyl methyl carbonate (EMC), diethyl carbonate (DEC), dipropyl carbonate (DPC), propyl methyl carbonate (PMC), propyl ethyl carbonate (PEC), and/or fluoroethylene carbonate (FEC); cyclic ethers such as tetrahydrofuran (THF), 2-methyltetrahydrofuran (2-MeTHF), 1,3-dioxolane (DOL), and/or 4-methyl-1,3-dioxolane (4-MeDOL); chain ethers such as 1,2-dimethoxyethane (DME) and/or 1,2-diethoxyethane (DEE); cyclic esters such as γ-butyrolactone (GBL) and γ-valerolactone (GVL); chain esters such as methyl acetate, ethyl acetate, propyl acetate, methyl formate, ethyl formate, propyl formate, methyl butyrate, methyl propionate, ethyl propionate, and/or propyl propionate. Alternatively, as examples of the organic solvent, it is possible to present tetrahydropyran, 1,3-dioxane, 1,4-dioxane, N,N-dimethylformamide (DMF), N,N-dimethylacetamide (DMA), N-methylpyrrolidinone (NMP), N-methyloxazolidinone (NMO), N,N'-dimethylimidazolidinone (DMI), dimethylsulfoxide (DMSO), trimethylphosphate (TMP), nitromethane (NM), nitroethane (NE), sulfolane (SL), methylsulfolane, acetonitrile (AN), anisole, propionitrile, glutaronitrile (GLN), adiponitrile (ADN), methoxyacetonitrile (MAN), 3-methoxypropionitrile (MPN), diethyl ether, butylene carbonate, 3-methoxypropionitrile, N,N-Dimethyl form amide, dimethyl sulfoxide, and/or trimethyl phosphate. Alternatively, an ionic liquid can also be used. A well-known ionic liquid can be used, and the ionic liquid may be selected as needed.

The non-aqueous electrolytic solution and the retentive polymer compound can also form the electrolyte layer. For example, the non-aqueous electrolytic solution is retained by the retentive polymer compound. The electrolyte layer with such a form is a gel-state electrolyte or a solid-state electrolyte, provides high ionic conductivity (for example, 1 mS/cm or greater at room temperature) and prevents the leakage of the non-aqueous electrolytic solution. The electrolyte can be a liquid electrolyte, and can be a gel-state electrolyte or a solid-state electrolyte. Since the gel-state electrolyte does not require a vacuum injection process of an electrolytic solution and can adopt a continuous coating process, the gel-state electrolyte is advantageous in productivity when a lithium ion battery with a large area is produced.

As examples of the retentive polymer compound, specifically, it is possible to present polyacrylonitrile, polyvinylidene fluoride, polytetrafluoroethylene, polyhexafluoropropylene, polyethylene oxide, polypropylene oxide, polyphosphazene, polysiloxane, polyvinyl fluoride (PVT), polychlorotrifluoroethylene (PCTFE), perfluoroalkoxy fluororesin (PFA), ethylene tetrafluoride-propylene hexafluoride copolymer (FEP), ethylene-tetrafluoroethylene copolymer (ETFE), ethylene-chlorotrifluoroethylene copolymer (ECTFE), polyvinyl acetate, polyvinyl alcohol, polymethyl methacrylate, polyacrylic acid, polymethacrylic acid, styrene-butadiene rubber, nitrile-butadiene rubber, polystyrene, polycarbonate, polyethylene oxide, and vinyl chloride.

These materials may be used alone or as a mixture. In addition, the retentive polymer compound may be a copolymer. Specifically, polyvinylidene fluoride-hexafluoropropylene copolymer and the like can be presented as examples of the copolymer, and among these materials, from the viewpoint of electrochemical stability, polyvinylidene fluoride is preferable as a homopolymer, and polyvinylidene fluoride-hexafluoropropylene copolymer is preferable as the copolymer. In addition, compounds with high heat resistance such as $Al_2O_3$, $SiO_2$, $TiO_2$, boron nitride (BN, and/or the like may be contained as a filler.

In addition, the present disclosure is further described below in detail according to an embodiment.

[A01] «Laminate Structure»

There is provided a laminate structure including a substrate including a first surface and a second surface opposite to the first surface;

a first layer formed on the first surface of the substrate; and a second layer formed on the second surface of the substrate, in which the first layer includes a 1A end portion and a 1B end portion along a width direction of the substrate, the second layer includes a 2A end portion and a 2B end portion along the width direction of the substrate, the 1A end portion is opposite to the 2A end portion, the 1B end portion is opposite to the 2B end portion, the 2A end portion is positioned closer to a central portion side of the substrate than the 1A end portion, and an end surface of the 2A end portion is an inclined surface or has a stair shape or a combined shape of the inclined surface and the stair shape.

[A02] In the laminate structure according to [A01], an incline angle of the end surface of the 2A end portion is 5 degrees or less.

[A03] In the laminate structure according to [A01] or [A02], when $V_{10}$ is an average volume density value of a region with a length of 1 mm in the first layer from one portion which is 2 mm apart outward from a portion of the first layer which is opposite to the 2A end portion to another portion which is 3 mm apart from the portion, and $V_{11}$ is an average volume density value of a region in the first layer which is sufficiently apart inward from the portion of the first layer which is opposite to the 2A end portion, $V_{10}/V_{11} \geq 0.94$ is satisfied.

[A04] In the laminate structure according to any one of [A01] to [A03], when the end surface of the 2A end portion has the stair shape, the 2A end portion has a structure where N layers (where $N \geq 2$) of second layer segments are stacked, a thickness of each of the second layer segments which are equivalent to risers is $d_n$ (where n=1, 2, ..., N), a thickness of the first layer is c, a thickness of the substrate is e, and a sum of thicknesses from a first layer of second layer segment to an $n^{th}$ layer of second layer segment is $\Sigma d_n$, and when an optimal incline angle of the end surface of the 2A end portion is $B_{opt}$ (degrees), a step rate $g_n$ obtained by $g_n = d_n + c + e)$ satisfies $0.022 B_{opt} + 0.022 \leq g_n \leq 0.045 B_{opt} + 0.063$.

[A05] In the laminate structure according to [A04], the step rate of any one of the second layer segments is 0.15 or less.

[A06] In the laminate structure according to any one of [A01] to [A05], when either one of the 1B end portion and the 2B end portion is positioned closer to the central portion side of the substrate than the other, and either one of the 1B end portion and the 2B end portion is referred to as an inner end portion, an end surface of the inner end portion is an inclined surface or has a stair shape or a combined shape of the inclined surface and the stair shape.

[A07] In the laminate structure according to [A06], an incline angle of the end surface of the inner end portion is 5 degrees or less.

[A08] In the laminate structure according to [A06] or [A07], when either the other one of the 1B end portion and the 2B end portion is referred to as an outer end portion, and when $V_{20}$ is an average volume density value of a region with a length of 1 mm in a layer from one portion which is 2 mm apart outward from a portion of the layer including the outer end portion which is opposite to the inner end portion to another portion which is 3 mm apart from the portion and $V_{21}$ is an average volume density value of a region in the layer which is sufficiently apart inward from the portion of the layer including the outer end portion which is opposite to the inner end portion, $V_{20}/V_{21} \geq 0.94$ is satisfied.

[A09] In the laminate structure according to any one of [A01] to [A08], the laminate structure forms an electrode member of a batters, the substrate forms a current collector of the electrode member, and the first layer and the second layer form a mixture layer of the electrode member.

[B01] «Roll Press Device»

There is provided a roll press device including a pair of press rolls; and an auxiliary roll that is disposed upstream, downstream, or upstream and downstream of the pair of press rolls, the roll press device pressing a laminate structure by allowing the laminate structure to pass between the pair of press rolls, in which a laminate structure contact surface of the auxiliary roll is positioned above or below a virtual plane which the laminate structure includes when the laminate structure passes between the pair of press rolls.

[B02] In the roll press device according to [B01], an angle of the laminate structure contact surface of the auxiliary roll with respect to the virtual plane exceeds zero degrees and is 10 degrees or less.

[B03] In the roll press device according to [B01] or [B02], the laminate structure includes a substrate including a first surface and a second surface opposite to the first surface, a first layer formed on the first surface of the substrate, and a second layer formed on the second surface of the substrate, the first layer includes a 1A end portion and a 1B end portion long a width direction of the substrate, the second layer includes a 2A end portion and a 2B end portion along the width direction of the substrate, the 1A end portion is opposite to the 2A end portion, the 1B end portion is opposite to the 2B end portion, the 2A end portion is positioned closer to a central portion side of the substrate than the 1A end portion, an end surface of the 2A end portion is an inclined surface or has a stair shape or a combined shape of the inclined surface and the stair shape, the laminate structure penetrates between the pair of press rolls, and in a case where the second layer is positioned below the first layer, the laminate structure contact surface of the auxiliary roll is positioned below the virtual plane, and in a case where the second layer is positioned above the first layer, the laminate structure contact surface of the auxiliary roll is positioned above the virtual plane.

[B04] In the roll press device according to [B01] or [B02],
the laminate structure is formed of the laminate structure according to any one of [A01] to [A09],
the laminate structure penetrates between the pair of press rolls, and
in a case where the second layer is positioned below the first layer, the laminate structure contact surface of the auxiliary roll is positioned below the virtual plane, and in a case where the second layer is positioned above the first layer, the laminate structure contact surface of the auxiliary roll is positioned above the virtual plane,

[C01] «Method for Producing a Laminate Structure . . . First Embodiment»

There is provided a method for producing a laminate structure which includes
a substrate including a first surface and a second surface opposite to the first surface,
a first layer formed on the first surface of the substrate, and
a second layer formed on the second surface of the substrate, and in which
the first layer includes a 1A end portion and a 1B end portion long a width direction of the substrate,
the second layer includes a 2A end portion and a 213 end portion along the width direction of the substrate,
the 1A end portion is opposite to the 2A end portion,
the 1B end portion is opposite to the 2B end portion, and
the 2A end portion is positioned closer to a central portion side of the substrate than the 1A end portion, and
an end surface of the 2A end portion is an inclined surface or has a stair shape or a combined shape of the inclined surface and the stair shape,
in which the finale structure passes between a pair of press rolls, so that the laminate structure is pressed.

[C02] In the method for producing a laminate structure according to [C01], when a radius of the pair of press rolls is r (m) and an optimal incline angle of the end surface of the 2A end portion is $B_{opt}$ (degrees),
$B_{opt}=p \times r+q$ is satisfied where $-9 \leq p \leq -5$ and $6 \leq q \leq 10$.

[C03]
«Method for Producing a Laminate Structure . . . Second Embodiment»

There is provided a method for producing a laminate structure using a roll press device which includes
a pair of press rolls, and
an auxiliary roll that is disposed upstream, downstream, or upstream and downstream of the pair of press rolls,
in which a laminate structure contact surface of the auxiliary roll is positioned above or below a virtual plane which the laminate structure includes when the laminate structure passes between the pair of press rolls, and the laminate structure passes between the pair of press rolls, so that the laminate structure is pressed.

[D01] «Battery Pack»

There is provided a battery pack including a lithium ion secondary battery; control means for performing control relating to the lithium ion secondary battery; and an exterior member that accommodates the lithium ion secondary battery,
in which the lithium ion secondary battery includes the laminate structure according to any one of [A01] to [A09].

[D02] «Electric Vehicle»

There is provided an electric vehicle including a conversion device which receives a supply of an electrical power from a secondary battery to convert the electric power into a driving force of the vehicle; and a control device which performs information processing relating to vehicle control based on information relating to the secondary battery,
in which the lithium ion secondary battery includes the laminate structure according to any one of [A01] to [A09],

[D03] «Power Storage System»

There is provided a power storage system including a lithium ion secondary battery with the laminate structure according to any one of [A01] to [A09].

[D04] «Electric Tool»

There is provided an electric tool including a lithium ion secondary battery with the laminate structure according to any one of [A01] to [A09]; and
a movable portion to which an electrical power is supplied from the lithium ion secondary battery.

[D05] «Electronic Equipment»

There is provided electronic equipment including a lithium ion secondary battery with the laminate structure according to any one of [A01] to [A09].

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A laminate structure comprising:
a substrate including a first surface and a second surface opposite to the first surface;
a first layer provided on the first surface of the substrate; and
a second layer provided on the second surface of the substrate,
wherein
the first layer includes a first end portion and a second end portion along a width direction of the substrate,
the second layer includes a third end portion and a fourth end portion along the width direction of the substrate,
the first end portion is opposite to the third end portion,
the second end portion is opposite to the fourth end portion,
the third end portion is positioned closer to a central portion side of the substrate than the first end portion, and
an end surface of the third end portion includes an inclined surface or a stair shape or a combined shape of the inclined surface and the stair shape,
wherein $V_{10}$ is an average volume density value of a region with a length of 1 mm in the first layer from one portion which is 2 mm apart outward from a portion of the first layer which is opposite to the third end portion to another portion which is 3 mm apart from the portion, and $V_{11}$ is an average volume density value of a region in the first layer which is sufficiently apart inward from the portion of the first layer which is opposite to the third end portion, and wherein $V_{10}/V_{11} \geq 0.94$ is satisfied.

2. The laminate structure according to claim 1,
wherein an incline angle of the end surface of the third end portion is 5 degrees or less.

3. The laminate structure according to claim 1,
wherein
in a case that the end surface of the third end portion has the stair shape, the third end portion has a structure where N layers (where N≥2) of second layer segments are stacked, a thickness of each of the second layer segments which are equivalent to risers is $d_n$ (where n=1, 2, ..., N), a thickness of the first layer is c, a thickness of the substrate is e, and a sum of thicknesses from a first layer of second layer segments to an $n^{th}$ layer of second layer segments is $\Sigma d_n$, and an optimal incline angle of the end surface of the third end portion is $B_{opt}$ (degrees), a step rate $g_n$ obtained by $g_n = d_n/(\Sigma d_n + c + e)$ satisfies $0.022B_{opt} + 0.022 \leq g_n \leq 0.045B_{opt} + 0.063$.

4. The laminate structure according to claim 3, wherein the step rate of the second layer segments is 0.15 or less.

5. The laminate structure according to claim 1, wherein in a case that either one of the second end portion and the fourth end portion is positioned closer to the central portion side of the substrate than the other, and either one of the second end portion and the fourth end portion is referred to as an inner end portion, an end surface of the inner end portion includes an inclined surface or a stair shape or a combined shape of the inclined surface and the stair shape.

6. The laminate structure according to claim 5, wherein an incline angle of the end surface of the inner end portion is 5 degrees or less.

7. The laminate structure according to claim 5, wherein either the other one of the second end portion and the fourth end portion is referred to as an outer end portion, and wherein $V_{20}$ is an average volume density value of a region with a length of 1 mm in a layer from one portion which is 2 mm apart outward from a portion of the layer including the outer end portion which is opposite to the inner end portion to another portion which is 3 mm apart from the portion, and $V_{21}$ is an average volume density value of a region in the layer which is sufficiently apart inward from the portion of the layer including the outer end portion which is opposite to the inner end portion, and wherein $V_{20}/V_{21} \geq 0.94$ is satisfied.

8. The laminate structure according to claim 1, wherein the laminate structure is configured to form an electrode member of a battery, the substrate is configured to form a current collector of the electrode member, and the first layer and the second layer are configured to form a mixture layer of the electrode member.

* * * * *